United States Patent [19]

Smith et al.

[11] Patent Number: 5,467,042

[45] Date of Patent: Nov. 14, 1995

[54] LOW POWER CLOCKING APPARATUS AND METHOD

[75] Inventors: Stephen A. Smith, Palo Alto; Bryan Richter, Fremont; Dave M. Singhal, San Jose, all of Calif.

[73] Assignee: Cirrus Logic, Inc., Freemont, Calif.

[21] Appl. No.: 149,107

[22] Filed: Nov. 8, 1993

[51] Int. Cl.$^6$ .................................................... H03K 3/00
[52] U.S. Cl. ...................... 327/293; 327/299; 327/141; 326/93
[58] Field of Search ................................. 307/269, 480; 327/19, 141, 293, 299, 144, 142; 326/93

[56] References Cited

U.S. PATENT DOCUMENTS

| | | | |
|---|---|---|---|
| 4,218,876 | 8/1980 | Hashimoto et al. | 368/10 |
| 4,317,181 | 2/1982 | Teza et al. | 364/707 |
| 4,390,022 | 6/1983 | Calfee et al. | 128/419 PG |
| 4,404,972 | 9/1983 | Gordon et al. | 128/419 PG |
| 4,570,219 | 2/1986 | Shibukawa et al. | 364/200 |
| 4,656,649 | 4/1987 | Takahashi | 307/269 |
| 4,665,536 | 5/1987 | Kim | 377/16 |
| 4,731,814 | 3/1988 | Becker et al. | 379/62 |
| 5,162,667 | 11/1992 | Yasui et al. | 307/269 |
| 5,218,704 | 6/1993 | Watts, Jr. et al. | 395/750 |

OTHER PUBLICATIONS

"Personal Computer Memory Card International Association Standards", Release 2.01, published by Personal Computer Memory Card International Association, 1030G East Duane Avenue, Sunnyvale, Calif. 94086, Nov. 1992.
"CL–PD6710 & CL–PD6720 Advanced Data Sheet", Revision 1.0.1, Published by Cirrus Logic, Inc., Jul. 23, 1992.
"CL–PD6710 & CL–PD6720 Advanced Data Sheet", Revision 1.0.2, Published by Cirrus Logic, Inc., Jul. 30, 1992.
"CL–PD6710 & CL–PD6720 Advanced Data Sheet", Revision 1.0.3, Published by Cirrus Logic, Inc., Sep. 1, 1992.
"CL–PD6710 & CL–PD6720 Advanced Data Sheet", Revision 1.0.3, Published by Cirrus Logic, Inc., Sep. 2, 1992.
"CL–PD6710 & CL–PD6720 Advanced Data Sheet", Revision 1.0.4, Published by Cirrus Logic, Inc., Oct. 20, 1992.
"CL–PD6710/6720 Advanced Product Bulletin", by Cirrus Logic, Inc., Sep. 1992.
"Cirrus Logic Enters PCMCIA World with Industry–Leading Host Adapter, Disk Drive Controllers" Press Release made by Cirrus Logic, Inc., Sep. 28, 1992.

Primary Examiner—Timothy P. Callahan
Assistant Examiner—Jung Ho Kim
Attorney, Agent, or Firm—Haverstock & Associates

[57] ABSTRACT

A low power clocking apparatus and method is used to reduce power consumption by an electronic system or an integrated circuit that is coupled to an external system via a system bus which is configured to selectively transmit or receive signals from the electronic system or integrated circuit. The electronic system or integrated circuit includes a plurality of sub-circuits. Each sub-circuit is configured to operate under control of a clock signal and further includes an apparatus for keeping or rejecting the clock signal. Once each sub-circuit within the electronic system or integrated circuit rejects the clock signal, an integral arbiter circuit disables the clock signal to all the sub-circuits. The arbiter circuit continuously monitors the system bus. Upon detecting that the sub-circuits will require the clock signal, the arbiter will re-enable the clock signal to all of the sub-circuits.

12 Claims, 2 Drawing Sheets

5,467,042

LOW POWER CLOCKING APPARATUS AND METHOD

FIELD OF THE INVENTION

This invention relates generally to electronic systems having selective application of a clock signal to multiple circuits. More particularly, the invention relates to an integrated circuit design which conserves power by gating the generation of the clock signal when none of its multiple circuits requires a clock signal.

BACKGROUND OF THE INVENTION

Within each integrated circuit of a computer system are many circuits or functional blocks which all work together to perform operations required by the CPU. Each synchronous circuit within the integrated circuit is supplied a clock signal from either the external system clock or a clock internal to the integrated circuit. This clock signal is used to synchronize the operation of the integrated circuit and to toggle a response signal through the functional blocks, integrated circuit or system. For all synchronous functional blocks the clock is used as the timing reference to ensure that each synchronous functional block will execute its operations in the sequence that they are to occur.

For certain types of circuits, including CMOS circuits, power consumption is increased as a result of the circuit being exercised, e.g., by a clock signal. Typical digital systems employ multiple integrated circuit chips. As is well understood, each chip typically performs a limited number of functions for the system, for example, to control a semiconductor memory, to control a hard disk, to control a screen display and other related functions. Periodically, each of these circuits is not needed and is idle insofar as system functionality is concerned. Unfortunately, because these circuits continue to receive a clock signal, their respective internal circuits continue to be exercised and consume significant electric power, even while idle.

Lower power consumption is desirable for all electronic systems, but especially for portable computers which are supplied power from a battery with a finite lifetime. Conserving power in a portable computer will mean that the user can use their computer for a longer period of time before it is necessary to replace or recharge the battery, which supplies power to the portable computer.

What is needed is an apparatus and method which allows an integrated circuit to turn off the clock signal provided to its circuits during the time when the circuits are not required for operation and allows the clock signal to be restored very rapidly when the circuits are necessary to the operation of the integrated circuit. What is also needed is an apparatus and method which can turn off the clock signal to circuits of an integrated circuit or system and keep the fact that the clock signal is turned off to those circuits transparent to both the system bus and the user.

SUMMARY OF THE INVENTION

A low power clocking apparatus and method is used to reduce power consumption by an electronic system or an integrated circuit that is coupled to an external system via a system bus which is configured to selectively transmit or receive signals from the electronic system or integrated circuit. The electronic system or integrated circuit includes a plurality of sub-circuits. Each sub-circuit is configured to operate under control of a clock signal and further includes an apparatus for keeping or rejecting the clock signal. Once each sub-circuit within the electronic system or integrated circuit rejects the clock signal, an integral arbiter circuit disables the clock signal to all the sub-circuits. The arbiter circuit continuously monitors the system bus. Upon detecting that the sub-circuits will require the clock signal, the arbiter will re-enable the clock signal to all of the sub-circuits.

DETAILED DESCRIPTION OF THE PREFERRED EMBODIMENT

Figure 1:
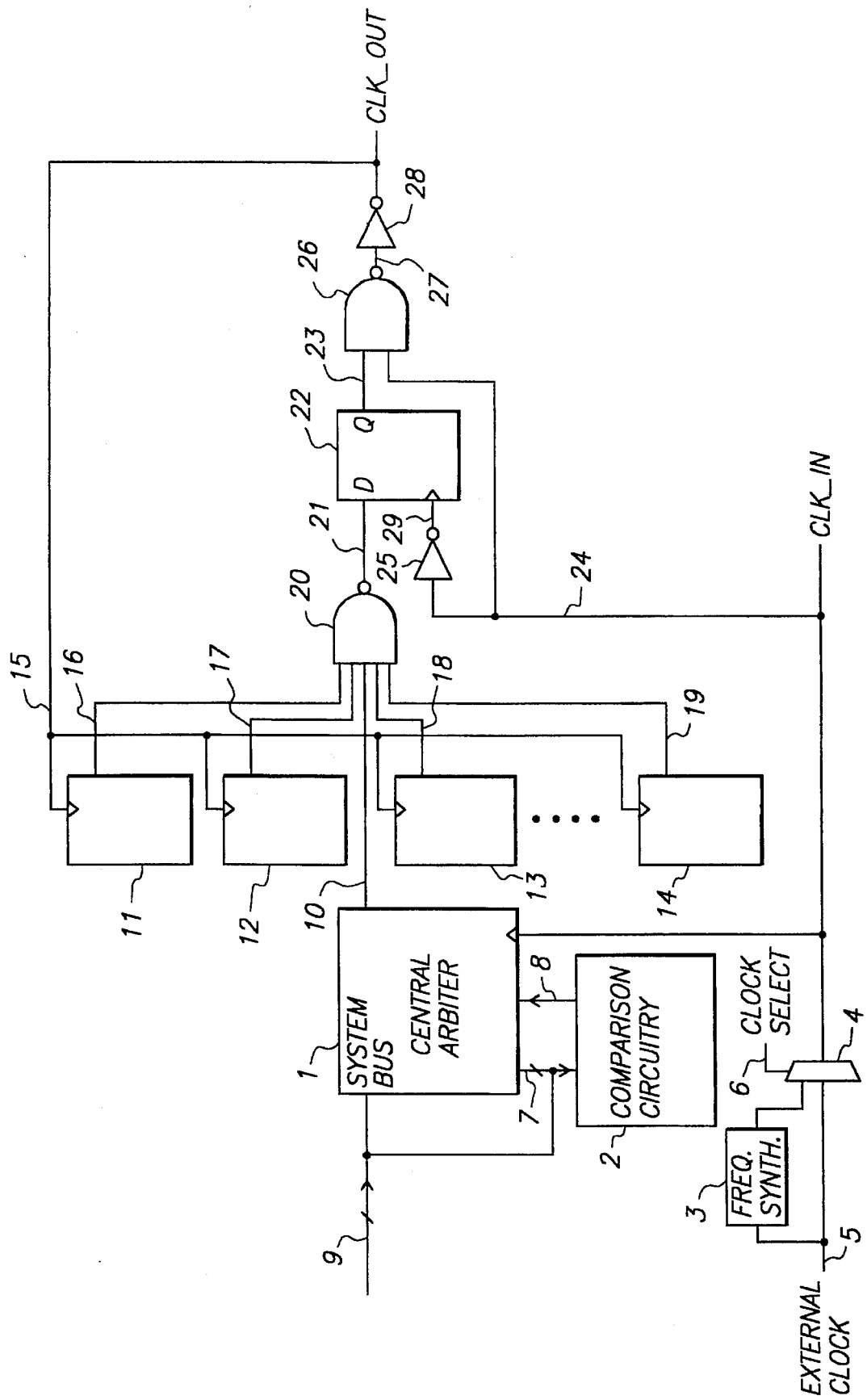
FIG. 1 illustrates a schematic diagram of the low power clocking apparatus of the present invention.

The low power clocking apparatus of the present invention is illustrated in FIG. 1. The clock signal 15 is provided to the sub-circuits 11–14 until they have completed their operations and no longer require the clock signal. The clock signal 15 is disabled when each of the sub-circuits 11–14 raise their respective Kill_Clock signal line outputs 16–19 to a logical high voltage level and the Start_Clock signal line 10 is also at a logical high voltage level, causing the output 21 of the NAND gate 20 to switch from a logical high voltage level to a logical low voltage level. The central arbiter 1 and the comparison circuitry 2 then monitor the system bus 9 for addresses within the range controlled by the central arbiter 1 or for specific commands, whose completion will require the operation of the electronic system or integrated circuit. When an address within the controlled range and a corresponding command is detected, the central arbiter 1 pulls the Start_Clock signal line 10 to a logical low voltage level, causing the output 21 of the NAND gate 20 to switch from a logical low voltage level to a logical high voltage level. The clock signal 15 is then re-enabled to all of the sub-circuits 11–14 and is provided to those circuits until they have all completed their operations and no longer require the clock signal.

The system bus 9 is coupled as an input to the central arbiter 1. The central arbiter 1 is coupled to the comparison circuitry 2 through the address lines 7 which provide the address from the system bus 9 to the comparison circuitry 2. The comparison circuitry 2 is also coupled to the central arbiter 1 through the control line 8 which informs the central arbiter 1 when the address on the address lines 7 is in the range of addresses controlled by the central arbiter 1. The central arbiter 1 is coupled to the NAND gate 20 by the Start_Clock signal line 10 which is used to restore the clock signal to the circuits controlled by the central arbiter 1 after the clock signal 15 has been disabled.

The Kill_Clock line output 16 of the sub-circuit 11 is coupled as an input to the NAND gate 20 to signal when the sub-circuit 11 no longer requires a clock signal. The Kill_Clock line output 17 of the sub-circuit 12 is coupled as an input to the NAND gate 20 to signal when the sub-circuit 12 no longer requires a clock signal. The Kill_Clock line output 18 of the sub-circuit 13 is coupled as an input to the NAND gate 20 to signal when the sub-circuit 13 no longer requires a clock signal. The Kill_Clock line output 19 of the sub-circuit 14 is coupled as an input to the NAND gate 20 to signal when the sub-circuit 14 no longer requires a clock signal. It should be obvious to one of reasonable skill in the art that any number of sub-circuits having a Kill_Clock line output can be coupled as inputs to the NAND gate 20.

The external clock signal 5 is provided as an input to the multiplexer 4 and to the frequency synthesizer 3. The output of the frequency synthesizer is also provided as an input to the multiplexer 4. The clock select signal line 6 is coupled as an input to the multiplexer 4 and can be used to select between the external clock signal 5 or the clock signal which is output from the frequency synthesizer 3. The frequency synthesizer 3 can be used to multiply or divide the external clock signal. In the preferred embodiment of the present invention, the frequency synthesizer multiplies the external clock signal by the value of 7/4.

The output 21 of the NAND gate 20 is coupled to the D input of the flip-flop 22. The output 23 of the flip-flop 22 is coupled as an input to the NAND gate 26. The clock output signal 24 from the multiplexer 4 is provided as an input to the inverter 25 and to the clock signal input of the NAND gate 26. The output signal 29 from the inverter 25 is coupled to the clock input of the flip-flop 22. The output 27 from the NAND gate 26 is coupled to the input of the inverter 28 and the output signal 15 from the inverter 28 is provided as the clock signal input to the sub-circuits 11–14.

The input lines 10 and 16–19 to the NAND gate 20 notify the NAND gate 20 when any of the sub-circuits 11–14 still require the clock signal for their operations. As long as any of the inputs to the NAND gate 20 are at a logical low voltage level the output from the NAND gate 20 will be at a logical high voltage level and the clock signal 15 will be provided to all of the sub-circuits 11–14. As each of the sub-circuits 11–14 complete their operations and no longer require the clock signal 15 they will raise their respective Kill_Clock signal lines 16–19 to a logical high voltage level. Until all of the Kill_Clock signal lines 16–19 have been raised to a logical high voltage level, all of the sub-circuits 11–14 are still provided with the clock signal 15. If one of the sub-circuits 11–14 which has already raised its Kill_Clock signal line to a logical high voltage level is subsequently involved in an operation for which it will need the clock signal 15, then while the clock signal 15 is still active, that sub-circuit can pull its Kill_Clock signal line to a logical low voltage level and keep the clock signal 15 active. As soon as all of the Kill_Clock signal lines 16–19 and the Start_Clock signal line 10 are at a logical high voltage level, the output 21 of the NAND gate 20 switches from a logical high voltage level to a logical low voltage level and the clock signal 15 is then disabled or pulled to a constant logical low voltage level.

The clock signal 15 remains disabled until the central arbiter 1 is notified by the comparison circuitry 2 that any one of the circuits 11–14 will require the clock signal. The comparison circuitry 2 uses the address value on the system bus 9 and compares that address value to lookup tables or to hard-wired internal chip registers to determine if the address value on the system bus 9 is within the range of addresses controlled by the central arbiter 1. If the address value specified on the system bus 9 is within the range of addresses controlled by the central arbiter 1 and a corresponding command is present then the control line 8 is raised to a logical high voltage level and the central arbiter 1 is notified that it should provide a clock signal to the sub-circuits 11–14. The central arbiter 1 then pulls the Start_Clock signal line 10 to a logical low voltage level causing the output of the NAND gate 20 to rise to a logical high voltage level. The clock signal 15 is then re-enabled, or coupled to match the output 24 of the multiplexer 4, and the sub-circuits 11–14 are provided with the clock signal 15. The central arbiter 1 also will re-enable the clock signal 15 when specific commands are present on the system bus 9. In the preferred embodiment of the invention, the central arbiter 1 specifically monitors the system bus 9 for commands involving any bus transactions to a register, including Input/Output Read or Write and Memory Read or Write commands, within the electronic system or integrated circuit or any transaction to circuitry controlled by the system. When an address within the range controlled by the central arbiter 1 and one of these specific commands are detected, then the clock signal 15 will be re-enabled to the sub-circuits 11–14.

Once the command on the system bus 9 is not one of the specific commands that the central arbiter 1 is looking for and the address specified on the system bus 9 is no longer in the address range controlled by the central arbiter 1, the central arbiter 1 will then raise the Start_Clock signal line 10 to a logical high voltage level to signal that it no longer requires the clock signal for any one of the sub-circuits 11–14. The clock signal 15 will remain active however, until all of the sub-circuits 11–14 have completed their tasks and have raised their respective Kill_Clock signal lines 16–19 to a logical high voltage level. The clock signal 15 will then be disabled until the comparison circuitry 2 instructs the central arbiter 1 that the address specified on the system bus 9 is within the range of addresses which the central arbiter 1 is controlling and one of the corresponding commands is detected.

The system bus used in the preferred embodiment of the invention is an ISA bus which has a 16 bit wide data path and a 24 bit wide address bus. The ISA bus is asynchronous and operates with system clock rates from 6 MHz to 12 MHz.

Figure 2:
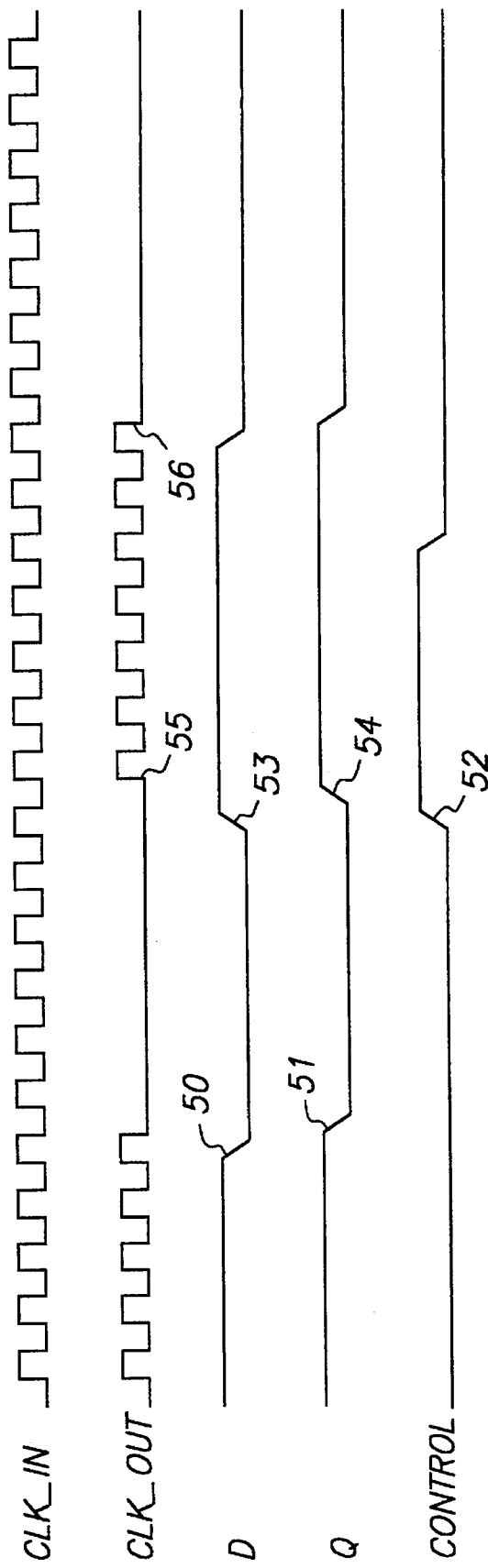
FIG. 2 illustrates a timing diagram of the outgoing clock signal in response to the incoming clock signal, the Kill_Clock signal lines and the control lines.

FIG. 2 illustrates a timing diagram which shows the timing of the operation of the low power clocking apparatus of the present invention. The output clock signal 24 from the multiplexer 4 is illustrated at the top of FIG. 2 by the Clk_in waveform, the clock signal line 15 output from the inverter 28 is illustrated as the Clk_out waveform, the D input to the flip-flop 22 is illustrated as the D waveform, the Q output from the D flip-flop 22 is illustrated as the Q waveform and the control line signal 8 from the comparison circuitry 2 is illustrated as the Control waveform.

Upon startup the integrated circuit of the preferred embodiment is brought up in its low power clock mode, with the clock signal 15 to the sub-circuits 11–14 disabled. When the integrated circuit is required for operation of the system, the central arbiter 1 pulls the Start_Clock signal line 10 to a logical low voltage level, causing the Clk_out signal to be activated and the clock signal 15 to be provided to the sub-circuits 11–14. The central arbiter 1 will then raise the Start_Clock signal line 10 to a logical high voltage level if the address specified on the system bus 9 is not within the range of addresses controlled by the central arbiter 1 and the command on the system bus 9 is not one of the specific commands that the central arbiter 1 is looking for. Then, once the sub-circuits 11–14 have completed their required operations and no longer need the clock signal 15, they each raise their respective Kill_Clock signal lines 16–19 to a logical high voltage level. After all the sub-circuits 11–14 have raised their Kill_Clock signal lines 16–19 to a logical high voltage level, the output 21 of the NAND gate 20 and the D input of the flip-flop 22 switches from a logical high voltage level to a logical low voltage level as is illustrated in FIG. 2 at the time 50. In response to the D input of the flip-flop 22 changing, the Q output of the flip-flop 22 then switches from a logical high voltage level to a logical low voltage level on the next negative clock edge of the Clk_in signal, illustrated in FIG. 2 at the time 51. At this same clock edge, the Clk_out signal is disabled so that the sub-circuits 11–14 are not provided with a clock signal. Because the operation of the flip-flop 22 is controlled by the negative edge of the clock signal Clk_in, the clock signal Clk_out is disabled when it is already at a logical low voltage level, allowing disabling of the clock signal to occur without glitches or noise pulses.

When the Clk_out signal is disabled, the central arbiter 1 and the comparison circuitry 2 continuously monitor all of the addresses and commands on the system bus 9, until one of the addresses within the range controlled by the central arbiter 1 and one of the specific corresponding commands appears on the system bus 9. When an address within the range controlled by the central arbiter 1 and one of the specific commands appears on the system bus 9, the central arbiter 1 pulls the Start_Clock signal line 10 to a logical low voltage level and the Clk_out signal is re-enabled. When one of the addresses within the range controlled by the central arbiter 1 appears on the system bus 9 the comparison circuitry 2 raises the control signal line 8 to a logical high voltage level, as is illustrated at the time 52, notifying the central arbiter 1 an address within its control has been detected. If a corresponding command is also present on the system bus 9, the central arbiter 1 then pulls the Start_Clock signal line 10 to a logical low voltage level and in response, the output 21 of the NAND gate 20 switches from a logical low voltage level to a logical high voltage level, causing the D input to the flip-flop 22 to do the same, as illustrated at the time 53 in FIG. 2. On the next negative clock edge of the Clk_in signal, the Q output from the flip-flop 22 switches from a logical low voltage level to a logical high voltage level, as illustrated at the time 54 in FIG. 2. In response to the Q output of the flip-flop 22 changing, the Clk_out signal will be re-enabled, beginning at the next positive clock edge as illustrated at the time 55. Because the clock signal Clk_out is at a logical low voltage level when the clock signal is disabled, the present invention is designed so that the clock signal will always restart on the next positive edge of the clock signal Clk_in.

The signal Clk_out stays enabled until the central arbiter 1 raises the Start_Clock signal line 10 to a logical high voltage level and all of the sub-circuits 11–14 raise their respective Kill_Clk signal lines 16–19 to a logical high voltage level, signalling that they all have completed their required operations and that they no longer require the clock signal 15. When this happens, the output 21 of the NAND gate 20 switches from a logical high voltage level to a logical low voltage level causing the D input of the flip-flop 22 to do the same. In response to the D input changing, on the next negative clock signal edge, the Q output is pulled to a logical low voltage level and the Clk_out signal is disabled as illustrated in FIG. 2 at the time 56. The clock then remains disabled until the central arbiter 1 pulls the Start_Clock signal line 10 to a logical low voltage level.

After the clock signal 15 to the sub-circuits 11–14 has been disabled, the clock signal 15 cannot be re-enabled and provided to those sub-circuits until the central arbiter 1 pulls the Start_Clock signal line 10 to a logical low voltage level. The sub-circuits 11–14 can only signal that they no longer require the clock signal 15, but cannot signal that they need the clock signal 15, once it has been disabled. Once the clock signal 15 has been disabled, the central arbiter 1 must then monitor the system bus 9 and the comparison circuitry 2 so that it knows when the sub-circuits 11–14 are required for operation and will need the clock signal 15.

In order for the central arbiter 1 and the comparison circuitry to monitor the system bus, they must either be provided with a clock signal at all times or designed to be asynchronous. In the preferred embodiment of the present invention, the output clock signal 24 from the multiplexer 4 is always provided to the inverter 25, to the flip-flop 22 and to the NAND gate 26. The output clock signal 24 from the multiplexer 4 is also coupled to always be provided to the central arbiter 1 for the parts of the central arbiter 1 which are synchronous and require the clock signal in order to monitor the system bus and the comparison circuitry. The comparison circuitry 2 is designed to be asynchronous so that it does not require a clock signal to make its comparisons of the addresses on the system bus 9 and to notify the central arbiter 1 when the address on the system bus 9 is within the range of addresses controlled by the central arbiter 1.

The preferred embodiment of the present invention is incorporated within a PCMCIA Host Adapter.

An Advance Data Sheet, dated October 1993, for PCMCIA Host Adapters, part Nos. CL-PD6710/PD672X, published by Cirrus Logic, Inc. of 3100 West Warren Ave., Fremont, Calif. 94538 which includes the low power clocking apparatus and method of the present invention, is included as Appendix A and attached hereto, beginning at page 12. A VHDL code listing for the preferred embodiment of the central arbiter and the low power clocking apparatus is included as Appendix B and attached hereto as a microfiche appendix.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. For example, the preferred embodiment is directed to a low power clocking apparatus and method for a PCMCIA Host Adapter. However, the low power clocking apparatus and method may be incorporated into any integrated circuit which utilizes a clock signal.

APPENDIX

A

FEATURES

- Single-chip PCMCIA host adapters
- Direct connection to ISA (PC AT) bus
- Direct connection to PCMCIA socket
- Compliant with PCMCIA 2.1 and JEIDA 4.1
- 82365SL-compatible register set, ExCA™-compatible
- Automatic Low-power Dynamic mode for lowest power consumption
- Programmable Suspend mode
- Five programmable memory windows per socket
- Two programmable I/O windows per socket
- Programmable card access cycle timing
- 8- or 16-bit CPU Interface
- 8- or 16-bit PCMCIA interface support
- ATA disk interface support
- DMA support (CL-PD6722)
- Easy host interface using ISA I/O addresses 03E0h and 03E1h
- Mixed-voltage (3.3V or 5V) operation
- Single-socket interface: 144-pin VQFP for smallest form factor (CL-PD6710)
- Dual-socket interface: 208-pin PQFP (CL-PD672X)

PCMCIA Host Adapters

OVERVIEW

The CL-PD6710, CL-PD6720, and CL-PD6722 are single-chip PCMCIA host adapter chips capable of controlling one (CL-PD6710) or two (CL-PD6720 and CL-PD6722) PCMCIA sockets. The chips are fully PCMCIA-2.1 and JEIDA-4.1 compliant and are optimized for use in notebook and handheld computers where reduced form factor and low power consumption are critical design objectives. With the CL-PD6710, a complete PCMCIA solution with power-control logic can occupy as little as 1.5 square inches (excluding the connector). The CL-PD672X enables a complete dual-socket PCMCIA solution with power-control logic in less than 2 square inches (excluding connectors).

The CL-PD6710 and CL-PD672X chips employ energy-efficient mixed-voltage technology that can reduce system power consumption by over 50 percent. The chips also provide a Suspend mode, which stops the internal clock, and an automatic Low-power Dynamic mode, which stops transactions on the PCMCIA bus, stops internal clock distribution, and turns off much of the internal circuitry. *(cont.)*

System Block Diagram

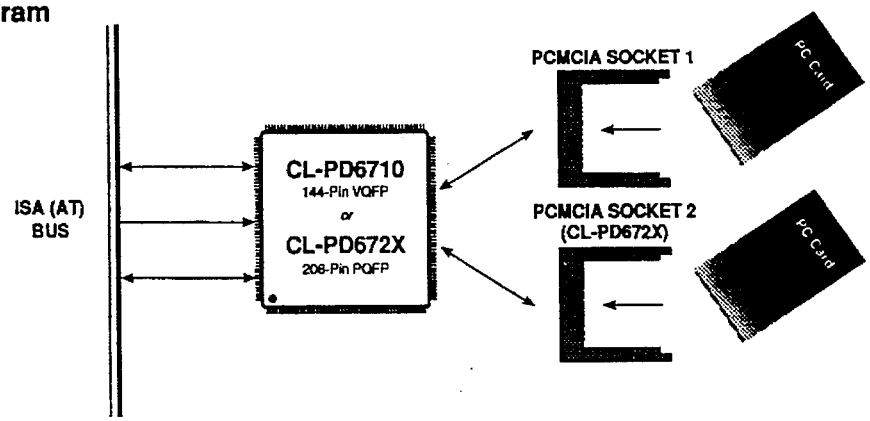

OVERVIEW (cont.)

PC applications typically access PCMCIA cards through the socket/card-services software interface. To assure full compatibility with existing socket/card-services software and PC-card applications, the register set in the CL-PD6710 and CL-PD672X is a superset of the Intel® 82365SL register set.

Both chips provide fully buffered PCMCIA interfaces, meaning that no external logic is required for buffering signals to/from the interface, and power consumption can be controlled by limiting signal transitions on the PCMCIA bus.

| Notebook Computer Design Priorities | Supporting Features |
|---|---|
| ■ Small Form Factor | ❏ Single-chip solutions |
| | ❏ No external buffers for host or socket |
| | ❏ Efficient board layout |
| ■ Minimum Power Consumption | ❏ Automatic Low-power Dynamic mode |
| | ❏ Suspend mode |
| | ❏ Mixed-voltage operation |
| ■ High Performance | ❏ Write cache |
| | ❏ Programmable timing supports more cards, faster reads and writes |
| | ❏ Automatic bus sizing for 8- or 16-bit |
| | ❏ Direct Memory Access (DMA) available with the CL-PD6722 |
| ■ Compatibility | ❏ Compliant with PCMCIA 2.1 and JEIDA 4.1 |
| | ❏ 82365SL A-step register-compatible, ExCA-compatible |

Host Adapter Form Factor

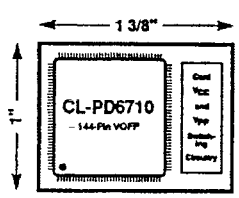
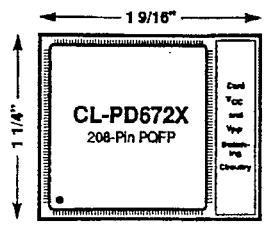

Table of Contents

1. GENERAL CONVENTIONS .................... 5
   1.1 Numeric Naming ........................................ 5
   1.2 Register Description Notation ............................. 5
2. PIN INFORMATION ........................... 7
   2.1 Pin Diagrams ............................................ 7
   2.2 Pin Description .......................................... 9
   2.3 Power-On Configuration Summary .................... 18
3. INTRODUCTION TO THE CL-PD6710 AND CL-PD672X ................................. 19
   3.1 System Architecture ................................... 19
   3.1.1 PCMCIA Basics ....................................... 19
   3.1.2 Windowing ............................................ 19
   3.1.3 Socket Power Management Features ............ 21
   3.1.4 Interrupts ............................................. 21
   3.1.5 Power Management .................................. 21
   3.1.6 Write FIFO ............................................ 23
   3.1.7 Bus Sizing ............................................ 23
   3.1.8 Programmable PCMCIA Timing ..................... 23
   3.1.9 ATA Mode Operation ................................. 24
   3.1.10 DMA Mode Operation for the CL-PD6722 ........ 24
   3.1.11 Selective Data Drive for I/O Windows for the CL-PD6722 ................................. 24
   3.2 Host Access to Registers ............................. 24
   3.3 Power-On Setup ....................................... 25
4. ACCESS REGISTERS ........................ 26
   4.1 Index ................................................... 26
   4.2 Data .................................................... 27
5. CHIP CONTROL REGISTERS ............ 29
   5.1 Chip Revision .......................................... 29
   5.2 Interface Status ....................................... 30
   5.3 Power Control ......................................... 32
   5.4 Interrupt and General Control ....................... 34
   5.5 Card Status Change .................................. 36
   5.6 Management Interrupt Configuration ............... 37
   5.7 Mapping Enable ....................................... 38
6. I/O WINDOW MAPPING REGISTERS 40
   6.1 I/O Window Control ................................... 40
   6.2 I/O Map 0-1 Start Address Low ..................... 41
   6.3 I/O Map 0-1 Start Address High .................... 41
   6.4 I/O Map 0-1 End Address Low ...................... 42
   6.5 I/O Map 0-1 End Address High ..................... 42
   6.6 I/O Map 0-1 Address Offset Low ................... 43
   6.7 I/O Map 0-1 Address Offset High ................... 43
7. MEMORY WINDOW MAPPING REGISTERS ..................................... 44
   7.1 Memory Map 0-4 Start Address Low ............... 44
   7.2 Memory Map 0-4 Start Address High .............. 45
   7.3 Memory Map 0-4 End Address Low ................ 45
   7.4 Memory Map 0-4 End Address High ............... 46
   7.5 Memory Map 0-4 Address Offset Low ............. 47
   7.6 Memory Map 0-4 Address Offset High ............. 47
8. EXTENSION REGISTERS .................. 49
   8.1 Misc Control 1 ......................................... 49
   8.2 FIFO Control .......................................... 50
   8.3 Misc Control 2 ......................................... 51
   8.4 Chip Information ...................................... 53
   8.5 ATA Control ........................................... 53
   8.6 Extension Index (CL-PD6722 only) ................. 55
   8.7 Extension Data (CL-PD6722 only) .................. 55
   8.7.1 Data Mask 0 .......................................... 55
   8.7.2 Data Mask 1 .......................................... 56
   8.7.3 DMA Control .......................................... 56
9. TIMING REGISTERS ......................... 57
   9.1 Setup Timing 0-1 ...................................... 57
   9.2 Command Timing 0-1 ................................. 58
   9.3 Recovery Timing 0-1 .................................. 59
10. ATA MODE OPERATION .................. 60
11. DMA OPERATION (CL-PD6722) ........ 64
    11.1 DMA Capabilities of the CL-PD6722 ............... 64
    11.2 DMA-Type PCMCIA Cycles .......................... 64
    11.3 ISA Bus DMA Handshake Signal ................... 64
    11.4 Configuring the CL-PD6722 Registers for a DMA Transfer ................................. 65
    11.4.1 Programming the DMA Request Pin from the Card ....................................... 65
    11.4.2 Configuring the Socket Interface for I/O ........ 66
    11.4.3 Preventing Dual Interpretation of DMA Handshake Signals ................................. 66
    11.4.4 Turning On DMA System ........................... 67
    11.5 The DMA Transfer Process .......................... 67
    11.6 Terminal Count to Card at Conclusion of Transfer ........................................... 67
12. ELECTRICAL SPECIFICATIONS ....... 68
    12.1 Absolute Maximum Ratings ........................ 68
    12.2 DC Specifications .................................... 68
    12.3 AC Timing Specifications ........................... 72
    12.3.1 Bus Timing — ISA Bus .............................. 73
    12.3.2 Reset Timing ......................................... 75
    12.3.3 Input Clock Specification ........................... 76

| | | |
|---|---|---|
| 12.3.4 | PCMCIA Bus Timing Calculations | 77 |
| 12.3.5 | Bus Timing — PCMCIA Bus | 78 |
| 13. | PAKAGE DIMENSIONS | 87 |
| 13.1 | 144-Pin VQFP Package | 87 |
| 13.2 | 208-Pin PQFP Package | 88 |
| 14. | ORDERING INFORMATION | 89 |
| 15. | REGISTER SUMMARY TABLES | 90 |
| 15.1 | Access Registers | 90 |
| 15.2 | Chip Control Registers | 90 |
| 15.3 | I/O Window Mapping Registers | 92 |
| 15.4 | Memory Window Mapping Registers | 93 |
| 15.5 | Extension Registers | 94 |
| 15.6 | Timing Registers | 96 |
| | Index | 97 |

Document Revision History

Following are major changes between January 1993 and October 1993 versions of this data sheet:

General

A new chip was added: the CL-PD6722.

The CL-PD672X packaging name was changed to PQFP; the physical package is the same.

The chips are also compatible with PCMCIA 2.1.

Section

2.2  SPKR_OUT*/CSEL pin description in Table 2-1 was changed from TO-PU type to IO-PU type.

Addition of the CL-PD6722 chip changed description in Tables 2-1 and 2-2 of the following pins: IRQ9, IRQ10, -VPP_VALID, -REG, -OE, -WE, WP/-IOIS16, -INPACK, and BVD2/-SPKR.

3.1  The typical power consumption values in Table 3-1 were updated (reduced) to more closely reflect expected values.

Sections 3.1.10 and 3.1.11 are new sections describing the CL-PD6722.

5-9  Many indications of Constant bits in registers were changed from "0" to "Scratch Bit".

5  In the Card Status Change register, the Battery Dead/STSCHG Enable bit name was renamed Battery Dead Or Status Change Enable.

8  The Misc Control 2 register bit 6 is not reserved on the CL-PD6722. Its functionality is described.

Sections 8.6 and 8.7 were added to describe CL-PD6722-specific registers.

9  The Setup, Command, and Recovery field names were altered. The default state for the Command Multiplier Value field was corrected. The timing formula for all three timing register sets were reformatted. The timing with 11b Prescaler selected will calculate differently. The formula for Recovery Timing had additional changes.

11  This new chapter describes DMA on the CL-PD6722.

12  Extensive changes were made throughout this chapter. Please review carefully.

1. GENERAL CONVENTIONS

Throughout this document, bits within words and words within various memory spaces are generally started with a '0' as the least-significant bit or word. For example, the least-significant bit of a byte is bit 0, while the most-significant bit is bit 7.

In addition, bit and word number ranges are given with the *most-significant value* on the left. Thus, when discussing a bit field within a register or memory word, the bit number of the most-significant bit is given on the left, followed by a hyphen (-) and the bit number of the least-significant bit, for example: bits 7-0.

A field consists of a set of adjoining bits with common functionality. Registers are made up of fields of one or more bits. The names of all the CL-PD67XX internal registers are bold-faced. For example, Chip Revision and Power Control are register names.

The unit 'K byte' designates 1024 bytes. The unit 'Mbyte' designates 1,048,576 bytes (1024 squared). The unit 'Gbytes' designates 1024 megabytes. The unit 'Hz' designates hertz. The unit 'kHz' designates 1000 hertz. The unit 'MHz' designates 1000 kilohertz. The unit 'ns' designates nanosecond. The unit 'µs' designates microsecond. The unit 'ms' designates millisecond. The unit 'mA' designates milliampere.

1.1 Numeric Naming

Throughout this document, 'CL-PD67XX' means CL-PD6710, CL-PD6720, and CL-PD6722; and 'CL-PD672X' means CL-PD6720 and CL-PD6722.

Hexadecimal numbers are represented with all letters in upper case and a lower-case 'h' is appended to them. For example, '14h', '3A7h', and 'C000h' are hexadecimal numbers.

Binary numbers have the letter 'b' appended to them. In addition, a capital letter 'X' is used within binary numbers to indicate digits *ignored* by the CL-PD67XX within the current context. For example, '101XX01b' is a binary number with bits 3-2 ignored.

Numbers not indicated by an 'h' or 'b' are decimal. Octal numbers are not used.

1.2 Register Description Notation

Reserved and Constant

Throughout this document the word 'Reserved' is used in two ways, described below:

- When a system memory or I/O address is referred to as 'Reserved', it means that writing to that address will be ignored.
- When describing multi-bit register fields (including the values of Index registers), some encodings may be marked Reserved. This indicates that writing that field with the Reserved value will cause the CL-PD67XX to enter an indeterminate state. The system must *not* write fields with values that are Reserved.

There are also bits within the CL-PD67XX registers which are marked 'Constant' and in register summary tables are indicated by a numeral '1' or '0'.

- When registers containing Constant bits are read, the value of the Constant bits may be either a '1' or a '0'. Thus, for determinate software behavior, the values of Constant bits which are read must be masked *before* the value read is used.
- When registers containing Constant bits are written, either the Constant values '1' or '0' must be written to each Constant bit, *as specified in the description of the register containing the bit*. If the incorrect value is written to a Constant bit, the CL-PD67XX will enter an indeterminate state. The system *must* write Constant bits with the specified value.

Read-Only

The word 'Read-only' is used to indicate registers and bits Reserved or Constant for only one type of operation.

- If a Read-only (Reserved-on-write) *register* is written, the register will be ignored.
- If a Read-only (Constant-on-write) *bit* is written with a value other than the value specified, the bit will be ignored.

Bit Descriptions

When used to describe an action taken by the host system, the phrase "the system *sets* a bit" is the same as stating "the system writes the appropriate register with a '*1*' *(one)* in the bit".

Similarly, the phrase "the system *clears* a bit" is the same as stating "the system writes the appropriate register with a '*0*' *(zero)* in the bit".

Bit Naming Conventions

The following keywords are used within bit and bit field names:

| Keyword | Description |
|---|---|
| Enable | Indicates that the function described in the rest of the bit name is *active when the bit is a '1'*. |
| Disable | Indicates that the function described in the rest of the bit name is *active when the bit is a '0'*. |
| Mode | Indicates that the function of the bit alters the interpretation of the values in other registers. |
| Select | Indicates that the bit or field selects between multiple alternatives. Fields that contain *Select* in their names have an indirect mapping between the value of the field and the effect. In particular, the value of multi-bit fields that do not contain *Select* in their names is used directly as a number. |
| Input | Indicates a bit or field which is read from a pin. |
| Output | Indicates a bit or field which is driven to a pin. |
| Status | Indicates either one of two types of bit. Status bits are either read-only bits used by the CL-PD67XX to report information to the system or bits set by the CL-PD67XX in response to an event, and may be cleared by the system. In no case can the system directly cause a Status bit to become a '1'. |

Register Heading Description

Throughout this document, the description of each register starts with a header containing the following information:

| Header Field | Description |
|---|---|
| Index | This is the Index value through which an internal register in an indexed register set is accessed. |
| Register Per | This indicates whether the register is associated with individual sockets, marked 'socket' or whether the register affects both sockets in the CL-PD672X, marked 'chip'. |
| Register Compatibility Type | This indicates whether the register is 82365SL-compatible, marked "365" or a CL-PD67XX extension, marked "ext.". |

2. PIN INFORMATION

The CL-PD6710 chip is packaged as a 144-pin Very tight-pitch Quad Flat Pack (VQFP) component and the CL-PD672X is packaged as a 208-pin Plastic Quad Flat Pack (PQFP, also known as QFP) component. The interface pins on both chips can be divided into three groups:

- ISA interface pins
- PCMCIA socket interface pins
- Power, ground, and Reserved pins Refer to Figure 2–1 for the CL-PD6710 and Figure 2–2 for the CL-PD672X pin diagrams. The pin assignments for all three groups, for both chips, are shown in Table 2–1, Table 2–2, and Table 2–3.

2.1 Pin Diagrams

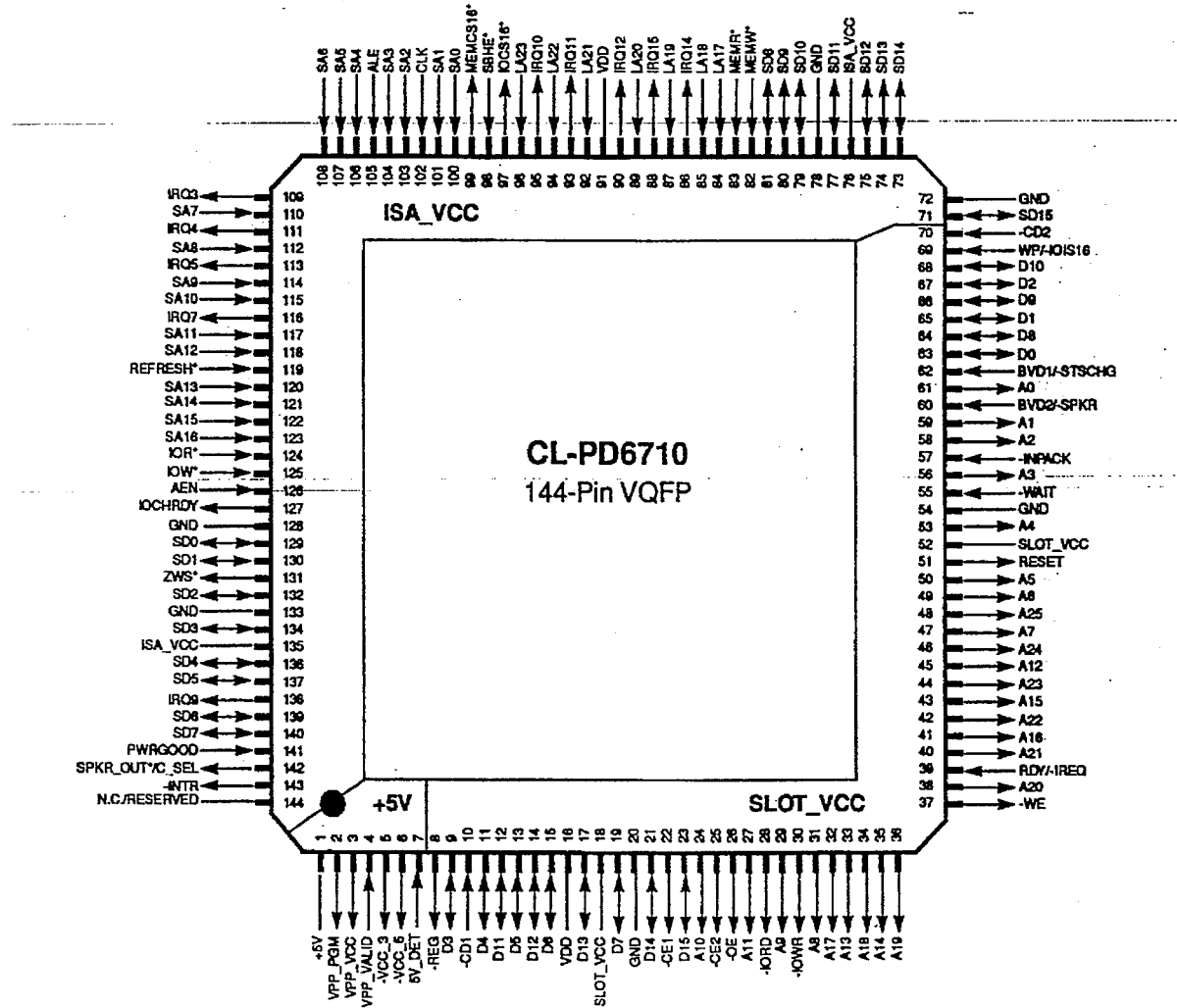

Figure 2–1. CL-PD6710 Pin Diagram (top view, with pin names)

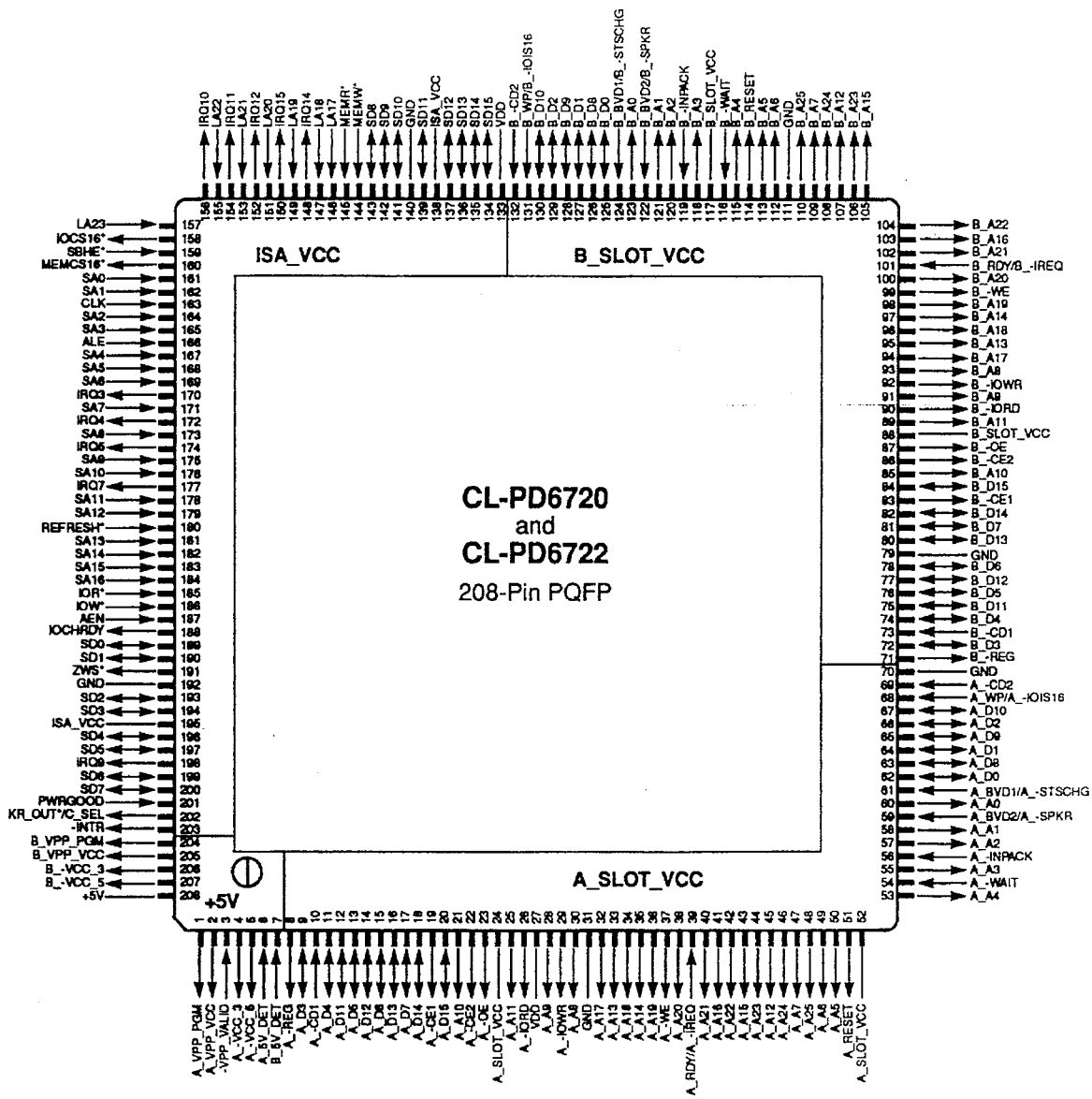
Figure 2–2. CL-PD672X Pin Diagram (top view, with pin names)

2.2 Pin Description

This section describes each CL-PD67XX pin and its use.

The following conventions apply to pin descriptions in this document:

- The CL-PD6710 and CL-PD672X columns show the separate connections on both chips.
- The pin number (pin #) column indicates the package pin that carries the listed signal. Note that multi-pin buses are listed with the first pin number corresponding to the *most-significant* bit of the bus. For example, pin numbers 123-120, 118-117, 115-114, 112, 110, 108-106, 104-103, 101-100 associated with CPU Address inputs SA[16:0] indicate that:
  - SA[16] is pin 123
  - SA[9] is pin 114
  - SA[8] is pin 112
  - SA[1] is pin 101
  - SA[0] is pin 100
- The quantity (qty.) column indicates the number of pins used on each chip.
- The type column describes how each pin is configured for each mode and the corresponding power type. The possible types include:

| Mode Type | Description | Power Type | Outputs Powered By |
|---|---|---|---|
| I | Input pin | 1 | +5V: connects to a +5V power supply |
| I-PU | Input pin with an internal pull-up resistor | 2 | A_SLOT_VCC: connects to PCMCIA pins 17 and 51, Socket A |
| O | Constant-driven, output-only pin | 3 | B_SLOT_VCC: connects to PCMCIA pins 17 and 51, Socket B |
| OD | Open-drain output pin | 4 | ISA_VCC: connects to the ISA bus power supply |
| TO | Three-state output pin | 5 | VDD: connects to the lowest available logic supply; in most systems — 3.3V |
| TO-PU | Three-state output pin with an internal pull-up resistor | | |
| OD-PU | Open-drain output pin with internal pull-up resistor | | |
| PW | Power pin | | |

- The drive column describes the drive capability of the pin. Note that the drive listed for an input (I) pin is N/A (not applicable).
- Colon separated digits [#:#] at the end of a pin name indicate a multi-pin bus.
- An asterisk (*) at the end of a pin name indicates an active-low signal.
- A dash (-) at the beginning of a pin name indicates an active-low signal on the PCMCIA bus.
- Pins marked with a dagger (†) switch between CMOS and TTL levels; all other pins use CMOS levels.

Table 2–1. ISA Interface Pins

| Pin Name | Description | CL-PD6710 | | | | CL-PD672X | | | |
|---|---|---|---|---|---|---|---|---|---|
| | | pin # | qty. | type/pwr. # | drive | pin # | qty. | type/pwr. # | drive |
| LA[23:17] | CPU Address Inputs: Connect to ISA signals LA[23:17] or, for 1-Mbyte address systems, tie ALE high, ground LA[23:20] and connect LA[19:17] to ISA signals SA[19:17]. | 96, 94, 92, 89, 87, 85, 84 | 7 | I/4 | N/A | 157, 155, 153, 151, 149, 147, 146 | 7 | I/4 | N/A |
| SA[16:0] | CPU Address Inputs: Connect to ISA signals SA[16:0]. | 123-120, 118, 117, 115, 114, 112, 110, 108-106, 104, 103, 101, 100 | 17 | I/4 | N/A | 184-181, 179, 178, 176, 175, 173, 171, 169-167, 165, 164, 162, 161 | 17 | I/4 | N/A |
| SD[15:0] | CPU Data I/O: These pins are used to transfer data during a memory or I/O cycle. Connect to ISA signals SD[15:0]. | 71, 73-75, 77, 79-81, 140, 139, 137, 136, 134, 132, 130, 129 | 16 | I/O/4 | 12 mA | 134-137, 139, 141-143, 200, 199, 197, 196, 194, 193, 190, 189 | 16 | I/O/4 | 12 mA |
| SBHE* | Byte High Enable: This input is used in conjunction with SA[0] to specify the width and alignment of a data transfer. Connect to ISA signal SBHE*. | 98 | 1 | I/4 | N/A | 159 | 1 | I/4 | N/A |
| IOR* | I/O Read: This input indicates that a host I/O read cycle is occurring. Connect to ISA signal IOR*. | 124 | 1 | I/4 | N/A | 185 | 1 | I/4 | N/A |
| IOW* | I/O Write: This input indicates that a host I/O write cycle is occurring. Connect to ISA signal IOW*. | 125 | 1 | I/4 | N/A | 186 | 1 | I/4 | N/A |
| MEMR* | Memory Read: This input indicates that a host memory read cycle is occurring. Connect to ISA signal MEMR*. | 83 | 1 | I/4 | N/A | 145 | 1 | I/4 | N/A |
| MEMW* | Memory Write: This input indicates that a host memory write cycle is occurring. Connect to ISA signal MEMW*. | 82 | 1 | I/4 | N/A | 144 | 1 | I/4 | N/A |
| REFRESH* | Refresh: This input indicates a memory refresh cycle is occurring and will cause the CL-PD67XX to ignore memory accesses on the bus. Connect to ISA signal REFRESH*. | 119 | 1 | I/4 | N/A | 180 | 1 | I/4 | N/A |
| ALE | Address Latch Enable: A high on this input indicates a valid memory address on the LA[23:17] bus lines. Connect to ISA signal BALE. | 105 | 1 | I/4 | N/A | 166 | 1 | I/4 | N/A |
| PWRGOOD | Power Good: The CL-PD67XX will be reset when the POWERGOOD input is low. Connect to the POWERGOOD signal from the system power supply. | 141 | 1 | I/4 | N/A | 201 | 1 | I/4 | N/A |

Table 2–1. ISA Interface Pins *(cont.)*

| Pin Name | Description | CL-PD6710 | | | | CL-PD672X | | | |
|---|---|---|---|---|---|---|---|---|---|
| | | pin # | qty. | type/ pwr. # | drive | pin # | qty. | type/ pwr. # | drive |
| AEN | Address Enable: This is an input from the host CPU bus signal that distinguishes between DMA and non-DMA bus cycles. This input should be high for a DMA cycle and will cause the CL-PD67XX to ignore IOR* and IOW*. When CL-PD67XX is in Suspend mode, see Misc Control 2, bit 2 on page 51. Pull this input high during system power-down for lowest power consumption. Connect to ISA signal AEN. | 126 | 1 | I/4 | N/A | 187 | 1 | I/4 | N/A |
| MEMCS16* | Memory Select 16: This output is an acknowledge of 16-bit-wide access support and is generated by the CL-PD67XX when a valid 16-bit-word-accessible memory address has been decoded. Connect to ISA signal MEMCS16*. | 99 | 1 | OD/4 | 16 mA | 160 | 1 | OD/4 | 16 mA |
| IOCS16* | I/O Select 16: This output is an acknowledge for 16-bit-wide access support and is generated by the CL-PD67XX when a valid 16-bit word accessible I/O address has been decoded. Connect to ISA signal IOCS16*. | 97 | 1 | OD/4 | 16 mA | 158 | 1 | OD/4 | 16 mA |
| IOCHRDY | I/O Channel Ready: This output is driven low by the CL-PD67XX to lengthen host cycles. Connect to the ISA bus IOCHRDY signal. | 127 | 1 | TO/4 | 16 mA | 188 | 1 | TO/4 | 16 mA |
| IRQ[14, 11, 7, 5-3] | Interrupt Request: These outputs indicate an interrupt request from one of the cards. As desired, connect to corresponding ISA bus signals. | 86, 93, 116, 113, 111, 109 | 6 | TO/4 | 2 mA | 148, 154, 177, 174, 172, 170 | 6 | TO/4 | 2 mA |
| IRQ9 | Interrupt Request 9: In default mode this output indicates an interrupt request from one of the cards. When the CL-PD6722 is in DMA mode (see Misc Control 2, bit 6), IRQ9 becomes an input and is connected to the DACK* line corresponding to the DREQ that the IRQ10 pin is connected to. In DMA mode this signal is active low. | 138 | 1 | I/TO/4 | 2 mA | 198 | 1 | TO/4 | 2 mA |
| IRQ10 | Interrupt Request 10: In IRQ mode this output indicates an interrupt request from one of the cards. When the CL-PD6722 is in DMA mode (see Misc Control 2, bit 6), IRQ10 is the DREQ to be connected to DREQ0, 1, 2, 3, 5, 6, 7 of the ISA bus. In DMA mode this signal is active high. | 95 | 1 | TO/4 | 2 mA | 156 | 1 | TO/4 | 2 mA |

Table 2–1. ISA Interface Pins *(cont.)*

| Pin Name | Description | CL-PD6710 | | | | CL-PD672X | | | |
|---|---|---|---|---|---|---|---|---|---|
| | | pin # | qty. | type/pwr. # | drive | pin # | qty. | type/pwr. # | drive |
| IRQ12 | Interrupt Request 12: In default IRQ mode this output indicates an interrupt request from one of the cards, and is connected to the ISA bus IRQ12 signal. When Drive LED Enable (see page 51) is set this output becomes an open-drain driver for disk-active LED. | 90 | 1 | TO/4 or OD-PU/4 | 12 mA | 152 | 1 | TO/4 or OD-PU/4 | 12 mA |
| IRQ15 | Interrupt Request 15: In IRQ mode this output indicates an interrupt request from one of the cards. When IRQ15 is RI Out (see page 52) is set to '1', this output is used to resume the CPU using the -RI pin of the 80360SL set. | 88 | 1 | TO/4 | 2 mA | 150 | 1 | TO/4 | 2 mA |
| -INTR | Interrupt: This output indicates a management interrupt. This should be connected to either the system processor's SMI or NMI interrupt input, depending on the type of processor used. | 143 | 1 | TO/4 | 2 mA | 203 | 1 | TO/4 | 2 mA |
| ZWS* | Zero Wait State: This output is connected to the ISA ZWS signal. It is driven low whenever the CL-PD67XX is able to complete the current cycle in zero wait states. | 131 | 1 | OD/4 | 16 mA | 191 | 1 | OD/4 | 16 mA |
| SPKR_OUT*/ C_SEL | Speaker Out/Chip Select: This I/O pin can be used as a digital output to a speaker to allow a system to support PC card, fax/modem/voice, and audio. During reset operations this pin also serves as a chip-configuration input.<br><br>If the level on this pin is low when PWRGOOD rises, the CL-PD6710 is configured to support cards as a PCMCIA Socket 2 device and the CL-PD672X is configured to support cards as PCMCIA Socket 2 and Socket 3 devices.<br><br>If the level on this pin is high when PWRGOOD rises, the CL-PD6710 is configured to support cards as a PCMCIA Socket 0 device and the CL-PD672X is configured to support cards as PCMCIA Socket 0 and Socket 1 devices.<br><br>This pin is internally pulled up during reset so that default configuration of the chip as a Socket 0 (and Socket 1 for CL-PD672X) is facilitated.<br><br>Refer to the Socket Index field on page 26 for more information on chip configuration. | 142 | 1 | IO-PU/4 | 12 mA | 202 | 1 | IO-PU/4 | 12 mA |

Table 2–1. ISA Interface Pins *(cont.)*

| Pin Name | Description | CL-PD6710 | | | | CL-PD672X | | | |
|---|---|---|---|---|---|---|---|---|---|
| | | pin # | qty. | type/ pwr. # | drive | pin # | qty. | type/ pwr. # | drive |
| SPKR_OUT*/ C_CEL *(cont.)* | After reset operations have completed, this pin defaults to high-impedance, and may then be enabled as a totem-pole speaker output by the setting of a card socket's Speaker Enable bit (Misc Control 1 register, bit 4). This output then becomes the negative polarity XOR of each socket's BVD2/-SPKR input that has its Speaker Enable bit set. Refer to the Section 4.1 description of socket index values for more details. | | | | | | | | |
| CLK | Clock: This input is connected to the ISA bus 14.31818-MHz clock. It is used to derive the internal clock used for all socket timing. | 102 | 1 | I/4 | N/A | 163 | 1 | I/4 | N/A |
| -VPP_VALID | In default mode this status input indicates that the $V_{PP}$ power supply is stable. When the CL-PD6722 is in DMA mode (see Misc Control 2, bit 6), this input is connected to the TC (Terminal Count) signal of the ISA bus. In DMA mode, this signal is active high. | 4 | 1 | I/1 | N/A | 3 | 1 | I/1 | N/A |
| ISA_VCC | Host Bus $V_{cc}$ Pin: This supply pin can be set to 3.3V or 5V. The ISA Interface pin group will operate at the voltage applied to this pin independent of the voltage applied to other pin groups. | 76, 135 | 2 | PW | N/A | 138, 195 | 2 | PW | N/A |

Table 2-2. Socket Interface Pins

| Pin Name[1,2] | Description | CL-PD6710 | | | | CL-PD672X | | | |
|---|---|---|---|---|---|---|---|---|---|
| | | pin # | qty. | type/ pwr. # | drive | pin # | qty. | type/ pwr. # | drive |
| -REG | Register Access: During PCMCIA memory cycles, this output chooses between attribute and common memory. During I/O cycles for non-DMA transfers, this signal is active (low). During ATA mode, this signal is always inactive. For DMA cycles on the CL-PD6722 to a DMA-capable card, -REG is inactive during I/O cycles to indicate DACK to the PCMCIA card. | 8 | 1 | TO/2 | 2 mA | 8 – 71 | 2 | TO/ 2or3 | 2 mA |
| A[25:0] | PCMCIA socket address outputs. | 48, 46, 44, 42, 40, 38, 36, 34, 32, 41, 43, 35, 33, 45, 27, 24, 29, 31, 47, 49, 50, 53, 56, 58, 59, 61 | 26 | TO/2 | 2 mA | 48, 46, 44, 42, 40, 38, 36, 34, 32, 41, 43, 35, 33, 45, 25, 21, 28, 30, 47, 49, 50, 53, 55, 57, 58, 60 – 110, 108, 106, 104, 102, 100, 98, 96, 94, 103, 105, 97, 95, 107, 89, 85, 91, 93, 109, 112, 113, 115, 118, 120, 121, 123 | 52 | TO/ 2or3 | 2 mA |
| D[15:0] † | PCMCIA socket data I/O signals. | 23, 21, 17, 14, 12, 68, 66, 64, 19, 15, 13, 11, 9, 67, 65, 63 | 16 | I/O/2 | 2 mA | 20, 18, 16, 14, 12, 67, 65, 63, 17, 15, 13, 11, 9, 66, 64, 62 – 84, 82, 80, 77, 75, 130, 128, 126, 81, 78, 76, 74, 72, 129, 127, 125 | 32 | I/O/ 2or3 | 2 mA |

[1] When a card socket is configured as an ATA drive interface, socket interface pin functions change as outlined in Table 10-1 on page 60.

[2] Note that for all CL-PD672X pin names, A_ and B_ must be prepended to the pin name. For example, A_A[25:0] and B_A[25:0] are the independent address buses to the sockets. Note that A_ pin numbers are listed first.

Table 2–2. Socket Interface Pins *(cont.)*

| Pin Name[1,2] | Description | CL-PD6710 | | | | CL-PD672X | | | |
|---|---|---|---|---|---|---|---|---|---|
| | | pin # | qty. | type/ pwr. # | drive | pin # | qty. | type/ pwr. # | drive |
| -OE | Output Enable: For non-DMA transfers, this output goes active (low) to indicate a memory read from the socket. During a DMA write (when IORD is active) this output will go low when the ISA signal TC is high. During DMA reads (IOWR active), this output will remain high. | 26 | 1 | TO/2 | 2 mA | 23 -- 87 | 2 | TO/ 2or3 | 2 mA |
| -WE | Write Enable: For non-DMA transfers, this signal goes active (low) to indicate a memory write to the socket. During a DMA read (when IOWR is active), this signal will go low when the ISA output TC is high. During DMA writes (IORD active), this output will remain high. | 37 | 1 | TO/2 | 2 mA | 37 -- 99 | 2 | TO/ 2or3 | 2 mA |
| -IORD | I/O Read: This output will be driven low for I/O reads from the socket. | 28 | 1 | TO/2 | 2 mA | 26 -- 90 | 2 | TO/ 2or3 | 2 mA |
| -IOWR | I/O Write: This output will be driven low for I/O writes to the socket. | 30 | 1 | TO/2 | 2 mA | 29 -- 92 | 2 | TO/ 2or3 | 2 mA |
| WP/ -IOIS16 † | Write Protect/ I/O Is 16 Bit: In Memory Card Interface mode (Interrupt and General Control register, bit 5 is equal to a '0'), this input is the status of the PC card write protect switch. In I/O Card Interface mode, this input indicates that the I/O address being accessed is capable of 16-bit operation. In DMA Mode, this pin may be used for the DREQ signal from the PCMCIA DMA-capable card. | 69 | 1 | I-PU/ 2 | N/A | 68 -- 131 | 2 | I-PU/ 2or3 | N/A |
| -INPACK † | Input Acknowledge: This input indicates to the CL-PD67XX that the PC card supports I/O access at the current address. A PC card activates this input during IORD cycles to which the card can respond. In DMA mode, this pin may be used for the DREQ signal from the PCMCIA DMA-capable card. | 57 | 1 | I-PU/ 2 | N/A | 56 -- 119 | 2 | I-PU/ 2or3 | N/A |
| RDY/ -IREQ † | Ready/Interrupt Request: In Memory Card Interface mode, this input indicates to the CL-PD67XX that the card is either ready or busy. In I/O Card Interface mode, this input indicates an interrupt request. | 39 | 1 | I-PU/ 2 | N/A | 39 -- 101 | 2 | I-PU/ 2or3 | N/A |

[1] When a card socket is configured as an ATA drive interface, socket interface pin functions change as outlined in Table 10–1 on page 60.

[2] Note that for all CL-PD672X pin names, A_ and B_ must be prepended to the pin name. For example, A_A[25:0] and B_A[25:0] are the independent address buses to the sockets. Note that A_ pin numbers are listed first.

Table 2–2. Socket Interface Pins *(cont.)*

| Pin Name[1,2] | Description | CL-PD6710 | | | | CL-PD672X | | | |
|---|---|---|---|---|---|---|---|---|---|
| | | pin # | qty. | type/ pwr. # | drive | pin # | qty. | type/ pwr. # | drive |
| -WAIT † | Wait: This input indicates to the CL-PD67XX that the current card access cycle is to be extended. | 55 | 1 | I-PU/ 2 | N/A | 54 -- 116 | 2 | I-PU/ 2or3 | N/A |
| -CD[2:1] | Card Detect: These inputs indicate to the CL-PD67XX the presence of a card in the socket. They are pulled high internally in the chip. | 70, 10 | 2 | I-PU/ 1 | N/A | 69, 10 -- 132, 73 | 4 | I-PU/ 1 | N/A |
| -CE[2:1] | Card Enable: These outputs are driven low by the CL-PD67XX during card access cycles to control byte/word card access. -CE1 enables even-numbered address bytes and -CE2 enables odd-numbered address bytes. When configured for 8-bit cards, only -CE1 will be active and A0 will be used to access odd-numbered bytes. | 25, 22 | 2 | TO/2 | 2 mA | 22, 19 -- 86, 83 | 4 | TO/ 2or3 | 2 mA |
| RESET | This output will be high to reset the card and low for normal operation. To prevent reset glitches to a card, this signal is high-impedance unless a card is fully seated in the socket and card interface signals are enabled. | 51 | 1 | TO/2 | 2 mA | 51 -- 114 | 2 | TO/ 2or3 | 2 mA |
| BVD2/ -SPKR † | Battery Voltage Detect 2/Speaker: In Memory Card Interface mode, this input serves as the BVD2 or battery warning status input. In I/O Card Interface mode, this input can be configured as a card's -SPKR binary audio input. For disk-drive support, BVD2/-SPKR can also be configured as a drive-status LED input. In DMA mode, this pin may be used for the DREQ signal from the PCMCIA DMA-capable card. | 60 | 1 | I-PU/ 2 | N/A | 59 -- 122 | 2 | I-PU/ 2or3 | N/A |
| BVD1/ -STSCHG † | Battery Voltage Detect 1/Status Change: In Memory Card Interface mode, this input serves as the BVD1 or Battery Dead Status. In I/O Card Interface mode, this input is the -STSCHG input, which indicates to the CL-PD67XX that the card's internal status has changed. This input may also be used as -RI ring indicate when IRQ15 is configured for RI Out (see page 52). | 62 | 1 | I-PU/ 2 | N/A | 61 -- 124 | 2 | I-PU/ 2or3 | N/A |

[1] When a card socket is configured as an ATA drive interface, socket interface pin functions change as outlined in Table 10–1 on page 60.

[2] Note that for all CL-PD672X pin names, A_ and B_ must be prepended to the pin name. For example, A_A[25:0] and B_A[25:0] are the independent address buses to the sockets. Note that A_ pin numbers are listed first.

Table 2-2.  Socket Interface Pins (cont.)

| Pin Name[1,2] | Description | CL-PD6710 | | | | CL-PD672X | | | |
|---|---|---|---|---|---|---|---|---|---|
| | | pin # | qty. | type/ pwr. # | drive | pin # | qty. | type/ pwr. # | drive |
| VPP_VCC | This output is used to enable the socket $V_{CC}$ supply onto the $V_{PP}$ pin. This pin is mutually exclusive with VPP_PGM. | 3 | 1 | O/1 | 12 mA | 2 -- 205 | 2 | O/1 | 12 mA |
| VPP_PGM | This output is used to enable the programming voltage supply onto the $V_{PP}$ pin. This pin is mutually exclusive with VPP_VCC. | 2 | 1 | O/1 | 12 mA | 1 -- 204 | 2 | O/1 | 12 mA |
| -VCC_3 | This output is used to enable a 3.3V supply onto the $V_{DD}$ socket. This pin is mutually exclusive with -VCC_5. | 5 | 1 | O/1 | 12 mA | 4 -- 206 | 2 | O/1 | 12 mA |
| -VCC_5 | This output is used to enable a 5V supply onto the $V_{DD}$ socket. This pin is mutually exclusive with -VCC_3. | 6 | 1 | O/1 | 12 mA | 5 -- 207 | 2 | O/1 | 12 mA |
| 5V_DET | 5V Detect: This status input is used to detect 5V/3.3V on PCMCIA pin 57. | 7 | 1 | I-PU/ 1 | N/A | 6 -- 7 | 2 | I-PU/ 1 | N/A |
| SLOT_VCC | This supply pin can be set to 3.3V or 5V. The Socket interface pins will operate at the voltage applied to this pin, independent of the voltage applied to other pin groups. Connect SLOT_VCC to pins 17 and 51 of the PCMCIA socket. | 18, 52 | 2 | PW | N/A | 24, 52 -- 88, 117 | 4 | PW | N/A |

[1] When a card socket is configured as an ATA drive interface, socket interface pin functions change as outlined in Table 10-1 on page 60.
[2] Note that for all CL-PD672X pin names, A_ and B_ must be prepended to the pin name. For example, A_A[25:0] and B_A[25:0] are the independent address buses to the sockets. Note that A_ pin numbers are listed first.

Table 2-3.  Power, Ground Supply, and Reserved Pins

| Pin Name | Description | CL-PD6710 | | | | CL-PD672X | | | |
|---|---|---|---|---|---|---|---|---|---|
| | | pin # | qty. | type | drive | pin # | qty. | type | drive |
| VDD | These $V_{DD}$ supply pins are connected to either 3.3V or 5V. They drive the core of the CL-PD67XX chip. If 3.3V is available in the system, these pins must be connected to 3.3V. | 16, 91 | 2 | PW | N/A | 27, 133 | 2 | PW | N/A |
| GND | The GND pins should be connected to system ground. | 20, 54, 72, 78, 128, 133 | 6 | PW | N/A | 31, 70, 79, 111, 140, 192 | 6 | PW | N/A |
| +5V | This supply pin is connected to 5V, unless 5V is not available in the system. In systems where 5V is not available, this pin is connected to 3.3V. | 1 | 1 | PW | N/A | 208 | 1 | PW | N/A |
| Reserved | Reserved pins are not connected. | 144 | 1 | N/A | N/A | — | 0 | N/A | N/A |

Table 2–4 below summarizes the pin usage for both the CL-PD6710 and CL-PD672X.

Table 2–4. Pin Usage Summary

| Pin Group | Pin Quantity CL-PD6710 | Pin Quantity CL-PD672X |
|---|---|---|
| ISA interface pins | 69 | 69 |
| Socket interface pins | 65 | 130 |
| Power, ground, and Reserved pins | 10 | 9 |
| Total: | 144 | 208 |

2.3 Power-On Configuration Summary

On the rising edge of PWRGOOD, the CL-PD67XX latches the configuration pin SPKR_OUT*/C_SEL to determine which sockets are addressed by this device. A '1' on the SPKR_OUT*/C_SEL pin will cause the device to address Socket 0 (and Socket 1 for the CL-PD672X). A '0' on this pin will cause the device to address Socket 2 (and Socket 3 for the CL-PD672X).

Table 2–5. Chip Configuration at Power-up for Socket Support

| SPKR_OUT*/C_SEL Level at Rising Edge of PWRGOOD | CL-PD6710 | CL-PD672X | |
|---|---|---|---|
| | Socket Interface Support | Socket A Interface Support | Socket B Interface Support |
| High | PCMCIA Socket 0 3E0 Index 00-3Fh | PCMCIA Socket 0 3E0 Index 00-3Fh | PCMCIA Socket 1 3E0 Index 40-7Fh |
| Low | PCMCIA Socket 2 3E0 Index 80-BFh | PCMCIA Socket 2 3E0 Index 80-BFh | PCMCIA Socket 3 3E0 Index C0-FFh |

3. INTRODUCTION TO THE CL-PD6710 AND CL-PD672X

3.1 System Architecture

This section describes PCMCIA basics, windowing, socket power management features, interrupts, power management, write FIFO, bus sizing, programmable PCMCIA timing, and ATA mode operation.

3.1.1 PCMCIA Basics

The PCMCIA 2.1[1] standard enables memory and I/O devices to be inserted as exchangeable peripherals into personal computers (PCs) and handheld computers. To ease end-user and vendor implementation of the standard, it is desirable that systems employing PCMCIA 2.1 be backward-compatible with PC hardware. Attempting to deliver this compatibility poses many difficulties for system designers.

It is desirable to be able to directly address memory cards, which means that when a memory card is installed in the system, its memory must be mapped into the system address space. This is accomplished with 'windowing' (see below), which is similar to expanded memory schemes used previously in PC systems (for example, LIM 4.0 memory manager).

PCMCIA cards can have both *attribute* and *common* memory. Attribute memory is used to indicate to host software the capabilities of the PCMCIA card and to allow host software to change the configuration of the PCMCIA card. Common memory can be used for any purpose that the host software can interpret (flash file system, system memory, floppy emulation, etc.).

It is recommended that I/O cards be accessed as if they were installed on the motherboard. For instance, if a PCMCIA modem card is to be used, it would be highly desirable to have it accessible to standard communications software as if it were COM1 (other COM ports are also possible). This would require that the modem be accessed at I/O Address 3F8h-3FFh. This method of I/O windowing is also handled in a manner similar to memory windowing, described below.

I/O cards typically have interrupts that need to be serviced by host software. In the previous modem application example provided, being accessed as COM1, software will expect the modem to generate interrupts on the IRQ4 line. To accomplish this, interrupt steering has been provided to steer the interrupt from the PCMCIA card to several of the standard PC interrupts (see Interrupt and General Control on page 34).

3.1.2 Windowing

For PC cards to be used with existing software, and to ensure compatibility with future memory cards and software, the CL-PD67XX provides memory and I/O windows in which to map an installed PCMCIA card into system memory and I/O space. Five memory windows and two I/O windows are provided.

Five memory windows allow a memory card to be accessed with four independent windows into common memory, which can be used as expanded-memory-style-compatible windows. The fifth window is then available to access the attribute memory in the card without re-configuring any of the expanded memory windows.

---

[1] The CL-PD67XX is backward-compatible with PCMCIA standards 1.0, 2.0, 2.01, and 2.1 as well as JEIDA 4.1.

Each memory window has several attributes that can be assigned to it, including:

| Attribute | Description |
|---|---|
| Enabled | Each window can be individually enabled. Disabled windows are not responded to. |
| Start Address | The starting address of the window is programmable on 4K byte boundaries starting at 64K byte (1000:0) with a maximum address of 16 Mbyte. |
| End Address | The ending address of the window is programmable on 4K byte boundaries starting at 64K (1000:0) with a maximum address of 16 Mbyte. Only memory accesses between the starting and ending address are responded to. |
| Address Offset | The offset is added to the CPU address in order to compute the address which is used for accessing the PCMCIA card. This allows the addresses in the PCMCIA address space to be different from the CPU address space. |
| Data Size | The size of accesses made in the window can be either 8- or 16-bit. |
| Timing | The timing of accesses (Setup/Command/Recovery) can be set to either of the two timing register sets. |
| Reg. Setting | The -REG pin (see page 14) can be enabled on a per-window basis so that any of the windows can be used for accessing attribute memory. |
| Write Protect | If the window is programmed to be write-protected, then writes to the memory window are ignored (reads are still performed normally). |

Two I/O windows are available to provide accesses to the I/O space of a PCMCIA card. Each I/O window also has several attributes that can be assigned, including:

| Attribute | Description |
|---|---|
| Enabled | Each I/O window can be individually enabled. |
| Start Address | The starting address of the window is programmable on single-byte boundaries from 0 to 64K byte. |
| End Address | The ending address of the window is also programmable on single-byte boundaries from 0 to 64K byte. |
| Address Offset | The offset is added to the CPU address in order to compute the address used for accessing the PCMCIA card. |
| Auto Size | The size of accesses can be made automatically based on the PCMCIA -IOIS16 signal. |
| Data Size | The size of accesses can manually be made either 8- or 16-bit. |
| Timing | The timing of accesses (Setup/Command/Recovery) can be set to either of the two timing register sets. |

Care must be taken to ensure that none of the windows of the CL-PD6710 or CL-PD672X overlap with each other or other devices in the system. This would cause collisions in the IOCS16*, MEMCS16*, IOCHRDY, and SD[15:0] signals (see page 11), resulting in erratic behavior.

3.1.3 Socket Power Management Features

At power-on, and whenever there is no card plugged into a socket, power to the socket is off. When a card is detected (via the Card Detect pins, -CD1 and -CD2, see page 16), one of two things occur. If the CL-PD67XX has been set for automatic power-on, the CL-PD67XX automatically enables the socket $V_{CC}$ (and possibly $V_{pp1}$ and $V_{pp2}$) supplies. If the CL-PD67XX has been configured to cause management interrupts for card-detection events, a management interrupt is generated to inform system software that a card was installed. System software can then initialize the card, or in the case of manual power detection, power-up the socket manually and then initialize it.

When a card is removed from a socket, and if the CL-PD67XX has been configured for automatic power-on, the CL-PD67XX automatically disables $V_{CC}$ and $V_{PP}$ supplies to the socket. The CL-PD67XX can also be configured to cause interrupts to notify software of this event.

3.1.4 Interrupts

Interrupts in PC systems are not generally shared by hardware. Therefore, each device in the system must have a unique interrupt line. Additionally, many software applications are dependent on certain I/O devices having interrupts located at specific interrupt locations. To allow PCMCIA cards with unknown I/O functionality to be connected to appropriate non-conflicting interrupt locations, the CL-PD67XX can steer the interrupt from a PCMCIA card to one of ten different hardware interrupt lines.

For some I/O devices, software can be written so that interrupts can be shared. The CL-PD67XX contains unique logic that allows interrupts to be shared under software control. This is accomplished by programming the CL-PD67XX to pulse the desired interrupt and then three-stating the interrupt line. This unique interrupt technique can be enabled through software so that systems incapable of this compatibility have no loss of functionality.

In addition to normal ISA bus interrupts, a management interrupt is also available. This management interrupt is used by system software to manage the socket itself. There are four management interrupt functions: card insertion/removal recognition and handling, battery warning, status change/battery dead, and card-ready change. The management interrupt can be steered to one of eleven system hardware interrupts, which include the same standard ten for normal interrupts, along with a special interrupt that serves as an SMI, NMI, or some other processor-specific interrupt.

The CL-PD67XX has two dual-function interrupt pins: IRQ12 and IRQ15 (see page 12). In Interrupt mode, both of these pins are used to indicate an interrupt request from a card. IRQ12 can be configured to function as an LED indicator for disk activity from a socket. When configured in LED mode, IRQ12 becomes an open-drain driver for an LED circuit. Similarly, IRQ15 can be configured to function as an RI (ring indicator) output to the 80360 set. When IRQ15 is configured in RI_OUT mode, outputs from the I/O card -STSCHG (pin 63 of the PCMCIA I/O card) are passed through to the IRQ15 pin of the CL-PD67XX.

3.1.5 Power Management

To provide the longest possible battery life, the CL-PD67XX provides many power management features, including: Low-power Dynamic mode, Suspend mode, and control of PCMCIA socket power.

Low-power Dynamic mode is transparent to the ISA bus. After reset, the CL-PD67XX is configured for Low-power Dynamic mode. This mode can be turned off by writing to the Misc Control 2 register (see page 51), resetting bit 1 to a '0'. When in Low-power Dynamic mode, periods of inactivity cause the CL-PD67XX to enter a low-power state where the clock is turned off to most of the chip and the PCMCIA address and data lines are set to a static value. $V_{CC}$ and $V_{PP}$ power to the card is left unchanged. When there is activity present on the PCMCIA bus, or system accesses to chip registers or inserted cards begin, the CL-PD67XX will return from this low-power state to normal operating mode until there is no activity on the PCMCIA bus, or system accesses to chip registers or inserted cards being performed.

A Suspend mode can also be programmed. The CL-PD67XX Suspend mode is the chip's lowest power mode. The CL-PD67XX is put into Suspend mode by writing to the Misc Control 2 register, setting bit 2 to a '1'. In Suspend mode, all the internal clocks are turned off and only access to the Misc Control 2 register is supported. All accesses to the PCMCIA cards are ignored when in Suspend mode. $V_{CC}$ and $V_{PP}$ power to the card is left unchanged (the system power management software is responsible for turning off power to the socket and exiting Suspend mode). Interrupts are passed through to the processor when in Suspend mode. To exit Suspend mode, the Misc Control 2 register, bit 2 must be set to a '0'. It requires 50 ms for the CL-PD67XX to restart the internal clock synthesizer and become active again.

In addition to the software suspend, if the system hold's the AEN signal of the CL-PD67XX high, a Super-suspend mode occurs where ISA inputs to the chip are internally shut off. Internal in the CL-PD67XX, the ISA inputs are ignored and floating conditions on the ISA bus will not cause high current flow in the CL-PD67XX ISA input receivers. Since the ISA bus inputs to the core logic of the CL-PD67XX are also not toggling when AEN is set high, power consumption is further reduced.

The CL-PD67XX power can further be managed by controlling socket power as outlined in Section 3.1.3. Socket power can be turned on and off through software control or automatically when cards are inserted/removed. The CL-PD67XX provides six power control pins per socket for controlling external logic to switch $V_{CC}$ and $V_{PP}$ voltages on and off. Cards can be turned off when they are not in use.

Table 3–1. CL-PD67XX Power-Management Modes

| Mode Name | PWRGOOD Level | AEN | Misc Control 2 Register | | Functionality | Typical Power Consumption |
|---|---|---|---|---|---|---|
| | | | Bit 2 Suspend Mode | Bit 1 Low-power Dynamic Mode | | |
| Low-power Dynamic (Default) | High | Normal | 0 | 1 | Full functionality | < 45 mW high activity, 9-14 mW normal system activity |
| Normal | High | Normal | 0 | 0 | Full functionality | < 85 mW high activity, 18 mW normal system activity |
| Suspend (Software Suspend) | High | Normal | 1 | – | 8-bit access to Misc Control 2 register. No other register access. No card in socket(s). | < 2 mW |
| Super-suspend (Hardware Suspend) | High | Static High | 1 | – | No register access. No card in socket(s). System bus signals disabled. | < 1 mW |
| Reset | Low[a] | – | – | – | No register access. No card in socket(s). System bus signals disabled. | 9-14 mW |

[a] IOR*, IOW*, MEMR*, and MEMW* must be held high when PWRGOOD is low to prevent manufacturing test mode outputs from driving the system data bus.

3.1.6 Write FIFO

To increase performance when writing to PCMCIA cards, a write FIFO is available. Writes will complete in zero wait states until the FIFO is full.

3.1.7 Bus Sizing

The CL-PD6710 and CL-PD672X incorporate logic to automatically detect its connection to 8- or 16-bit buses. This is accomplished by sensing SBHE* input activity. If the SBHE* pin is always high (i.e., tied to ISA_VCC), the CL-PD67XX operates in 8-bit mode where all transfers occur on the lower data bus, bits 7-0. Any occurrence of the SBHE* going low triggers the CL-PD67XX to operate thereafter as a 16-bit device. 16-bit operation of the CL-PD67XX is properly triggered when the SBHE* input is connected to the system's SBHE* signal. When the CL-PD67XX is operating in 16-bit mode, all ISA bus transactions are 16-bit whenever possible, even if installed PC cards only support 8-bit transfers. In 16-bit mode, the signals SBHE* and SA0 are used to specify the width of the data transfer and the location of data on the bus (which byte lane has the data) during 8-bit transfers. The possible combinations for SBHE* and SA0 are as follows:

Table 3-2. 16-Bit Mode Operation

| 16-Bit Mode Transfer Types | SBHE* | SA0 |
|---|---|---|
| Word | 0 | 0 |
| Upper Byte/Odd Address | 0 | 1 |
| Low Byte/Even Address | 1 | 0 |
| Not Valid | 1 | 1 |

Table 3-3. 8-Bit Mode Operation

| 8-Bit Mode Transfer Types[a] | SA0 |
|---|---|
| Even Address | 0 |
| Odd Address | 1 |

[a] The SBHE* signal is pulled up. If the SBHE* signal remains high, the CL-PD67XX causes all transfers to occur on D7-D0 only.

There are typically three types of data transfers to and from the CL-PD67XX, explained below.

- 16-Bit Transfer from 16-Bit Processor — The CPU puts the address on the bus. The CL-PD67XX then identifies the address on the bus as either an 8- or 16-bit transfer. If the transfer is identified as 16-bit, the host acknowledges with the appropriate signal, either MEMCS16* or IOCS16*. Data is transferred to/from the data bus as a word on both byte lanes.

- 8-Bit Transfer from 16-Bit Processor — The CPU puts the address on the bus. The CL-PD67XX then identifies the address on the bus as either an 8- or 16-bit transfer. In this case, the transfer is identified as an 8-bit transfer. The host queries SA0 and SBHE* to determine the byte lane on which the transfer is to occur. The data is transferred to/from the data bus (see Table 3-2).

- 8-Bit Transfer from 8-Bit Processor — The CPU puts the address on the bus. The host determines that it will be an 8-bit transfer since the SBHE* signal has been tied high. The CL-PD67XX queries SA0 to determine if the byte is odd/even. The data is transferred to/from the Data bus (D0-D7).

3.1.8 Programmable PCMCIA Timing

The timing for Setup, Command, and Recovery time for the PCMCIA bus is programmable (see Section 9 on page 57). This allows the CL-PD67XX to be programmed to match the timing requirements of any PCMCIA card. There are two sets of timing registers that can be selected on a per-window basis for both I/O and memory windows.

By setting one of the timing sets for a Recovery time equal to flash memory programming time and utilizing the write FIFO, algorithms can be created to relieve system software of the necessity to do timing loops and allow for flash programming in the background.

To be compatible with the 82365SL, the two timing sets are programmed at the rising edge of PWRGOOD to include normal-wait and one-wait-state timing.

3.1.9 ATA Mode Operation

The CL-PD67XX supports direct connection to AT-attached-interface hard drives. ATA drives use an interface very similar to the IDE interface found on many popular portable computers. In this mode, the address and data conflict with the floppy drive is handled automatically.

3.1.10 DMA Mode Operation for the CL-PD6722

Direct Memory Access (DMA) mode is available on the CL-PD6722 only. To use DMA mode, the Interrupt and General Control register, bit 5 must be set to a '1' to operate the PCMCIA card in I/O Card Interface mode. PCMCIA interface DMA handshake signal options must also be selected. Refer to the description of the DMA Control register on page 56 as well as Chapter 11.

3.1.11 Selective Data Drive for I/O Windows for the CL-PD6722

The CL-PD6722 can be programmed to drive only some of the ISA bus data pins on reads from I/O windows to alleviate data contention for I/O addresses that include more than one peripheral. In the standard IBM® PC AT, I/O map, floppy disk, and hard disk share address 3F7h. The floppy disk drives ISA-data-bus bit 7 on a read from 3F7h, and the hard disk drives bits 6-0. To allow both floppy disk controllers on the motherboard and hard disks on the PCMCIA bus (or vice versa) to coexist, the CL-PD6720 can be programmed through use of its Data Mask registers to disable bit 7 on I/O reads at addresses 3F7h and 377h by programming up I/O windows to these addresses as part of the task of configuring a socket for ATA drive support (see page 55).

3.2 Host Access to Registers

The CL-PD67XX registers are accessed through an 8-bit indexing mechanism. An indexed register scheme allows a large number of internal registers to be accessed by the CPU while using only two I/O addresses.

The Index register (see page 26) is used to specify which of the internal registers the CPU will access next. The value in the Index register is called the Register Index and is the number that specifies a unique internal register. The Data register (see page 27) is used by the CPU to read and write the internal register specified by the Index register.

To access an internal register in an indexed 8-bit register set, the CPU must first write the appropriate Register Index to the Index I/O address. Next, the CPU may read or write the I/O address of the Data register. The CL-PD67XX responds to Data register reads by returning the data stored in the specified internal register to the CPU. The CL-PD67XX responds to Data register writes by storing the data written from the CPU into the specified internal register.

The Index and Data registers are contiguous in the I/O address space and aligned on a 16-bit address boundary. This alignment allows a single 16-bit instruction to be executed by the CPU, simultaneously writing to the Index and Data registers. For this type of write access, the CL-PD67XX guarantees that the 8-bit Register Index contained within the write access will be processed as if it had been written *before* the Data value, when in actuality, both the Index and the Data registers are written simultaneously.

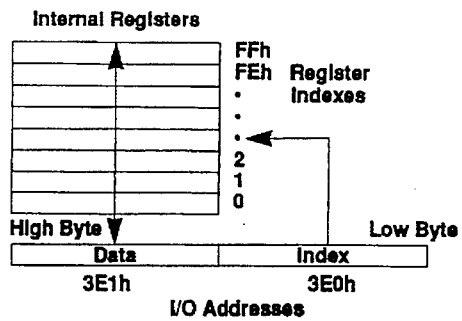

Figure 3–1. Indexed 8-Bit Register Structure

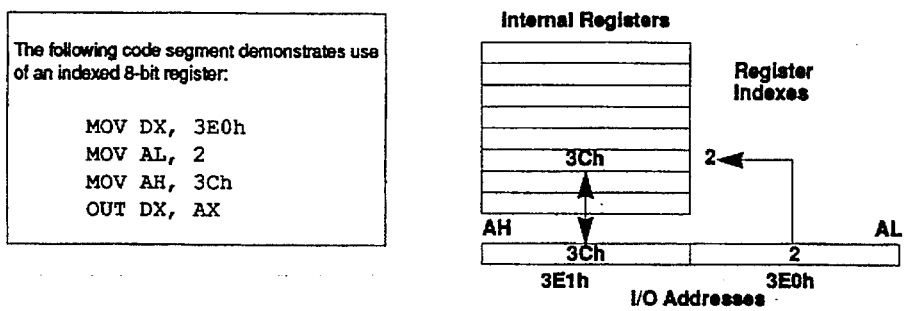

Figure 3–2. Indexed 8-Bit Register Example

3.3 Power-On Setup

Following reset, the CL-PD67XX must be configured by host software. The host software's setup procedure is different depending on its PC system configuration, in particular, the power supply arrangement.

The application of the RESET signal (see page 16) on power-up causes initialization of all the CL-PD67XX register bits and fields to their reset values. Not all registers have reset values; only registers with bits and fields specified to have reset values are initialized.

One bit, which is loaded on hardware reset from the SPKR_OUT*/C_SEL pin (see page 12), is used to determine which socket the CL-PD67XX will respond to.

4. ACCESS REGISTERS

4.1 Index

| Register Name: Index | | | | | | | Register Per: chip |
|---|---|---|---|---|---|---|---|
| Index: N/A | | | | | | | Register Compatibility Type: 365 |
| Bit 7 | Bit 6 | Bit 5 | Bit 4 | Bit 3 | Bit 2 | Bit 1 | Bit 0 |
| Device Index | Socket Index | \multicolumn{6}{c}{Register Index} | | | | | |
| RW:X | RW:X | \multicolumn{6}{c}{RW:XXXXXX} | | | | | |

The Index register is accessed at address 03E0h, and the Data register (see page 27) is accessed at 03E1h.

The value of this register is used by the CL-PD67XX to determine which internal register should be accessed (read or written) in response to each CPU access of the Data register. Each of the four possible PCMCIA sockets is allocated a 64-location internal register address space. The socket register space that will be accessed is determined by the Socket Index and Device Index bits. Similarly, the register within a particular socket's space that will be accessed is determined by the Register Index field (bits 5-0 of this register).

When viewed as an 8-bit value, the contents of this register completely specify a single internal-register byte. For example, when the value of this register is in the range 0h to 3Fh, a Socket 0 register is selected (Socket Index bit is a '0' and Device Index bit is a '0'), and when the value of this register is in the range C0h to FFh, a Socket 3 register is selected (Socket Index bit is a '1' and Device Index bit is a '1').

This register only reads back for Chip 0. Chip 1 will read back only the upper data byte when 16-bit reads occur at 3E0h.

Bits 5-0: Register Index

These bits determine which of the 64 possible socket-specific registers will be accessed when the Data register is next accessed by the processor. Note that some values of the Register Index field are reserved, see Table 4–1.

Bit 6: Socket Index

This bit determines which set of socket-specific registers are currently selected. Note that the CL-PD6710 supports one socket and the CL-PD672X supports two sockets.

Bit 7: Device Index

In systems where two CL-PD67XXs are used, this bit is used to differentiate between them. Table 4–1 shows how the sockets are addressed.

4.2 Data

| Register Name: Data | Register Per: chip |
|---|---|
| Index: N/A | Register Compatibility Type: 365 |

The Data register is accessed at 03E1h. This register allows the internal registers to be read and written. The internal register that is accessed when the CPU reads or writes the Data register is determined by the current value of the Index register, as follows:

Table 4–1. Index Registers

| Register Name | Index | Page Number |
|---|---|---|
| Chip Revision | 0h | 29 |
| Interface Status | 1h | 30 |
| Power Control | 2h | 32 |
| Interrupt and General Control | 3h | 34 |
| Card Status Change | 4h | 36 |
| Management Interrupt Configuration | 5h | 37 |
| Mapping Enable | 6h | 38 |
| I/O Window Control | 7h | 40 |
| I/O Map 0 Start Address Low | 8h | 41 |
| I/O Map 0 Start Address High | 9h | 41 |
| I/O Map 0 End Address Low | Ah | 42 |
| I/O Map 0 End Address High | Bh | 42 |
| I/O Map 1 Start Address Low | Ch | 41 |
| I/O Map 1 Start Address High | Dh | 41 |
| I/O Map 1 End Address Low | Eh | 42 |
| I/O Map 1 End Address High | Fh | 42 |
| Memory Map 0 Start Address Low | 10h | 44 |
| Memory Map 0 Start Address High | 11h | 45 |
| Memory Map 0 End Address Low | 12h | 45 |
| Memory Map 0 End Address High | 13h | 46 |
| Memory Map 0 Address Offset Low | 14h | 47 |
| Memory Map 0 Address Offset High | 15h | 47 |
| Misc Control 1 | 16h | 49 |
| FIFO Control | 17h | 50 |
| Memory Map 1 Start Address Low | 18h | 44 |
| Memory Map 1 Start Address High | 19h | 45 |
| Memory Map 1 End Address Low | 1Ah | 45 |
| Memory Map 1 End Address High | 1Bh | 46 |
| Memory Map 1 Address Offset Low | 1Ch | 47 |

Table 4–1. Index Registers (cont.)

| Register Name | Index | Page Number |
|---|---|---|
| Memory Map 1 Address Offset High | 1Dh | 47 |
| Misc Control 2 | 1Eh | 51 |
| Chip Information | 1Fh | 53 |
| Memory Map 2 Start Address Low | 20h | 44 |
| Memory Map 2 Start Address High | 21h | 45 |
| Memory Map 2 End Address Low | 22h | 45 |
| Memory Map 2 End Address High | 23h | 46 |
| Memory Map 2 Address Offset Low | 24h | 47 |
| Memory Map 2 Address Offset High | 25h | 47 |
| ATA Control | 26h | 53 |
| Reserved | 27h | — |
| Memory Map 3 Start Address Low | 28h | 41 |
| Memory Map 3 Start Address High | 29h | 45 |
| Memory Map 3 End Address Low | 2Ah | 45 |
| Memory Map 3 End Address High | 2Bh | 46 |
| Memory Map 3 Address Offset Low | 2Ch | 47 |
| Memory Map 3 Address Offset High | 2Dh | 47 |
| Extension Index (CL-PD6722 only) | 2Eh | 55 |
| Extension Data (CL-PD6722 only) | 2Fh | 55 |
| Memory Map 4 Start Address Low | 30h | 41 |
| Memory Map 4 Start Address High | 31h | 45 |
| Memory Map 4 End Address Low | 32h | 45 |
| Memory Map 4 End Address High | 33h | 46 |
| Memory Map 4 Address Offset Low | 34h | 47 |
| Memory Map 4 Address Offset High | 35h | 47 |
| I/O Map 0 Address Offset Low | 36h | 43 |
| I/O Map 0 Address Offset High | 37h | 43 |
| I/O Map 1 Address Offset Low | 38h | 43 |
| I/O Map 1 Address Offset High | 39h | 43 |
| Setup Timing 0 | 3Ah | 57 |
| Command Timing 0 | 3Bh | 58 |
| Recovery Timing 0 | 3Ch | 59 |
| Setup Timing 1 | 3Dh | 57 |
| Command Timing 1 | 3Eh | 58 |
| Recovery Timing 1 | 3Fh | 59 |

5. CHIP CONTROL REGISTERS

5.1 Chip Revision

| Register Name: Chip Revision  Index: 0h | | | | | | | Register Per: chip  Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| Interface ID | | 0 | 0 | Revision | | | |
| R:10 | | R:0 | R:0 | R:0010[a] | | | |

[a] Value for the current stepping only.

Bits 3-0: Revision

This field indicates compatibility with the 82365SL.

Bits 7-6: Interface ID

| 00 | I/O only. |
|---|---|
| 01 | Memory only. |
| 10 | Memory and I/O. |
| 11 | Reserved. |

These bits identify what type of interface this controller supports.

5.2 Interface Status

*Register Name:* Interface Status  
*Index:* 1h  
*Register Per:* socket  
*Register Compatibility Type:* 365

| Bit 7 | Bit 6 | Bit 5 | Bit 4 | Bit 3 | Bit 2 | Bit 1 | Bit 0 |
|---|---|---|---|---|---|---|---|
| -VPP_VALID | | RDY | WP | -CD2 | -CD1 | BVD2 | BVD1 |
| $V_{PP}$ Valid | Card Power On | Ready/Busy* | Write Protect | Card Detect | | Battery Voltage Detect | |
| R[a] | R:0 | R[b] | R[c] | R[d] | | R[e] | |

[a] Bit 7 is the inversion of the value of the -VPP_VALID pin (see page 13).
[b] Bit 5 is the value of the RDY/-IREQ pin (see page 15).
[c] Bit 4 is the value of the WP/-IOIS16 pin (see page 15).
[d] Bits 3-2 are the inversion of the values of the -CD1 and -CD2 pins (see page 16).
[e] Bits 1-0 are the values of the BVD1/-STSCHG and BVD2/-SPKR pins (see page 16).

Bits 1-0: Battery Voltage Detect

| BVD2 Input Level | BVD1 Input Level | Bit 0 | Bit 1 | PCMCIA 2.1 Interpretation |
|---|---|---|---|---|
| Low | Low | 0 | 0 | Card data lost |
| Low | High | 0 | 1 | Battery low warning |
| High | Low | 1 | 0 | Card data lost |
| High | High | 1 | 1 | Battery/data okay |

These bits are used by PCMCIA support software and firmware to indicate the amount of capacity left in the battery in battery-backed cards in Memory Card Interface mode only. In I/O Card Interface mode, bit 0 indicates the state of the BVD1/-STSCHG pin (see page 16). Bit 1 status should be ignored in I/O Card Interface mode.

Bits 3-2: Card Detect

| -CD2 Level | -CD1 Level | Bit 3 | Bit 2 | Card Detect Status |
|---|---|---|---|---|
| High | High | 0 | 0 | Either no card or card is not fully inserted |
| High | Low | 0 | 1 | Card is not fully inserted |
| Low | High | 1 | 0 | Card is not fully inserted |
| Low | Low | 1 | 1 | Card is fully inserted |

These bits indicate the state of the -CD1 and -CD2 pins (see page 16).

Bit 4: Write Protect

| 0 | Card is not write protected. |
|---|---|
| 1 | Card is write protected. |

This bit indicates the state of the WP/-IOIS16 pin (see page 15) on the card and has meaning only in Memory Card Interface mode.

Bit 5: Ready/Busy*

| 0 | Card is not ready. |
|---|---|
| 1 | Card is ready. |

This bit indicates the state of the RDY/-IREQ pin (see page 15) on the card. If the card has been configured for I/O, then this bit will not be valid.

Bit 6: Card Power On

| 0 | Power to the card is not on. |
|---|---|
| 1 | Power to the card is on. |

This status bit indicates whether power to the card is on. Refer to the Table 5-1 for details.

Bit 7: $V_{PP}$ Valid

| 0 | This status bit indicates a logic high at the -VPP_VALID pin. |
|---|---|
| 1 | This status bit indicates a logic low at the -VPP_VALID pin. |

This bit indicates the status of the -VPP_VALID pin (see page 13).

5.3 Power Control

| Register Name: Power Control | | | | | | | |
|---|---|---|---|---|---|---|---|
| Index: 2h | | | | | | Register Per: socket | |
| | | | | | | Register Compatibility Type: 365 | |
| Bit 7 | Bit 6 | Bit 5 | Bit 4 | Bit 3 | Bit 2 | Bit 1 | Bit 0 |
| Card Enable | Scratch Bit | Auto-Power | $V_{CC}$ Power | Scratch Bit | Scratch Bit | $V_{pp}1$ Power | |
| RW:0 | RW:0 | RW:0 | RW:0 | RW:0 | RW:0 | RW:00 | |

Table 5-1. Enabling of Socket Power Controls

| PWRGOOD Level | Power Control Register | | -CD1 and -CD2 Both Active Low | Interface Status Register (see page 30) Bit 6: Card Power On | -VCC_3 and -VCC_5 Levels | VPP1_PGM and VPP1_VCC Levels |
|---|---|---|---|---|---|---|
| | Bit 4: $V_{CC}$ Power | Bit 5: Auto-Power | | | | |
| Low | X | X | X | 0 | Inactive high | Inactive low |
| High | 0 | X | X | 0 | Inactive high | Inactive low |
| High | 1 | 0 | X | 1 | Activated per Misc Control 1 register, bit 1 | Activated per Power Control register, bits 1 and 0 |
| High | 1 | 1 | No | 0 | Inactive high | Inactive low |
| High | 1 | 1 | Yes | 1 | Activated per Misc Control 1 register, bit 1 | Activated per Power Control register, bits 1 and 0 |

Table 5-2. Enabling of Outputs to Card Socket

| PWRGOOD Level | -CD1 and -CD2 Both Active Low | Power Control Register | | CL-PD67XX Signal Outputs to Socket |
|---|---|---|---|---|
| | | Bit 4: $V_{CC}$ Power | Bit 7: Card Enable | |
| Low | X | X | X | High impedance |
| High | no | X | X | High impedance |
| High | yes | 0 | 0 | High impedance |
| High | yes | 0 | 1 | Enabled |
| High | yes | 1 | 0 | High impedance |
| High | yes | 1 | 1 | Enabled |

| Bit Name | Value | Description |
|---|---|---|
| $V_{CC}$ Power | 1 | Enables $V_{CC}$ to level described by $V_{CC}$ 3.3V (see page 49) |
| Auto-Power | 1 | Enables Auto-power mode |
| Card Enable | 1 | Enables socket output drivers |

Bits 1-0: $V_{pp}1$ Power

| $V_{pp}1$ Power Bit 1 | Bit 0 | VPP_PGM | VPP_VCC | PCMCIA Intended Socket Function |
|---|---|---|---|---|
| 0 | 0 | Inactive low | Inactive low | Zero volts to PCMCIA socket $V_{pp}1$ pin |
| 0 | 1 | Inactive low | Active high [a] | Selected card $V_{CC}$ to PCMCIA socket $V_{pp}1$ pin |
| 1 | 0 | Active high [a] | Inactive low | +12V to PCMCIA socket $V_{pp}1$ pin |
| 1 | 1 | Inactive low | Inactive low | Zero volts to PCMCIA socket $V_{pp}1$ pin |

[a] Under conditions where $V_{pp}1$ power is activated. See Table 5.3.

These bits are intended to be used to control the power to the $V_{pp}1$ pin of the PCMCIA card.

Bit 4: $V_{CC}$ Power

| 0 | Power is not applied to the card: the -VCC_3 and -VCC_5 socket power control pins are inactive high. |
|---|---|
| 1 | Power is applied to the card: if bit 5 is a '0', or bit 5 is a '1' and -CD2 and -CD1 are active low, then the selected -VCC_3 or -VCC_5 socket power control pin is active low. |

Depending on the value of bit 5 below, setting this bit to a '1' will cause power to be applied to the card. The $V_{CC}$ 3.3V bit (see page 49) determines whether 3.3V or 5V power is applied.

Bit 5: Auto-Power

| 0 | $V_{CC}$ and $V_{pp}1$ power control signals are only activated if the socket's -CD2 and -CD1 inputs are active low. |
|---|---|
| 1 | $V_{CC}$ and $V_{pp}1$ power control signals are activated independent of the socket's -CD2 and -CD1 input levels. |

When this bit is set to a '1', the CL-PD67XX causes power to the card to be turned on and off automatically with the insertion and removal of a PC card from the socket.

Bit 7: Card Enable

| 0 | Outputs to card socket are not enabled and are floating. |
|---|---|
| 1 | Outputs to card socket are enabled if -CD1 and -CD2 are active low and bit 4 is a '1'. |

When this bit is a '1', the outputs to the PCMCIA card are enabled if a card is present and card power is being supplied. The pins affected include: -CE2, -CE1, -IORD, -IOWR, -OE, -REG, RESET, A[25:0], D[15:0], and -WE (see page 14).

5.4 Interrupt and General Control

| Register Name: Interrupt and General Control | | | | | | | Register Per: socket |
|---|---|---|---|---|---|---|---|
| Index: 3h | | | | | | | Register Compatibility Type: 365 |
| Bit 7 | Bit 6 | Bit 5 | Bit 4 | Bit 3 | Bit 2 | Bit 1 | Bit 0 |
| Ring Indicate Enable | Card Reset* | Card Is I/O | Enable Manage Int | IRQ Level | | | |
| RW:0 | RW:0 | RW:0 | RW:0 | RW:0000 | | | |

Bits 3-0: IRQ Level

| 0000 | IRQ disabled |
|---|---|
| 0001 | Reserved |
| 0010 | Reserved |
| 0011 | IRQ 3 |
| 0100 | IRQ 4 |
| 0101 | IRQ 5 |
| 0110 | Reserved |
| 0111 | IRQ 7 |
| 1000 | Reserved |
| 1001 | IRQ 9 (On the CL-PD6722, this output may alternately be used for DMA DACK) |
| 1010 | IRQ 10 (On the CL-PD6722, this output may alternately be used for DMA DREQ) |
| 1011 | IRQ 11 |
| 1100 | IRQ 12 (This output may alternately be used for LED) |
| 1101 | Reserved |
| 1110 | IRQ 14 |
| 1111 | IRQ 15 (This output may alternately be used for ring indicate) |

These bits determine which IRQ will occur when the card causes an interrupt through the RDY/-IREQ pin on the PCMCIA connector.

Bit 4: Enable Manage Int

| 0 | Management IRQ (see page 38) specifies management interrupt bits. |
|---|---|
| 1 | Management interrupts occur on the -INTR line. |

This bit determines how management interrupts will occur.

Bit 5: Card Is I/O

| 0 | Memory Card Interface mode: card socket configured to support memory cards. Dual-function socket interface pins perform memory card-type interface functions. |
|---|---|
| 1 | I/O Card Interface mode: card socket configured to support I/O/memory card-type interface functions. Dual-function socket interface pins perform I/O/memory card-type interface functions. |

This bit determines how dual-function socket interface pins will be used.

Bit 6: Card Reset*

| 0 | The RESET signal to the card socket is set active (high for normal, low for ATA mode). |
|---|---|
| 1 | The RESET signal to the card socket is set inactive (low for normal, high for ATA mode). |

This bit determines whether the RESET signal (see page 16) to the card is active or inactive. When the Card Enable bit (see page 33) is a '0', the RESET signal to the card will be high-impedance. See Chapter 10 for further description of ATA mode functions.

Bit 7: Ring Indicate Enable

| 0 | BVD1/-STSCHG pin is status change function. |
|---|---|
| 1 | BVD1/-STSCHG pin is ring indicate input pin from card. |

This bit determines whether the -STSCHG input pin is used to activate the IRQ15 pin in conjunction with Misc Control 2, IRQ15 Is RI Out (see page 52). This bit has no significance when the card socket is configured for memory card operation.

5.5 Card Status Change

| Register Name: Card Status Change | | | | | | Register Per: socket | |
|---|---|---|---|---|---|---|---|
| Index: 4h | | | | | | Register Compatibility Type: 365 | |
| Bit 7 | Bit 6 | Bit 5 | Bit 4 | Bit 3 | Bit 2 | Bit 1 | Bit 0 |
| 0 | 0 | 0 | 0 | Card Detect Change | Ready Change | Battery Warning Change | Battery Dead Or Status Change |
| R:0 | R:0 | R:0 | R:0 | R:0 | R:0 | R:0 | R:0 |

This register indicates the source of a management interrupt generated by the CL-PD67XX.

NOTE: The corresponding bit in the Management Interrupt Configuration register must be set to a '1' to enable each specific status change detection.

Bit 0: Battery Dead Or Status Change

| 0 | A transition (from high to low for memory card support or either high to low or low to high for I/O card support) on the BVD1/-STSCHG pin has not occurred since this register was last read. |
|---|---|
| 1 | A transition on the BVD1/-STSCHG pin has occurred. |

When the socket is configured for memory card support, this bit is set to a '1' when a BVD1 battery dead high-to-low transition has been detected. When the socket is configured for I/O card support, this bit is set to a '1' when the BVD1/-STSCHG pin (see page 16) changes from either high to low or low to high. This bit is reset to a '0' whenever this register is read. In I/O Card Interface mode, function of this bit is not affected by bit 7 of the Interrupt and General Control register.

Bit 1: Battery Warning Change

| 0 | A transition (from high to low) on the BVD2 pin has not occurred since this register was last read. |
|---|---|
| 1 | A transition on the BVD2 pin has occurred. |

When a socket is configured for memory card support, this bit is set to a '1' when a high-to-low transition on BVD2 occurs indicating a battery warning was detected. This bit should be ignored when the socket is configured for I/O card support. This bit is reset to a '0' whenever this register is read.

Bit 2: Ready Change

| 0 | A transition on the RDY/-IREQ pin has not occurred since this register was last read. |
|---|---|
| 1 | A transition on the RDY/-IREQ pin has occurred. |

When this bit is a '1', a change has occurred in the card RDY/-IREQ pin (see page 15). This bit will always read 0 when the card is configured as an I/O card. This bit is reset to a '0' whenever this register is read.

Bit 3: Card Detect Change

| 0 | A transition on the -CD1 or -CD2 pins has not occurred since this register was last read. |
|---|---|
| 1 | A transition on the -CD1 or -CD2 pins has occurred. |

When this bit is a '1', a change has occurred on the -CD1 or -CD2 pins (see page 16). This bit is reset to a '0' whenever this register is read.

5.6 Management Interrupt Configuration

| Register Name: Management Interrupt Configuration | | | | | | | Register Per: socket |
|---|---|---|---|---|---|---|---|
| Index: 5h | | | | | | | Register Compatibility Type: 365 |
| Bit 7 | Bit 6 | Bit 5 | Bit 4 | Bit 3 | Bit 2 | Bit 1 | Bit 0 |
| Management IRQ | | | | Card Detect Enable | Ready Enable | Battery Warning Enable | Battery Dead Or Status Change Enable |
| RW:0000 | | | | RW:0 | RW:0 | RW:0 | RW:0 |

This register controls which status changes may cause management interrupts and at which pin the management interrupts will appear.

Bit 0: Battery Dead Or Status Change Enable

| 0 | Battery Dead Or Status Change management interrupt disabled. |
|---|---|
| 1 | If Battery Dead Or Status Change is a '1', a management interrupt will occur. |

When this bit is a '1', a management interrupt will occur when the Card Status Change register's Battery Dead Or Status Change bit (see page 36) is a '1'. This allows management interrupts to be generated on changes in level of the BVD1/-STSCHG pin.

Bit 1: Battery Warning Enable

| 0 | Battery Warning Change management interrupt disabled. |
|---|---|
| 1 | If Battery Warning Change is a '1', a management interrupt will occur. |

When this bit is a '1', a management interrupt will occur when the Card Status Change register's Battery Warning Change bit (see page 36) is a '1'. This bit is ignored when the card socket is in I/O mode.

Bit 2: Ready Enable

| 0 | Ready Change management interrupt disabled. |
|---|---|
| 1 | If Ready Change is a '1', a management interrupt will occur. |

When this bit is a '1', a management interrupt will occur when the Card Status Change register's Ready Change bit (see page 36) is a '1'.

Bit 3: Card Detect Enable

| 0 | Card Detect Change management interrupt disabled. |
|---|---|
| 1 | If Card Detect Change is a '1', a management interrupt will occur. |

When this bit is a '1', a management interrupt will occur when the Card Status Change register's Card Detect Change bit (see page 36) is a '1'.

Bits 7-4: Management IRQ

| | |
|---|---|
| 0000 | IRQ disabled |
| 0001 | Reserved |
| 0010 | Reserved |
| 0011 | IRQ 3 |
| 0100 | IRQ 4 |
| 0101 | IRQ 5 |
| 0110 | Reserved |
| 0111 | IRQ 7 |
| 1000 | Reserved |
| 1001 | IRQ 9 |
| 1010 | IRQ 10 |
| 1011 | IRQ 11 |
| 1100 | IRQ 12 (This output may alternately be used for LED) |
| 1101 | Reserved |
| 1110 | IRQ 14 |
| 1111 | IRQ 15 (This output may alternately be used for ring indicate) |

These bits determine which interrupt pin will be used for card status change management interrupts.

5.7 Mapping Enable

| Register Name: Mapping Enable | | | | | | | Register Per: socket |
|---|---|---|---|---|---|---|---|
| Index: 6h | | | | | | | Register Compatibility Type: 365 |
| Bit 7 | Bit 6 | Bit 5 | Bit 4 | Bit 3 | Bit 2 | Bit 1 | Bit 0 |
| I/O Map 1 Enable | I/O Map 0 Enable | MEMCS16 Full Decode | Memory Map 4 Enable | Memory Map 3 Enable | Memory Map 2 Enable | Memory Map 1 Enable | Memory Map 0 Enable |
| RW:0 | RW:0 | RW:0 | RW:0 | RW:0 | RW:0 | RW:0 | RW:0 |

Bit 0: Memory Map 0 Enable

| 0 | Memory Mapping registers for Memory Space 0 disabled. |
|---|---|
| 1 | Memory Mapping registers for Memory Space 0 enabled. |

When this bit is a '1', the Memory Mapping registers for Memory Space 0 will be enabled and the controller will respond to memory accesses in the memory space defined by those registers.

Bit 1: Memory Map 1 Enable

| 0 | Memory Mapping registers for Memory Space 1 disabled. |
|---|---|
| 1 | Memory Mapping registers for Memory Space 1 enabled. |

When this bit is a '1', the Memory Mapping registers for Memory Space 1 will be enabled and the controller will respond to memory accesses in the memory space defined by those registers.

Bit 2: Memory Map 2 Enable

| 0 | Memory Mapping registers for Memory Space 2 disabled. |
|---|---|
| 1 | Memory Mapping registers for Memory Space 2 enabled. |

When this bit is a '1', the Memory Mapping registers for Memory Space 2 will be enabled and the controller will respond to memory accesses in the memory space defined by those registers.

Bit 3: Memory Map 3 Enable

| 0 | Memory Mapping registers for Memory Space 3 disabled. |
|---|---|
| 1 | Memory Mapping registers for Memory Space 3 enabled. |

When this bit is a '1', the Memory Mapping registers for Memory Space 3 will be enabled and the controller will respond to memory accesses in the memory space defined by those registers.

Bit 4: Memory Map 4 Enable

| 0 | Memory Mapping registers for Memory Space 4 disabled. |
|---|---|
| 1 | Memory Mapping registers for Memory Space 4 enabled. |

When this bit is a '1', the Memory Mapping registers for Memory Space 4 will be enabled and the controller will respond to memory accesses in the memory space defined by those registers.

Bit 5: MEMCS16 Full Decode

This bit is not used. All addresses are used to determine the level of MEMCS16*.

Bit 6: I/O Map 0 Enable

| 0 | I/O Mapping registers for I/O Space 0 disabled. |
|---|---|
| 1 | I/O Mapping registers for I/O Space 0 enabled. |

When this bit is a '1', the I/O Mapping registers for I/O Space 0 will be enabled and the controller will respond to I/O accesses in the I/O space defined by those registers.

Bit 7: I/O Map 1 Enable

| 0 | I/O Mapping registers for I/O Space 1 disabled. |
|---|---|
| 1 | I/O Mapping registers for I/O Space 1 enabled. |

When this bit is a '1', the I/O Mapping registers for I/O Space 1 will be enabled and the controller will respond to I/O accesses in the I/O space defined by those registers.

6. I/O WINDOW MAPPING REGISTERS

The I/O windows must never include 3E0h and 3E1h.

6.1 I/O Window Control

| Register Name: I/O Window Control  Index: 7h | | | | | | | Register Per: socket  Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| Timing Register Select 1 | Scratch Bit | Auto-Size I/O Window 1 | I/O Window 1 Size | Timing Register Select 0 | Scratch Bit | Auto-Size I/O Window 0 | I/O Window 0 Size |
| RW:0 | RW:0 | RW:0 | RW:0 | RW:0 | RW:0 | RW:0 | RW:0 |

Bit 0: I/O Window 0 Size

| 0 | 8-bit data path to I/O Window 0. |
|---|---|
| 1 | 16-bit data path to I/O Window 0. |

When bit 1 below is a '0', this bit determines the size of the data path to I/O Window 0. When bit 1 is a '1', this bit is ignored.

Bit 1: Auto-Size I/O Window 0

| 0 | I/O Window 0 Size (see bit 0 above) determines the data path to I/O Window 0. |
|---|---|
| 1 | The data path to I/O Window 0 will be determined based on -IOIS16 returned by the card. |

This bit determines the data path to I/O Window 0. Note that when this bit is a '1', the -IOIS16 signal (see page 15) determines the width of the data path to the card.

Bit 3: Timing Register Select 0

| 0 | Accesses made with timing specified in Timing Set 0. |
|---|---|
| 1 | Accesses made with timing specified in Timing Set 1. |

This bit determines the access timing specification for I/O Window 0 (see page 57).

Bit 4: I/O Window 1 Size

| 0 | 8-bit data path to I/O Window 1. |
|---|---|
| 1 | 16-bit data path to I/O Window 1. |

When bit 5 below is a '0', this bit determines the size of the data path to I/O Window 1. When bit 5 is a '1', this bit is ignored.

Bit 5: Auto-Size I/O Window 1

| 0 | I/O Window 1 Size (see bit 4) determines the data path to I/O Window 1. |
|---|---|
| 1 | The data path to I/O Window 1 will be determined based on -IOIS16 returned by the card. |

This bit determines the width of the data path to I/O Window 1. Note that when this bit is a '1', the -IOIS16 signal (see page 15) determines the window size. This bit must be set for proper ATA mode operation (see Configuring a Socket as an ATA Drive Interface on page 61).

Bit 7: Timing Register Select 1

| 0 | Accesses made with timing specified in Timing Set 0. |
|---|---|
| 1 | Accesses made with timing specified in Timing Set 1. |

This bit determines the access timing specification for I/O Window 1 (see page 57).

6.2 I/O Map 0-1 Start Address Low

| Register Name: I/O Map 0-1 Start Address Low | | | | | | | Register Per: socket |
|---|---|---|---|---|---|---|---|
| Index: 8h, Ch | | | | | | | Register Compatibility Type: 365 |
| Bit 7 | Bit 6 | Bit 5 | Bit 4 | Bit 3 | Bit 2 | Bit 1 | Bit 0 |
| Start Address 7-0 | | | | | | | |
| RW:00000000 | | | | | | | |

There are two separate I/O Map Start Address Low registers, each with identical fields. These registers are located at the following indexes:

| Index | I/O Map Start Address Low |
|---|---|
| 8h | I/O Map 0 Start Address Low |
| Ch | I/O Map 1 Start Address Low |

Bits 7-0: Start Address 7-0

> This register contains the least-significant byte of the address that specifies the beginning of the I/O space within the corresponding I/O map. I/O accesses that are equal or above this address and equal or below the corresponding I/O Map End Address will be mapped into the I/O space of the corresponding PCMCIA card.
>
> The most-significant byte is located in the I/O Map 0-1 Start Address High register (see page 41).

6.3 I/O Map 0-1 Start Address High

| Register Name: I/O Map 0-1 Start Address High | | | | | | | Register Per: socket |
|---|---|---|---|---|---|---|---|
| Index: 9h, Dh | | | | | | | Register Compatibility Type: 365 |
| Bit 7 | Bit 6 | Bit 5 | Bit 4 | Bit 3 | Bit 2 | Bit 1 | Bit 0 |
| Start Address 15-8 | | | | | | | |
| RW:00000000 | | | | | | | |

There are two separate I/O Map Start Address High registers, each with identical fields. These registers are located at the following indexes:

| Index | I/O Map Start Address High |
|---|---|
| 9h | I/O Map 0 Start Address High |
| Dh | I/O Map 1 Start Address High |

Bits 15-8: Start Address 15-8

This register contains the most-significant byte of the Start Address. See the description of the Start Address field associated with bits 7-0 of the I/O Map 0-1 Start Address Low register (see page 41).

6.4 I/O Map 0-1 End Address Low

| Register Name: I/O Map 0-1 End Address Low  Index: Ah, Eh | | | | | | | Register Per: socket  Register Compatibility Type: 365 | |
|---|---|---|---|---|---|---|---|---|
| Bit 7 | Bit 6 | Bit 5 | Bit 4 | Bit 3 | Bit 2 | Bit 1 | Bit 0 |
| End Address 7-0 | | | | | | | | |
| RW:00000000 | | | | | | | | |

There are two separate I/O Map End Address Low registers, each with identical fields. These registers are located at the following indexes:

| Index | I/O Map End Address Low |
|---|---|
| Ah | I/O Map 0 End Address Low |
| Eh | I/O Map 1 End Address Low |

Bits 7-0: End Address 7-0

This register contains the least-significant byte of the address that specifies the termination of the I/O space within the corresponding I/O map. I/O accesses that are equal or below this address and equal or above the corresponding I/O Map Start Address will be mapped into the I/O space of the corresponding PCMCIA card.

The most-significant byte is located in the I/O Map 0-1 End Address High register (see page 42).

6.5 I/O Map 0-1 End Address High

| Register Name: I/O Map 0-1 End Address High  Index: Bh, Fh | | | | | | | Register Per: socket  Register Compatibility Type: 365 | |
|---|---|---|---|---|---|---|---|---|
| Bit 7 | Bit 6 | Bit 5 | Bit 4 | Bit 3 | Bit 2 | Bit 1 | Bit 0 |
| End Address 15-8 | | | | | | | | |
| RW:00000000 | | | | | | | | |

There are two separate I/O Map End Address High registers, each with identical fields. These registers are located at the following indexes:

| Index | I/O Map End Address High |
|---|---|
| Bh | I/O Map 0 End Address High |
| Fh | I/O Map 1 End Address High |

Bits 15-8: End Address 15-8

This register contains the most-significant byte of the End Address. See the description of the End Address field associated with bits 7-0 of the I/O Map 0-1 End Address Low register (see page 42).

6.6 I/O Map 0-1 Address Offset Low

| Register Name: I/O Map 0-1 Address Offset Low | | | | | | | Register Per: socket |
|---|---|---|---|---|---|---|---|
| Index: 36h, 38h | | | | | | | Register Compatibility Type: ext. |
| Bit 7 | Bit 6 | Bit 5 | Bit 4 | Bit 3 | Bit 2 | Bit 1 | Bit 0 |
| Offset Address 7-1 | | | | | | | Scratch Bit |
| RW:0000000 | | | | | | | RW:0 |

There are two separate I/O Map Address Offset Low registers, each with identical fields. These registers are located at the following indexes:

| Index | I/O Map Address Offset Low |
|---|---|
| 36h | I/O Map 0 Address Offset Low |
| 38h | I/O Map 1 Address Offset Low |

Bits 7-1: Offset Address 7-1

This register contains the least-significant byte of the quantity that will be added to the host I/O address; this will determine the PCMCIA card I/O map location where the I/O access will occur.

The most-significant byte is located in the I/O Map 0-1 Address Offset High register (see page 43).

6.7 I/O Map 0-1 Address Offset High

| Register Name: I/O Map 0-1 Address Offset High | | | | | | | Register Per: socket |
|---|---|---|---|---|---|---|---|
| Index: 37h, 39h | | | | | | | Register Compatibility Type: ext. |
| Bit 7 | Bit 6 | Bit 5 | Bit 4 | Bit 3 | Bit 2 | Bit 1 | Bit 0 |
| Offset Address 15-8 | | | | | | | |
| RW:00000000 | | | | | | | |

There are two separate I/O Map Address Offset High registers, each with identical fields. These registers are located at the following indexes:

| Index | I/O Map Address Offset High |
|---|---|
| 37h | I/O Map 0 Address Offset High |
| 39h | I/O Map 1 Address Offset High |

Bits 15-8: Offset Address 15-8

This register contains the most-significant byte of the Offset Address. See the description of the End Address field associated with bits 7-1 of the I/O Map 0-1 Address Offset Low register (see page 43).

7. MEMORY WINDOW MAPPING REGISTERS

The following information about the memory map windows is important:

- The memory window mapping registers determine where in the ISA memory space and PC card memory space accesses will occur. There are five memory windows that can be used independently.
- The memory windows are enabled and disabled using the Mapping Enable register (see page 38).
- To specify where in the ISA space a memory window is mapped, start and end addresses are specified. A memory window is selected whenever the appropriate Memory Map Enable bit (see page 38) is set, and when the ISA address is greater than or equal to the appropriate Memory Map Start Address register (see page 44) and the ISA address is less than or equal to the appropriate Memory Map End Address register (see page 45).
- Start and end addresses are specified with ISA Address bits 23-12. This sets the minimum size of a memory window to 4K bytes. Memory windows are specified in the ISA address from 64K bytes to 16 Mbytes (0010000h-FFFFFFh). Note that no memory window can be mapped in the first 64K bytes of the ISA address space.
- To ensure proper operation, none of the windows can overlap in the ISA address space.

7.1 Memory Map 0-4 Start Address Low

| Register Name: Memory Map 0-4 Start Address Low Index: 10h, 18h, 20h, 28h, 30h | | | | | | | Register Per: socket Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| Start Address 19-12 | | | | | | | |
| RW:00000000 | | | | | | | |

There are five separate Memory Map Start Address Low registers, each with identical fields. These registers are located at the following indexes:

| Index | Memory Map Start Address Low |
|---|---|
| 10h | Memory Map 0 Start Address Low |
| 18h | Memory Map 1 Start Address Low |
| 20h | Memory Map 2 Start Address Low |
| 28h | Memory Map 3 Start Address Low |
| 30h | Memory Map 4 Start Address Low |

Bits 7-0: Start Address 19-12

This register contains the least-significant byte of the address that specifies where in the memory space the corresponding memory map will begin. Memory accesses that are equal or above this address and equal or below the corresponding Memory Map End Address will be mapped into the memory space of the corresponding PCMCIA card.

The most-significant four bits are located in the Memory Map 0-4 Start Address High register (see page 45).

7.2 Memory Map 0-4 Start Address High

| Register Name: Memory Map 0-4 Start Address High | | | | | | Register Per: socket | |
|---|---|---|---|---|---|---|---|
| Index: 11h, 19h, 21h, 29h, 31h | | | | | | Register Compatibility Type: 365 | |
| Bit 7 | Bit 6 | Bit 5 | Bit 4 | Bit 3 | Bit 2 | Bit 1 | Bit 0 |
| Window Data Size | Scratch Bit | Scratch Bit | Scratch Bit | Start Address 23-20 | | | |
| RW:0 | RW:0 | RW:0 | RW:0 | RW:0000 | | | |

There are five separate Memory Map Start Address High registers, each with identical fields. These registers are located at the following indexes:

| Index | Memory Map Start Address High |
|---|---|
| 11h | Memory Map 0 Start Address High |
| 19h | Memory Map 1 Start Address High |
| 21h | Memory Map 2 Start Address High |
| 29h | Memory Map 3 Start Address High |
| 31h | Memory Map 4 Start Address High |

Bits 3-0: Start Address 23-20

This field contains the most-significant four bits of the Start Address. See the description of the Start Address field associated with bits 7-0 of the Memory Map 0-4 Start Address Low register (see page 44).

Bit 7: Window Data Size

| 0 | 8-bit data path to the card. |
|---|---|
| 1 | 16-bit data path to the card. |

This bit determines the data path size to the card.

7.3 Memory Map 0-4 End Address Low

| Register Name: Memory Map 0-4 End Address Low | | | | | | Register Per: socket | |
|---|---|---|---|---|---|---|---|
| Index: 12h, 1Ah, 22h, 2Ah, 32h | | | | | | Register Compatibility Type: 365 | |
| Bit 7 | Bit 6 | Bit 5 | Bit 4 | Bit 3 | Bit 2 | Bit 1 | Bit 0 |
| End Address 19-12 | | | | | | | |
| RW:00000000 | | | | | | | |

There are five separate Memory Map End Address Low registers, each with identical fields. These registers are located at the following indexes:

| Index | Memory Map End Address Low |
|---|---|
| 12h | Memory Map 0 End Address Low |
| 1Ah | Memory Map 1 End Address Low |
| 22h | Memory Map 2 End Address Low |
| 2Ah | Memory Map 3 End Address Low |
| 32h | Memory Map 4 End Address Low |

Bits 7-0: End Address 19-12

This register contains the least-significant byte of the address that specifies where in the memory space the corresponding memory map will end. Memory accesses that are equal or below this address and equal or above the corresponding Memory Map Start Address will be mapped into the memory space of the corresponding PCMCIA card.

The most-significant four bits are located in the Memory Map 0-4 End Address High register (see below).

7.4 Memory Map 0-4 End Address High

| *Register Name:* Memory Map 0-4 End Address High <br> *Index:* 13h, 1Bh, 23h, 2Bh, 33h |||||||| *Register Per:* socket <br> *Register Compatibility Type:* 365 |
|---|---|---|---|---|---|---|---|
| *Bit 7* | *Bit 6* | *Bit 5* | *Bit 4* | *Bit 3* | *Bit 2* | *Bit 1* | *Bit 0* |
| Card Timer Select || Scratch Bit | Scratch Bit | End Address 23-20 ||||
| RW:00 || RW:0 | RW:0 | RW:0000 ||||

There are five separate Memory Map End Address High registers, each with identical fields. These registers are located at the following indexes:

| Index | Memory Map End Address High |
|---|---|
| 13h | Memory Map 0 End Address High |
| 1Bh | Memory Map 1 End Address High |
| 23h | Memory Map 2 End Address High |
| 2Bh | Memory Map 3 End Address High |
| 33h | Memory Map 4 End Address High |

Bits 3-0: End Address 23-20

This field contains the most-significant four bits of the End Address. See the description of the End Address field associated with bits 7-0 of the Memory Map 0-4 End Address Low register (see page 45).

Bits 7-6: Card Timer Select

| 00 | Selects Timer Set 0. |
|---|---|
| 01 | Selects Timer Set 1. |
| 10 | Selects Timer Set 1. |
| 11 | Selects Timer Set 1. |

This field selects the timer set. Timer Set 0 and 1 reset to values compatible with standard ISA and three-wait-state cycles (see page 57).

7.5 Memory Map 0-4 Address Offset Low

| Register Name: Memory Map 0-4 Address Offset Low  Index: 14h, 1Ch, 24h, 2Ch, 34h | | | | | | | Register Per: socket  Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| Offset Address 19-12 | | | | | | | |
| RW:00000000 | | | | | | | |

There are five separate Memory Map Address Offset Low registers, each with identical fields. These registers are located at the following indexes:

| Index | Memory Map Address Offset Low |
|---|---|
| 14h | Memory Map 0 Address Offset Low |
| 1Ch | Memory Map 1 Address Offset Low |
| 24h | Memory Map 2 Address Offset Low |
| 2Ch | Memory Map 3 Address Offset Low |
| 34h | Memory Map 4 Address Offset Low |

Bits 7-0: Offset Address 19-12

>This register contains the least-significant byte of the quantity that will be added to the host memory address that will determine where in the PCMCIA card's memory map the memory access will occur.

>The most-significant six bits are located in the Memory Map 0-4 Address Offset High register (see page 47).

7.6 Memory Map 0-4 Address Offset High

| Register Name: Memory Map 0-4 Address Offset High  Index: 15h, 1Dh, 25h, 2Dh, 35h | | | | | | | Register Per: socket  Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| Write Protect | REG Setting | Offset Address 25-20 | | | | | |
| RW:0 | RW:0 | RW:000000 | | | | | |

There are five separate Memory Map Address Offset High registers, each with identical fields. These registers are located at the following indexes:

| Index | Memory Map Address Offset High |
|---|---|
| 15h | Memory Map 0 Address Offset High |
| 1Dh | Memory Map 1 Address Offset High |
| 25h | Memory Map 2 Address Offset High |
| 2Dh | Memory Map 3 Address Offset High |
| 35h | Memory Map 4 Address Offset High |

Bits 5-0: Offset Address 25-20

This field contains the most-significant six bits of the Offset Address. See the description of the Offset Address field associated with bits 7-0 of the Memory Map 0-4 Address Offset Low register (see page 47).

Bit 6: REG Setting

| 0 | -REG (see page 14) is not active for accesses made through this window. |
|---|---|
| 1 | -REG is active for accesses made through this window. |

This bit determines whether -REG (see page 14) will be active for accesses made through this window. Card Information Structure (CIS) memory is accessed by setting this bit to a '1'.

Bit 7: Write Protect

| 0 | Writes to the card through this window are allowed. |
|---|---|
| 1 | Writes to the card through this window are inhibited. |

This bit determines whether writes to the card through this window are allowed.

8. EXTENSION REGISTERS

8.1 Misc Control 1

| Register Name: Misc Control 1 | | | | | | | Register Per: socket |
|---|---|---|---|---|---|---|---|
| Index: 16h | | | | | | | Register Compatibility Type: ext. |
| Bit 7 | Bit 6 | Bit 5 | Bit 4 | Bit 3 | Bit 2 | Bit 1 | Bit 0 |
| Inpack Enable | Scratch Bit | Scratch Bit | Speaker Enable | Pulse System IRQ | Pulse Management Interrupt | $V_{CC}$ 3.3V | 5V Detect |
| RW:0 | RW:0 | RW:0 | RW:0 | RW:0 | RW:0 | RW:0 | R |

Bit 0: 5V Detect

| 0 | 3.3V card detected. |
|---|---|
| 1 | Old or 5V card detected. |

This bit is connected to PCMCIA pin 43. Cards that will only operate at 3.3V will drive this pin to a '0'. Note that this bit is provided for possible future PCMCIA specifications.

Bit 1: $V_{CC}$ 3.3V

| 0 | -VCC_5 activated when card power is to be applied. |
|---|---|
| 1 | -VCC_3 activated when card power is to be applied. |

This bit determines which output pin is to be used to enable $V_{CC}$ power to the socket when card power is to be applied; it is used in conjunction with bits 5-4 of the Power Control register (see page 32).

Bit 2: Pulse Management Interrupt

| 0 | Interrupts are passed to the -INTR pin as level-sensitive. |
|---|---|
| 1 | When an interrupt occurs, the -INTR pin is driven with the pulse train shown in Figure 8-1 and allows for interrupt sharing. |

This bit selects Level or Pulse mode operation of the -INTR pin (see page 12). Note that a clock must be present on CLK_IN for pulsed interrupts to work.

Figure 8-1. Pulse Mode Interrupts

Bit 3: Pulse System IRQ

| | |
|---|---|
| 0 | Interrupts are passed to the IRQ[XX] pin as level-sensitive. |
| 1 | When an interrupt occurs, the IRQ[XX] pin is driven with the pulse train shown in Figure 8–1 and allows for interrupt sharing. |

This bit selects Level or Pulse mode operation of the IRQ[XX] pins (see page 11).

Bit 4: Speaker Enable

| | |
|---|---|
| 0 | SPKR_OUT* is three-stated. |
| 1 | SPKR_OUT* is driven from the XOR of -SPKR from each enabled socket. |

This bit determines whether the card -SPKR pin will drive SPKR_OUT* (see page 12).

Bit 7: Inpack Enable

| | |
|---|---|
| 0 | -Inpack pin (see page 15) ignored. |
| 1 | -Inpack pin used to control data bus drivers during I/O read from the socket. |

This bit is used to determine when to drive data onto the ISA bus.

8.2 FIFO Control

| Register Name: FIFO Control | | | | | | | Register Per: socket |
|---|---|---|---|---|---|---|---|
| Index: 17h | | | | | | | Register Compatibility Type: ext. |
| Bit 7 | Bit 6 | Bit 5 | Bit 4 | Bit 3 | Bit 2 | Bit 1 | Bit 0 |
| Empty Write FIFO | Scratch Bit | Scratch Bit | Scratch Bit | Scratch Bit | Scratch Bit | Scratch Bit | Scratch Bit |
| RW | RW:0 | RW:0 | RW:0 | RW:0 | RW:0 | RW:0 | RW:0 |

Bit 7: Empty Write FIFO

| Value | I/O Read | I/O Write |
|---|---|---|
| 0 | FIFO not empty | No operation occurs; default on reset |
| 1 | FIFO empty | Flush the FIFO |

This bit controls FIFO operation and reports FIFO status. When this bit is written to a '1', all data in the FIFO is lost. During read operations when this bit is a '1', the FIFO is empty. During read operations when this bit is a '0', data is still in the FIFO. This bit is used to ensure the FIFO is empty before changing timing registers.

FIFO contents will be lost whenever any of the following occur:

- PWRGOOD pin (see page 10) is a '0'.
- The card is removed.
- $V_{CC}$ Power bit (see page 33) is programmed to a '0'.

8.3 Misc Control 2

| Register Name: Misc Control 2 | | | | | | | Register Per: chip |
|---|---|---|---|---|---|---|---|
| Index: 1Eh | | | | | | | Register Compatibility Type: ext. |
| Bit 7 | Bit 6 | Bit 5 | Bit 4 | Bit 3 | Bit 2 | Bit 1 | Bit 0 |
| IRQ15 Is RI Out | DMA System (CL-PD6722) | Three-State Bit 7 | Drive LED Enable | 5V Core | Suspend | Low-Power Dynamic Mode | Bypass Frequency Synthesizer |
| RW:0 | RW:0 | RW:0 | RW:0 | RW:0 | RW:0 | RW:1 | RW:0 |

Bit 0: Bypass Frequency Synthesizer

| 0 | Normal operation, internal clock = CLK input frequency x 7/4. |
|---|---|
| 1 | Internal clock = CLK input frequency (see page 13). |

This bit determines internal time base.

Bit 1: Low-Power Dynamic Mode

| 0 | Clock runs always. |
|---|---|
| 1 | Normal operation, stop clock when possible. |

This bit determines whether Low-power mode is enabled.

Bit 2: Suspend

| 0 | Normal operation. |
|---|---|
| 1 | Stop Frequency Synthesizer, enable all Low-power modes and disable socket access. |

This bit enables Suspend mode. After entering Suspend, AEN should be pulled high for lowest power consumption. When this bit is high and AEN is high, all ISA bus interface inputs are turned off. In 82386SL systems when the processor is in Suspend mode, the ISA bus interface signals float; this feature will prevent high current flow in the CL-PD67XX inputs.

Bit 3: 5V Core

| 0 | Normal operation: use when $V_{DD}$ pin is connected to 3.3 volts. |
|---|---|
| 1 | Selects input thresholds for use when 5.0 volts is connected to the CL-PD67XX $V_{DD}$ pins. |

This bit selects input threshold circuits for use when 3.3 or 5.0 volts is connected to the CL-PD67XX $V_{DD}$ pins. This bit must be set to a '1' when the $V_{DD}$ pins are connected to 5.0 volts to preserve TTL-compatible input thresholds to the card socket.

Bit 4: Drive LED Enable

| 0 | IRQ12 operates normally. |
|---|---|
| 1 | IRQ12 becomes an open-drain output suitable for driving an LED (driven whenever the card -SPKR output is turned on, and the corresponding Speaker Is LED input bit (see page 54) is set). |

NOTE: This bit should be set to a '0' if in Memory Card Interface mode.

This bit determines whether -SPKR is used to drive an LED on the IRQ12 (see page 12) for disk drives.

Bit 5: Three-State Bit 7

| 0 | Normal operation. |
|---|---|
| 1 | For socket I/O at address 03F7h and 0377h, do not drive bit 7. |

This bit enables floppy change bit compatibility.

Bit 6: DMA System (CL-PD6722 only)

| 0 | Configured for non-DMA mode on the CL-PD6722. |
|---|---|
| 1 | Configured for DMA mode on the CL-PD6722. |

This bit is reserved for the CL-PD6710 and CL-PD6720. On the CL-PD6722, this bit is used to configure system interface signals for normal or DMA operation. At reset, the signals IRQ9, IRQ10, and -VPP_VALID are in non-DMA mode, and this bit is set to a '0'. When this bit is set to a '1', the IRQ9, IRQ10, and -VPP_VALID pins are reconfigured for DMA operation. Refer to Chapter 11 for a funtional description of these pins during DMA operation.

Bit 7: IRQ15 Is RI Out

| 0 | Normal IRQ15 operation. |
|---|---|
| 1 | IRQ15 is connected to Ring Indicate pin on the host processor. |

This bit determines the function of the IRQ15 pin. When configured for ring indicate, IRQ15 is used to resume the 82386SL processor when a high-to-low change is detected on the -STSCHG pin.

8.4 Chip Information

| Register Name: Chip Information | | | | | | | Register Per: chip |
|---|---|---|---|---|---|---|---|
| Index: 1Fh | | | | | | | Register Compatibility Type: ext. |
| Bit 7 | Bit 6 | Bit 5 | Bit 4 | Bit 3 | Bit 2 | Bit 1 | Bit 0 |
| Chip Identification | | Dual/Single Slot* | CL-PD67XX Revision Level | | | Scratch Bit | Scratch Bit |
| R:11 | | R[a] | R:111 | | | RW:0 | RW:0 |

[a] The value for CL-PD6710 is a '0', and the value for CL-PD672X is '1'.

Bits 4-2: CL-PD67XX Revision Level

This field identifies the revision of the controller. The initial value is 111b. Contact Cirrus Logic for more information on revision levels for the CL-PD6710, CL-PD6720 and CL-PD6722.

Bit 5: Dual/Single Slot*

| 0 | Chip identified as a single-socket controller. |
|---|---|
| 1 | Chip identified as a dual-socket controller. |

This bit specifies the number of sockets supported by the CL-PD67XX.

Bits 7-6: Chip Identification

| 00 | Second read after I/O write to this register. |
|---|---|
| 11 | First read after I/O write to this register. |

This field identifies the CL-PD67XX device. After chip reset or doing an I/O write to this register, the first read of this register will return a 11b. On the next read, this field will be 00b. This pattern of toggling data on subsequent reads may be used by software to determine presence of the device in a system.

8.5 ATA Control

| Register Name: ATA Control | | | | | | | Register Per: socket |
|---|---|---|---|---|---|---|---|
| Index: 26h | | | | | | | Register Compatibility Type: ext. |
| Bit 7 | Bit 6 | Bit 5 | Bit 4 | Bit 3 | Bit 2 | Bit 1 | Bit 0 |
| A25/CSEL | A24/M/S* | A23/VU | A22 | A21 | Scratch Bit | Speaker Is LED Input | ATA Mode |
| RW:0 | RW:0 | RW:0 | RW:0 | RW:0 | RW:0 | RW:0 | RW:0 |

Bit 0: ATA Mode

| 0 | Normal operation. |
|---|---|
| 1 | Configures the socket interface to handle ATA-type disk drives. |

This bit re-configures the particular socket as an ATA drive interface. Refer to Table 10-1 on page 60 for PCMCIA socket pin definitions in ATA mode.

Bit 1: Speaker Is LED Input

| 0 | Normal operation. |
|---|---|
| 1 | The PCMCIA -SPKR pin will be used to drive IRQ12 if Drive LED Enable (see page 51) is set. |

This bit changes the function of the PCMCIA pin -SPKR (see page 16) from digital speaker input to disk status LED input.

When in I/O Card or ATA mode, setting this bit to a '1' reconfigures the socket BVD2/-SPKR input to serve as a socket's -LED input. In this function, activity on the socket BVD2/-SPKR input affects neither -SPKR_OUT nor IRQ12.

NOTE: This bit should be set to a '0' if in Memory Card Interface mode.

Bit 3: A21

In ATA mode, the value in this bit is applied to the ATA A21 pin and is vendor-specific. Certain ATA drive vendor-specific performance enhancements beyond the PCMCIA 2.1 standard may be controlled through use of this bit.

This bit has no hardware control function when not in ATA mode.

Bit 4: A22

In ATA mode, the value in this bit is applied to the ATA A22 pin and is vendor-specific. Certain ATA drive vendor-specific performance enhancements beyond the PCMCIA 2.1 standard may be controlled through use of this bit.

This bit has no hardware control function when not in ATA mode.

Bit 5: A23/VU

In ATA mode, the value in this bit is applied to the ATA A23 pin and is vendor-specific. Certain ATA drive vendor-specific performance enhancements beyond the PCMCIA 2.1 standard may be controlled through use of this bit.

This bit has no hardware control function when not in ATA mode.

Bit 6: A24/M/S*

In ATA mode, the value in this bit is applied to the ATA A24 pin and is vendor-specific. Certain ATA drive vendor-specific performance enhancements beyond the PCMCIA 2.1 standard may be controlled through use of this bit.

This bit has no hardware control function when not in ATA mode.

Bit 7: A25/CSEL

In ATA mode, the value in this bit is applied to the ATA A25 pin and is vendor-specific. Certain ATA drive vendor-specific performance enhancements beyond the PCMCIA 2.1 standard may be controlled through use of this bit.

This bit has no hardware control function when not in ATA mode.

8.6 Extension Index (CL-PD6722 only)

| Register Name: Extension Index | | | | | | Register Per: socket | |
|---|---|---|---|---|---|---|---|
| Index: 2Eh | | | | | | Register Compatibility Type: ext. | |
| Bit 7 | Bit 6 | Bit 5 | Bit 4 | Bit 3 | Bit 2 | Bit 1 | Bit 0 |
| Extension Register Index | | | | | | | |
| RW:00000000 | | | | | | | |

This register applies to the CL-PD6722 only. It controls which of the following three registers at index 2Fh can be written to:

| Register Name at Index 2Fh | Extension Register Index |
|---|---|
| Data Mask 0 | 01h |
| Data Mask 1 | 02h |
| DMA Control | 03h |

8.7 Extension Data (CL-PD6722 only)

This register applies to the CL-PD6722 only.

8.7.1 Data Mask 0

| Register Name: Data Mask 0 | | | Extension: 01h | | | Register Per: socket | |
|---|---|---|---|---|---|---|---|
| Index: 2Fh | | | | | | Register Compatibility Type: ext. | |
| Bit 7 | Bit 6 | Bit 5 | Bit 4 | Bit 3 | Bit 2 | Bit 1 | Bit 0 |
| Data Mask Select 0 | | | | | | | |
| RW:00000000 | | | | | | | |

On the CL-PD6722, Data Mask 0 is the mask register for I/O Map 0. For each bit set in the Data Mask Select 0 field, the corresponding data bit will not be driven when the host addresses PCMCIA I/O addresses in the I/O Map 0 range. If this register is set to 00h, then all data bits will be driven from the PCMCIA card to the ISA bus (this is the reset condition). If any bits are set to a '1', accesses to the I/O Map 0 range of I/O on the PCMCIA card will be forced to 8-bit operation on the ISA side. If, for example, I/O Map 0 registers are set for the range 3F7h to 3F7h, I/O Map 1 registers are set for the range 3F0h to 3F6h, Data Mask Select 0 is set to 7Fh, and a floppy drive is the PCMCIA device, then the conflict between the floppy address 3F7h and the hard disk register at 3F7h would not cause a conflict on the ISA bus — the floppy change bit would be correctly presented to the host.

8.7.2 Data Mask 1

| Register Name: Data Mask 1 <br> Index: 2Fh | | | Extension: 02h | | | Register Per: socket <br> Register Compatibility Type: ext. | |
|---|---|---|---|---|---|---|---|
| Bit 7 | Bit 6 | Bit 5 | Bit 4 | Bit 3 | Bit 2 | Bit 1 | Bit 0 |
| Data Mask Select 1 ||||||||
| RW:00000000 ||||||||

On the CL-PD6722, the Data Mask 1 register operates the same as the Data Mask 0 register but acts on I/O addresses in the range indicated by the I/O Map 1 registers.

8.7.3 DMA Control

| Register Name: DMA Control <br> Index: 2Fh | | | Extension: 03h | | | Register Per: socket <br> Register Compatibility Type: ext. | |
|---|---|---|---|---|---|---|---|
| Bit 7 | Bit 6 | Bit 5 | Bit 4 | Bit 3 | Bit 2 | Bit 1 | Bit 0 |
| DMA Enable || Disable Socket Pull-Ups | 0 | 0 | 0 | 0 | 0 |
| RW:00 || RW:0 | RW:0 | RW:0 | RW:0 | RW:0 | RW:0 |

Bit 5: Disable Socket Pull-Ups

| 0 | Enable socket pull-ups on the -CD2, -CD1, and 5V_DET pins. |
|---|---|
| 1 | Disable socket pull-ups on the -CD2, -CD1, and 5V_DET pins. |

On the CL-PD6722, this bit can be used in conjunction with suspend actions to further reduce power when a card is installed in the socket. Normally the -CD2, -CD1, and 5V_DET socket interface pins are internally pulled up to the +5V supply pin's level, which is necessary for card insertion and card voltage detection. During conditions such as system power down, where no detection of card insertion is needed, these pull-ups can be turned off.

NOTE: It is recommended that this bit only be set to '1' if a card is present in the socket to prevent floating input conditions on -CD2 and -CD1. When this bit is set to '1', and the management interrupt is configured for Card Detect Enable, management interrupts might also occur if no card is installed.

Bit 7-6: DMA Enable

On the CL-PD6722, DMA Enable bits 6 and 7 enable the DMA operation of the PCMCIA socket. At reset these bits are set to a '0', and this is non-DMA mode. If either or both of these bits is set, the socket is in DMA mode. The three codes that cause DMA mode also select the use of one of three pins for the active-low -DREQ input at the PCMCIA interface.

| Bit 7 | Bit 6 | Pin Used |
|---|---|---|
| 0 | 1 | -INPACK |
| 1 | 0 | WP/-IOIS16 |
| 1 | 1 | BVD2/-SPKR |

For cards requiring DMA services but also needing input acknowledge functionality, or needing to indicate the size of I/O registers within a window, or needing digital speaker or LED operation, the selection of the -DREQ signal to the socket is made to be as flexible as possible.

9. TIMING REGISTERS

The following information about the timing registers is important:

- All timing registers take effect immediately and should only be changed when the FIFO is empty (see the FIFO Control register on page 50).
- Selection of Timing 0 or Timing 1 register sets is controlled by I/O Window Control, bit 3 and/or bit 7 (see page 40).

9.1 Setup Timing 0-1

| Register Name: Setup Timing 0-1<br>Index: 3Ah, 3Dh | | | | | | | Register Per: socket<br>Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| Setup Prescaler Select | | Setup Multiplier Value | | | | | |
| RW:00 | | RW:000001 | | | | | |

There are two separate Setup Timing registers, each with identical fields. These registers are located at the following indexes:

| Index | Setup Timing |
|---|---|
| 3Ah | Setup Timing 0 |
| 3Dh | Setup Timing 1 |

The Setup Timing register for each timing set controls how long a PCMCIA cycle's command (i.e., -OE, -WE, -IORD, -IOWR; see page 15) setup will be, in terms of the number of internal clock cycles.

The overall command setup timing length S is programmed by selecting a 2-bit prescaling value (bits 7-6 of this register) representing weights of 1, 16, 256, or 4096, and then selecting a multiplier value (bits 5-0) to which that prescaler is multiplied to produce the overall command setup timing length according to the following formula:

$$S = (N_{pres} \times N_{val}) + 1$$

The value of S, representing the number of clock cycles for command setup, is then multiplied by the clock period to determine the actual command setup time (see Section 12.3.4 for further discussion).

Bits 5-0: Setup Multiplier Value

This field indicates an integer value $N_{val}$ from 0 to 63; it is combined with a prescaler value (bits 7-6) to control the length of setup time before a command becomes active.

Bits 7-6: Setup Prescaler Select

| 00 | $N_{pres} = 1$ |
|---|---|
| 01 | $N_{pres} = 16$ |
| 10 | $N_{pres} = 256$ |
| 11 | $N_{pres} = 4096$ |

This field chooses one of four prescaler values $N_{pres}$ that are combined with the value of the Setup Multiplier Value (bits 5-0) to control the length of setup time before a command becomes active.

9.2 Command Timing 0-1

| Register Name: Command Timing 0-1 | | | | | | | Register Per: socket |
|---|---|---|---|---|---|---|---|
| Index: 3Bh, 3Eh | | | | | | | Register Compatibility Type: 365 |
| Bit 7 | Bit 6 | Bit 5 | Bit 4 | Bit 3 | Bit 2 | Bit 1 | Bit 0 |
| Command Prescaler Select | | Command Multiplier Value | | | | | |
| RW:00 | | RW:001111/000110[a] | | | | | |

[a] Timing set 0 (index 3Bh) resets to 06h for socket timing equal to standard AT-bus-based cycle times. Timing set 1 (3Eh) resets to 0Fh for socket timings equal to standard AT-bus timing using one additional wait state.

There are two separate Command Timing registers, each with identical fields. These registers are located at the following indexes:

| Index | Command Timing |
|---|---|
| 3Bh | Command Timing 0 |
| 3Eh | Command Timing 1 |

The Command Timing register for each timing set controls how long a PCMCIA cycle's command (i.e., -OE, -WE, -IORD, -IOWR; see page 15) active time will be, in terms of the number of internal clock cycles.

The overall command timing length C is programmed by selecting a 2-bit prescaling value (bits 7-6 of this register) representing weights of 1, 16, 256, or 4096, and then selecting a multiplier value (bits 5-0) to which that prescaler is multiplied to produce the overall command timing length according to the following formula:

$$C = (N_{pres} \times N_{val}) + 1$$

The value of C, representing the number of clock cycles for a command, is then multiplied by the clock period to determine the actual command active time (see Section 12.3.4 for further discussion).

Bits 5-0: Command Multiplier Value

This field indicates an integer value $N_{val}$ from 0 to 63; it is combined with a prescaler value (bits 7-6) to control the length that a command is active.

Bits 7-6: Command Prescaler Select

| 00 | $N_{pres} = 1$ |
|---|---|
| 01 | $N_{pres} = 16$ |
| 10 | $N_{pres} = 256$ |
| 11 | $N_{pres} = 4096$ |

This field chooses one of four prescaler values $N_{pres}$ that are combined with the value of the Command Multiplier Value (bits 5-0) to control the length that a command is active.

9.3 Recovery Timing 0-1

| Register Name: Recovery Timing 0-1 | | | | | | | Register Per: socket |
|---|---|---|---|---|---|---|---|
| Index: 3Ch, 3Fh | | | | | | | Register Compatibility Type: 365 |
| Bit 7 | Bit 6 | Bit 5 | Bit 4 | Bit 3 | Bit 2 | Bit 1 | Bit 0 |
| Recovery Prescaler Select | | Recovery Multiplier Value | | | | | |
| RW:00 | | RW:000000 | | | | | |

There are two separate Recover Timing registers, each with identical fields. These registers are located at the following indexes:

| Index | Recovery Timing |
|---|---|
| 3Ch | Recovery Timing 0 |
| 3Fh | Recovery Timing 1 |

The Recovery Timing register for each timing set controls how long a PCMCIA cycle's command (i.e., -OE, -WE, -IORD, -IOWR; see page 15) recovery will be, in terms of the number of internal clock cycles.

The overall command recovery timing length R is programmed by selecting a 2-bit prescaling value (bits 7-6 of this register) representing weights of 1, 16, 256, or 4096, and then selecting a multiplier value (bits 5-0) to which that prescaler is multiplied to produce the overall command recovery timing length according to the following formula:

$$R = (N_{pres} \times N_{val}) + 2^1$$

NOTE: Notice that this formula is slightly different than those for setup and command.

The value of R, representing the number of clock cycles for command recovery, is then multiplied by the clock period to determine the actual command recovery time (see Section 12.3.4 for further discussion).

Bits 5-0: Recovery Multiplier Value

This field indicates an integer value $N_{val}$ from 0 to 63; it is combined with a prescaler value (bits 7-6) to control the length of recovery time after a command is active.

Bits 7-6: Recovery Prescaler Select

| 00 | $N_{pres} = 1$ |
|---|---|
| 01 | $N_{pres} = 16$ |
| 10 | $N_{pres} = 256$ |
| 11 | $N_{pres} = 4096$ |

This field chooses one of four prescaler values $N_{pres}$ that are combined with the value of the Recovery Multiplier Value (bits 5-0) to control the length of recovery time after a command is active.

---

[1] If socket cycles are back-to-back, $R = (N_{pres} \times N_{val}) + 1$.

10. ATA MODE OPERATION

The CL-PD6710 and CL-PD672X card interfaces can be dynamically configured to support a PCMCIA 2.1-compatible ATA disk interface instead of the standard PCMCIA 2.1 PC card interface. The ATA interface allows disk drives that can be made mechanically-compatible with PCMCIA card dimensions to operate in the socket by using the ATA (commonly known as 'IDE') electrical interface.

Configuration of a socket to support ATA operation changes the function of certain card socket signals to support the needs of the ATA disk interface. Table 10-1 lists each interface pin and its function when a CL-PD6710 or CL-PD672X card socket is operating in ATA mode.

All register functions of the CL-PD67XX are available in ATA mode, including socket power control, interface signal disabling, and card window control.

Table 10-1. ATA Pin Cross Reference

| PCMCIA Socket Pin Number | PC Card Interface Function | ATA Interface Function | PCMCIA Socket Pin Number | PC Card Interface Function | ATA Interface Function |
|---|---|---|---|---|---|
| 1 | Ground | Ground | 35 | Ground | Ground |
| 2 | D3 | D3 | 36 | -CD1 | -CD1 |
| 3 | D4 | D4 | 37 | D11 | D11 |
| 4 | D5 | D5 | 38 | D12 | D12 |
| 5 | D6 | D6 | 39 | D13 | D13 |
| 6 | D7 | D7 | 40 | D14 | D14 |
| 7 | -CE1 | CS0* | 41 | D15 | D15 |
| 8 | A10 | N/C | 42 | -CE2 | CS1* |
| 9 | -OE | 0 | 43 | — | — |
| 10 | A11 | N/C | 44 | -IORD | -IORD |
| 11 | A9 | CS1* | 45 | -IOWR | -IOWR |
| 12 | A8 | N/C | 46 | A17 | N/C |
| 13 | A13 | N/C | 47 | A18 | N/C |
| 14 | A14 | N/C | 48 | A19 | N/C |
| 15 | -WE | N/C | 49 | A20 | N/C |
| 16 | -IREQ | IREQ | 50 | A21 | N/C |
| 17 | VCC | VCC | 51 | VCC | VCC |
| 18 | VPP1 | N/C | 52 | VPP2 | N/C |
| 19 | A16 | N/C | 53 | A22 | N/C |
| 20 | A15 | N/C | 54 | A23 | VU |
| † Not supported by the CL-PD67XX. | | | | | |

Table 10–1. ATA Pin Cross Reference *(cont.)*

| PCMCIA Socket Pin Number | PC Card Interface Function | ATA Interface Function | PCMCIA Socket Pin Number | PC Card Interface Function | ATA Interface Function |
|---|---|---|---|---|---|
| 21 | A12 | N/C | 55 | A24 | M/S* |
| 22 | A7 | N/C | 56 | A25 | CSEL |
| 23 | A6 | N/C | 57 | N/C | N/C |
| 24 | A5 | N/C | 58 | RESET | RESET* |
| 25 | A4 | N/C | 59 | -WAIT | IOCHRDY |
| 26 | A3 | N/C | 60 | -INPACK | DREQ † |
| 27 | A2 | A2 | 61 | -REG | DACK* † |
| 28 | A1 | A1 | 62 | -SPKR | LED* |
| 29 | A0 | A0 | 63 | -STSCHG | PDIAG* † |
| 30 | D0 | D0 | 64 | D8 | D8 |
| 31 | D1 | D1 | 65 | D9 | D9 |
| 32 | D2 | D2 | 66 | D10 | D10 |
| 33 | -IOIS16 | -IOIS16 | 67 | -CD2 | -CD2 |
| 34 | Ground | Ground | 68 | Ground | Ground |

† Not supported by the CL-PD67XX.

Configuring a Socket as an ATA Drive Interface

There are three configuration operations to make a card socket serve as an ATA drive interface:

1. The first operation is to configure the pins of the selected socket as an ATA interface. This is done by setting bit 0 of the ATA Control register (see page 53) to a '1'.

This configures PCMCIA socket pins as ATA signals, described in Table 10–1.

2. The second operation is to configure the socket's registers for ATA-compatible timing and operation.

Table 10–2 lists register values to be used to configure a card socket for ATA operation. Note that table values listed below assume card Socket 0 is being configured for ATA and that appropriate index offsets would be added for card Socket 1, 2, or 3 configuration.

NOTE: For a card socket to operate in ATA mode, socket timing needs to be set to Timing Set 0's default values as described in the previous section and as controlled by I/O Window Control, bit 3 (see page 40).

Table 10-2. Register Values to Configure Card Socket 0 as ATA Interface

| Register Index | Register Value | Description |
|---|---|---|
| 07h | 02h | Auto-Size Window 0 size is based on -IOIS16 pin in Data register. |
| 03h | 6Eh | Sets Card Is I/O for I/O, removes Card Reset, and sets IRQ Level to IRQ14 in the Interrupt and General Control register. |
| 08h | F0h | I/O Map 0 Start Address Low to be used for CS0*. |
| 09h | 01h | I/O Map 0 Start Address High to be used for CS0*. |
| 0Ah | F7h | I/O Map 0 End Address Low to be used for CS0*. |
| 0Bh | 01h | I/O Map 0 End Address High to be used for CS0*. |
| 0Ch | F6h | I/O Map 1 Start Address Low to be used for CS1*. |
| 0Dh | 03h | I/O Map 1 Start Address High to be used for CS1*. |
| 0Eh | F7h | I/O Map 1 End Address Low to be used for CS1*. |
| 0Fh | 03h | I/O Map 1 End Address High to be used for CS1*. |
| 36h | 00h | Zero all I/O Map 0-1 Address Offset registers. |
| 37h | 00h | Zero all I/O Map 0-1 Address Offset registers. |
| 38h | 00h | Zero all I/O Map 0-1 Address Offset registers. |
| 39h | 00h | Zero all I/O Map 0-1 Address Offset registers. |
| 26h | 03h | Speaker output pin is configured to drive an LED, set ATA mode in ATA Control register. |
| 06h | C0h | Enable I/O Maps in Mapping Enable register. |
| 1Eh | 32h | Three-State Bit 7 when reading 03F7h, 0377h and use Low-power Dynamic mode, drive LED on IRQ12 pin in Misc Control 2 register. |
| 02h | B0h | Turn on power to the drive in Power Control register. |

3. If the CL-PD67XX is to drive a disk status LED, then the third operation is to configure the CL-PD67XX for drive LED support.

Each socket configured as an ATA interface may have its -SPKR input (PCMCIA pin 62) control an open-collector LED driver; an alternate function for the CL-PD67XX IRQ12 pin. The ATA Control register, bit 1 enables the -SPKR input to be used as an active-low -LED input from the ATA drive.

The CL-PD67XX has on-chip pull-ups on each socket's -SPKR input that are enabled whenever ATA mode on that socket is activated and the socket's -SPKR input is re-configured for LED support. These pull-ups allow compatibility with drives that produce open-collector LED controls.

Once a socket input has been configured as an LED input, the alternate function of the IRQ12 pin must be selected so that it becomes the open-collector disk status LED driver. This is done by setting Misc Control 2, bit 4 (see page 51) to a '1'.

In applications where more than one socket on a CL-PD67XX is configured as an ATA interface, both LED inputs are negatively OR'ed together to create the open-collector LED drive output on the IRQ12 pin.

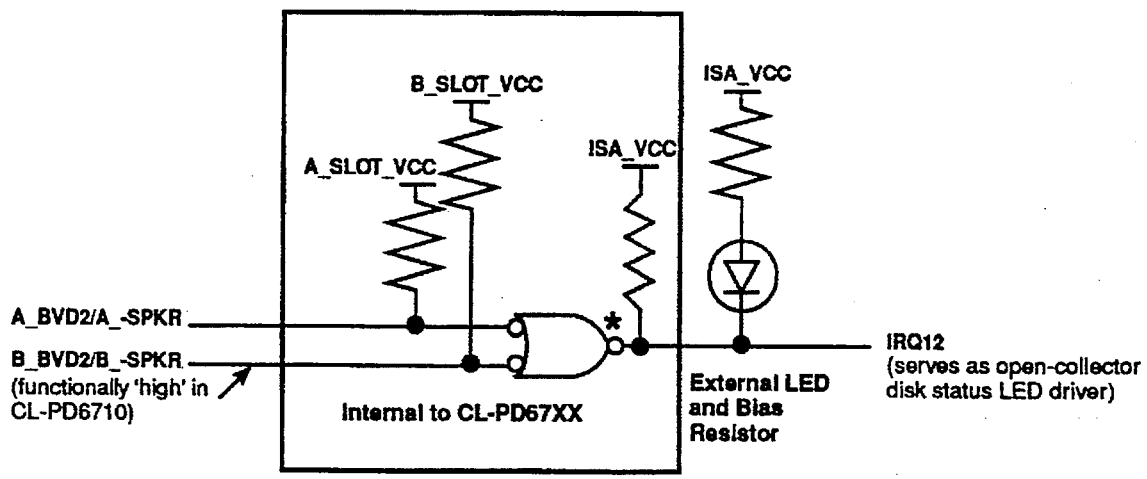
Figure 10–1. Disk-Status LED Logic for ATA Mode

11. DMA OPERATION (CL-PD6722)

11.1 DMA Capabilities of the CL-PD6722

The CL-PD6722 includes support of a DMA-capable PCMCIA card slave and the movement of DMA data to/from the card with the ISA bus as a DMA master.

Only one socket at a time should be enabled for DMA transfer because the ISA bus DMA handshake signals are shared between both socket interfaces.

DMA transfers to and from the DMA-capable PCMCIA card may be 8- or 16-bit, as indicated by the size of the ISA bus DMA cycle.[1]

11.2 DMA-Type PCMCIA Cycles

Transfer of DMA data to or from a card is achieved through use of a special DMA-type PCMCIA interface cycle. This cycle is defined in such a way as to not conflict with standard PCMCIA memory or I/O cycles.

A card that is DMA-capable is able to distinguish PCMCIA interface cycle types presented by the CL-PD6722 according to the following table:

Table 11-1. Four Card Cycle Types for DMA-Type PCMCIA Interface

| Socket Interface Cycle Type | Function of -WE/-OE | Function of -IORD/-IOWR | Function of -REG |
|---|---|---|---|
| Card Memory Read/Write | Data Transfer Signaling | Always Inactive High | Always Inactive High |
| Attribute Memory Read/Write | Data Transfer Signaling | Always Inactive High | Always Low |
| Card I/O Read/Write | Always Inactive High | Data Transfer Signaling | Low = Non-DMA I/O Cycle |
| Card DMA Data Read/Write | Terminal Count Outputs | Data Transfer Signaling | High = DMA Cycle |

NOTE: DMA Control register bits 7 and 6 must be nonzero for table to be true; otherwise only standard PCMCIA cycles will be issued to the card.

The PCMCIA address is also undefined during the DMA read or write cycle.

Card DMA data read and card DMA data write cycles are those used to transfer DMA data to or from a DMA-capable PCMCIA card. These cycles are distinguished from normal card I/O cycles by the -REG signal being high during the cycle, which is an undefined condition in the PCMCIA 2.1 specification.

11.3 ISA Bus DMA Handshake Signal

A DMA request from the card is passed to the ISA bus as long as the socket interface FIFO is empty. IRQ10 is used as the DMA request output to the ISA bus when Misc Control 2 register, bit 2 is a '1'. When Misc Control 2 register, bit 2 is a '1', IRQ9 is redefined as the active-low DMA acknowledge input from the ISA bus. This signal must remain active for all DMA transfers through the CL-PD6722.

---

[1] Transfer size at socket interface is the same as transfer size on an ISA bus. For 8-bit DMA transfers, connect CL-PD6722 DMA handshake signals to ISA bus DMA channels 0, 1, 2, or 3. For 16-bit transfers, connect CL-PD6722 DMA handshake signals to ISA bus DMA channels 5, 6, or 7.

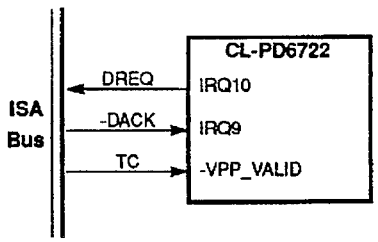

Figure 11-1. DMA Handshake Connections to the ISA Bus to Make the CL-PD6722 DMA-Capable Terminal counts are passed through to the card from the CL-PD6722 -VPP_VALID pin when Misc Control 2 register, bit 6 is a '1'. For a DMA write process, the last-cycle terminal count condition is indicated by -WE being active-low during a card DMA data read cycle. For a DMA read process, terminal count is indicated by -OE being active-low during the last card cycle.

11.4 Configuring the CL-PD6722 Registers for a DMA Transfer

The following steps in register programming are done to configure a CL-PD6722 socket interface for DMA transfer to/from a DMA-capable PCMCIA card:

1. Select which pin on the PCMCIA Interface will serve as the DMA request Input.
2. Configure the socket Interface as I/O-capable.
3. Prevent dual-interpretation of socket Interface DMA handshake signals.
4. Set the DMA Enable bit.

11.4.1 Programming the DMA Request Pin from the Card

The CL-PD6722 allows selection of one of three PCMCIA interface inputs to be redefined as the DMA request input, and it also allows programming of the active level of the selected input. This is done by setting bits 7 and 6 of the DMA Control register to the desired values matching those of the DMA-capable PCMCIA card to be used.

Once this selection of DMA request input has been done, the PCMCIA interface is now configured at the signal level for DMA card interfacing.

The following table shows how the CL-PD6722 socket interface signals get redefined when a card is in DMA card interface mode:

| Standard I/O Card I/F Signal Name | DMA-Capable Card Interface Signal Usage | When Signal Redefinition for DMA Interface Is Effective |
|---|---|---|
| -IOIS16 | -IOIS16 or may be selected as the active-low DMA request input | DMA Control register bits 7-6 = '10' |
| (BVD2/) -SPKR/-LED | -SPKR/-LED or may be selected as the active-low DMA request input | DMA Control register bits 7-6 = '11' |
| -INPACK | -INPACK or may be selected as the active-low DMA request input | DMA Controlregister bits 7-6 = '01' |
| -REG | -REG during standard cycles, active-high -DACK during DMA r/w cycles | Only during actual card DMA read or write cycle |
| -OE | -OE during standard cycles, active-low -TC during DMA read cycles | During DMA read cycles: i.e., when -REG high and -IOWR low |
| -WE | -WE during standard cycles, active-low -TC during DMA write cycles | During DMA write cycles: i.e., when -REG high and -IORD low |

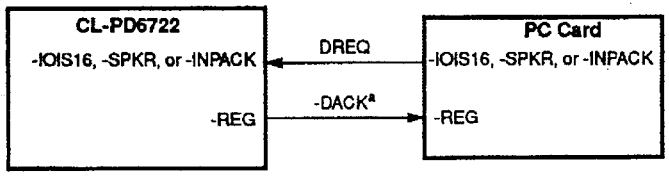

ª A DMA cycle is the DMA acknowledge to the card.

Figure 11–2. Card DMA Request and Acknowledge Handshake

Notice that DMA acknowledge to the card as -REG high is only active during the actual DMA read or write card cycle. This means there is no mechanism to deassert DACK to the card: the card must understand that receiving the first DMA cycle is its DMA acknowledgment.

11.4.2 Configuring the Socket Interface for I/O

For DMA support, Interrupt and General Control register bit 5 must be set to '1' to put the card interface in I/O and Memory card interface mode.

11.4.3 Preventing Dual Interpretation of DMA Handshake Signals

If the WP/-IOIS16 pin is being used as the DMA request line, the following should be considered:

1) Interface Status register bit 4 is now the level of the DMA request line from the card.
2) Bit 5 in the socket's two I/O Window Control registers should be set to '0'.

If BVD2/-SPKR pin is being considered as the DMA request line, the following should be considered: speaker or LED output from this socket is not available.

If -INPACK is selected as the DMA request input, then bit 7 of the Misc Control 1 register should be set to '0' to disable use of this signal as input acknowledge control.

No other register bits require any special settings to accommodate DMA support on a socket interface.

11.4.4 Turning On DMA System

The DMA System bit (Misc Control 2 register bit 6) should be programmed to '1' to allow DMA operation and to redefine ISA bus interface pins for DMA support as in Figure 11-1.

11.5 The DMA Transfer Process

As soon as the selected DMA request input from the card goes active-low and the FIFO goes empty, IRQ10 goes active-high signifying a DMA request to the system. The system then responds with an active-low -DACK at IRQ9, which enables the CL-PD6722 to decode any ISA bus DMA transfers that may occur and perform the corresponding transfers at the card. Normal card I/O or memory reads or writes may be interspersed with DMA read and write cycles.

11.6 Terminal Count to Card at Conclusion of Transfer

At the conclusion of each transfer process, systems send active-high terminal count (TC) pulses to the -VPP_VALID pin during the last DMA cycles to the CL-PD6722.

For a DMA write cycle, TC active will be signaled at the socket interface as the -OE pin going low during DMA-type PCMCIA read cycles from the card.

For a DMA read cycle, TC active will be signaled as the -WE pin going low during DMA-type PCMCIA write cycles to the card.

12. ELECTRICAL SPECIFICATIONS

12.1 Absolute Maximum Ratings

| Description | Absolute Maximum Rating[a] |
|---|---|
| Ambient temperature under bias | 0 to 70°C |
| Storage temperature | -65 to 150°C |
| Voltage on any pin (with respect to ground) | -0.3 volts to 0.3 volts greater than voltage of +5V pin, respective to ground |
| Operating power dissipation | 500 mW |
| Suspend power dissipation | 10 mW |
| Power supply voltage | 7 volts |
| Injection current (latch up) | 25 mA |

[a] Stresses above those listed may cause permanent damage to system components. These are stress ratings only; functional operation at these or any conditions above those indicated in the operational sections of this specification is not implied. Exposure to absolute maximum rating conditions for extended periods may affect system reliability.

12.2 DC Specifications

Table 12-1. General DC Specifications

| Symbol | Parameter | MIN | MAX | Unit | Conditions |
|---|---|---|---|---|---|
| $C_{IN}$ | Input Capacitance | | 10.0 | pF | |
| $C_{OUT}$ | Output Capacitance | | 10.0 | pF | |
| $I_{IL}$ | Input Leakage | -10.0 | 10.0 | µA | $0 < V_{IN} <$ respective $V_{CC}$ supply pin |
| $I_{PU}$ | Internal Pull-up Current | -30 | -400 | µA | |

Table 12–2. PCMCIA Bus Interface DC Specifications

| Symbol | Parameter | MIN | MAX | Unit | Conditions |
|---|---|---|---|---|---|
| $SLOT\_VCC_{5V}$ | Power Supply Voltage | 4.5 | 5.5 | V | Normal operation |
| $SLOT\_VCC_{3V}$ | Power Supply Voltage | 3.0 | 3.6 | V | Normal operation |
| $V_{IH}$ | Input High Voltage | 2.0 | | V | $V_{DD}$ core voltage = 3.0V, Misc Control 2 register, bit 3 = 0 |
| | | 2.0 | | V | $V_{DD}$ core voltage = 4.5V, Misc Control 2 register, bit 3 = 1 |
| $V_{IL}$ | Input Low Voltage | | 0.8 | V | $V_{DD}$ core voltage = 3.6V, Misc Control 2 register, bit 3 = 0 |
| | | | 0.8 | V | $V_{DD}$ core voltage = 5.5V, Misc Control 2 register, bit 3 = 1 |
| $V_{IHC}$ | Input High Voltage CMOS | $0.7\,V_{DD}$ | | V | $V_{DD}$ core voltage = 4.5V, Misc Control 2 register, bit 3 = 0 |
| $V_{ILC}$ | Input Low Voltage CMOS | | $0.2\,V_{DD}$ | V | $V_{DD}$ core voltage = 5.5V, Misc Control 2 register, bit 3 = 0 |
| $V_{OH}$ | Output High Voltage | 2.4 | | V | At rated $I_{OH}$, respective SLOT_VCC = 3.0V |
| $V_{OHC}$ | Output High Voltage CMOS | SLOT_VCC − 0.5 | | V | At rated $I_{OHC}$, respective SLOT_VCC = 3.0V |
| $V_{OL}$ | Output Low Voltage | | 0.4 | V | At rated $I_{OL}$ |
| $I_{OH}$ | Output High Current | -2 | | mA | Respective SLOT_VCC = 3.0V, $V_{OH}$ = 2.4V |
| $I_{OHC}$ | Output High Current CMOS | -1 | | mA | Respective SLOT_VCC = 3.0V, $V_{OHC}$ = SLOT_VCC − 0.5 |
| $I_{OL}$ | Output Low Current | 2 | | mA | Respective SLOT_VCC = 3.0V, $V_{OL}$ = 0.4V |

Table 12–3. ISA Bus Interface DC Specifications

| Symbol | Parameter | MIN | MAX | Unit | Conditions |
|---|---|---|---|---|---|
| ISA_VCC$_{5V}$ | Power Supply Voltage | 4.5 | 5.5 | V | Normal operation |
| ISA_VCC$_{3V}$ | Power Supply Voltage | 3.0 | 3.6 | V | Normal operation |
| $V_{IH}$[a] | Input High Voltage | 2.0 | | V | $V_{DD}$ core voltage = 3.0V |
| $V_{IL}$[a] | Input Low Voltage | | 0.8 | V | $V_{DD}$ core voltage = 3.6V |
| $V_{IHC}$[a] | Input High Voltage CMOS | 0.7 $V_{DD}$[b] | | V | $V_{DD}$ core voltage = 4.5V |
| $V_{ILC}$[a] | Input Low Voltage CMOS | | 0.2 $V_{DD}$[b] | V | $V_{DD}$ core voltage = 5.5V |
| $V_{OH}$ | Output High Voltage | 2.4 | | V | At rated $I_{OH}$, ISA_VCC = 3.0V |
| $V_{OHC}$ | Output High Voltage CMOS | ISA_VCC −0.5 | | V | At rated $I_{OHC}$, ISA_VCC = 3.0V |
| $V_{OL}$ | Output Low Voltage | | 0.4 | V | At rated $I_{OL}$ |
| $I_{OH}$ | Output Current High, 2-mA-type driver | -2 | | mA | ISA_VCC = 3.0V, $V_{OH}$ = 2.4V |
| $I_{OH}$ | Output Current High, 12-mA-type driver | -5 | | mA | |
| $I_{OH}$ | Output Current High, 16-mA-type driver | -5 | | mA | |
| $I_{OHC}$ | Output Current High CMOS, 2-mA-type driver | -1 | | mA | ISA_VCC = 3.0V, $V_{OHC}$ = ISA_VCC − 0.5V |
| $I_{OHC}$ | Output Current High CMOS, 12-mA-type driver | -1 | | mA | |
| $I_{OHC}$ | Output Current High CMOS, 16-mA-type driver | -1 | | mA | |
| $I_{OL}$ | Output Current Low, 2-mA-type driver | 2 | | mA | ISA_VCC = 3.0V, $V_{OL}$ = 0.4V |
| $I_{OL}$ | Output Current Low, 12-mA-type driver | 12 | | mA | |
| $I_{OL}$ | Output Current Low, 16-mA-type driver | 16 | | mA | |

[a] When the $V_{DD}$ core voltage is 3.3V, input thresholds are TTL compatible; when the $V_{DD}$ core voltage is 5V, input thresholds are CMOS compatible.

[b] The value of the input threshold level is dependent on the voltage applied to $V_{DD}$ pins of the CL-PD67XX.

Table 12–4. Power Control Interface (+5V Powered) DC Specifications

| Symbol | Parameter | MIN | MAX | Unit | Conditions |
|---|---|---|---|---|---|
| +5V | +5V Supply Voltage | Highest $V_{CC}-0.3$ | 5.5 | V | |
| $V_{IH}$ | Input High Voltage | 2.0 | | V | +5V pin voltage = 4.5V |
| $V_{IL}$ | Input Low Voltage | | 0.8 | V | +5V pin voltage = 5.5V |
| $V_{OH}$ | Output High Voltage | 2.4 | | V | +5V pin voltage = 4.5V, $I_{OH}$ = -5 mA |
| $V_{OHC}$ | Output High Voltage CMOS | +5V voltage – 0.5 | | V | +5V pin voltage = 4.5V, $I_{OH}$ = -1 mA |
| $V_{OL}$ | Output Low Voltage | | 0.4 | V | |
| $I_{OH}$ | Output Current High, 16-mA-type driver | -5 | | mA | Respective +5V pin voltage = 4.5V, $V_{OH}$ = 2.4V |
| $I_{OHC}$ | Output Current High CMOS, 16-mA-type driver | -1 | | mA | Respective +5V pin voltage = 4.5V, $V_{OHC}$ = +5V pin voltage – 0.5V |
| $I_{OL}$ | Output Current Low, 16-mA-type driver | 16 | | mA | Respective +5V pin voltage = 4.5V, $V_{OL}$ = 0.4V |

Table 12–5. Operating Current Specifications

| Symbol | Parameter | MIN | TYP | MAX | Unit | Conditions |
|---|---|---|---|---|---|---|
| $Icc_{tot(1)}$ | Power Supply Current, operating | < 6 | 8 | < 20 | mA | $V_{DD}$ core voltage = 3.3V; +5V, SLOT_VCC, and ISA_VCC = 5.0V; $P_{DISS}$ = < 85 mW |
| $Icc_{tot(2)}$ | Power Supply Current, Suspend | | < 150 | | µA | $V_{DD}$ core voltage = 3.3V; +5V, SLOT_VCC, and ISA_VCC = 5.0V; $P_{DISS}$ = < 2 mW |
| $Icc_{tot(3)}$ | Power Supply Current, Super Suspend, No Clocks | | < 20 | | µA | $V_{DD}$ core voltage = 3.3V; +5V, SLOT_VCC, and ISA_VCC = 5.0V; $P_{DISS}$ = < 1 mW |

12.3 AC Timing Specifications

This section includes system timing requirements for the CL-PD67XX. Timings are provided in nanoseconds (ns), at TTL input levels, with the ambient temperature varying from 0 to 70°C, and $V_{CC}$ varying from 3.0 to 5.5V DC. The AT bus speed is 10 MHz unless otherwise noted. Note that an asterisk (*) denotes an active-low signal for the ISA bus interface, and a dash (-) denotes an active-low signal for the PCMCIA socket interface.

Additionally, the following statements are true for all timing information:

- All timings assume a load of 50 pF.
- TTL signals are measured at TTL threshold; CMOS signals are measured at CMOS threshold.

Table 12-6. Index of AC Timing Specifications

| Title | Page Number |
|---|---|
| Table 12-7. ISA Bus Timing | 73 |
| Table 12-8. Reset Timing | 75 |
| Table 12-9. Input Clock Specification | 76 |
| Table 12-10. Memory Read/Write Timing | 78 |
| Table 12-11. Word I/O Read/Write Timing | 79 |
| Table 12-12. PCMCIA Read/Write Timing When Host is 8-Bit | 80 |
| Table 12-13. Normal Byte Read/Write Timing | 81 |
| Table 12-14. Word-To-Byte Conversion, Odd Byte I/O Read/Write Timing | 82 |
| Table 12-15. DMA Read Cycle Timing | 83 |
| Table 12-16. DMA Write Cycle Timing | 84 |
| Table 12-17. DMA Request Timing | 86 |

12.3.1 Bus Timing — ISA Bus

Table 12-7. ISA Bus Timing

| Symbol | Parameter | MIN | MAX | Unit |
|---|---|---|---|---|
| $t_1$ | MEMCS16* active delay from LA[23:17] valid | | 40 | ns |
| $t_{1a}$ | LA[23:17] setup to ALE inactive | 30 | | ns |
| $t_{1b}$ | LA[23:17] hold from ALE inactive | 5 | | ns |
| $t_2$ | IOCS16* active delay from SA[15:0][1] | | 30 | ns |
| $t_{2a}$ | IOCS16* inactive delay from SA[15:0][1] | | 30 | ns |
| $t_3$ | SA[16:0], SBHE* setup to any Command active[1,2]<br>LA[23:17] latching by ALE to any Command active | 30<br>90 | | ns<br>ns |
| $t_4$ | Any Command active to IOCHRDY inactive (low)[3] | | 40 | ns |
| $t_{4a}$ | IOCHRDY three-state from Command inactive[4] | 5 | 30 | |
| $t_5$ | MEMCS16* inactive delay from unlatched LA[23:17] | | 40 | ns |
| $t_{6a}$ | IOW* or IOR* pulse width[1] | 140 | | ns |
| $t_{6b}$ | MEMW* or MEMR* pulse width[1] | 180 | | ns |
| $t_7$ | Any Command inactive to next Command active | 100 | | ns |
| $t_8$ | Address or SBHE* hold from any Command inactive | 0 | | ns |
| $t_9$ | Data valid from MEMW* active[5]<br>Data valid from IOW* active | | 40<br>40 | ns<br>ns |
| $t_{10}$ | Data hold from MEMW* inactive<br>Data hold from IOW* inactive | 0<br>0 | | ns<br>ns |
| $t_{11}$ | Data delay from IOR* active, for internal registers | 0 | 130 | ns |
| $t_{12}$ | Data delay from IOCHRDY active | | 15 | ns |
| $t_{13}$ | Data hold from IOR* or MEMR* inactive | 0 | 20 | ns |
| $t_{14}$ | AEN inactive setup to valid IOR* or IOW* active | 40 | | ns |
| $t_{15}$ | AEN hold from IOR* or IOW* inactive | 5 | | ns |
| $t_{16}$ | REFRESH* inactive setup to valid MEMR* or MEMW* active | 40 | | ns |
| $t_{17}$ | REFRESH* inactive hold from MEMR* or MEMW* active | 0 | | ns |
| $t_{18}$ | MEMCS16* active delay from SA[16:12] valid | | 30 | ns |
| $t_{19}$ | *ZWS delay from MEMW* active | | 30 | ns |
| $t_{20}$ | *ZWS hold from MEMW* inactive | | 15 | ns |

[1] AEN must be inactive for $t_2$, $t_3$, and $t_6$ timing specifications to be applicable.
[2] Command is defined as IOR*, IOW*, MEMR*, or MEMW*.
[3] Except for valid card memory writes, which are zero wait state when internal write FIFO is not full.
[4] If card is removed during a card access cycle, IOCHRDY is three-stated without waiting for end of Command.
[5] Based on 25-MHz internal clock, produced either by an internal synthesizer and 14.318-MHz signal applied to CLK pin, or by supplying 25 MHz directly to CLK pin and bypassing the internal synthesizer.

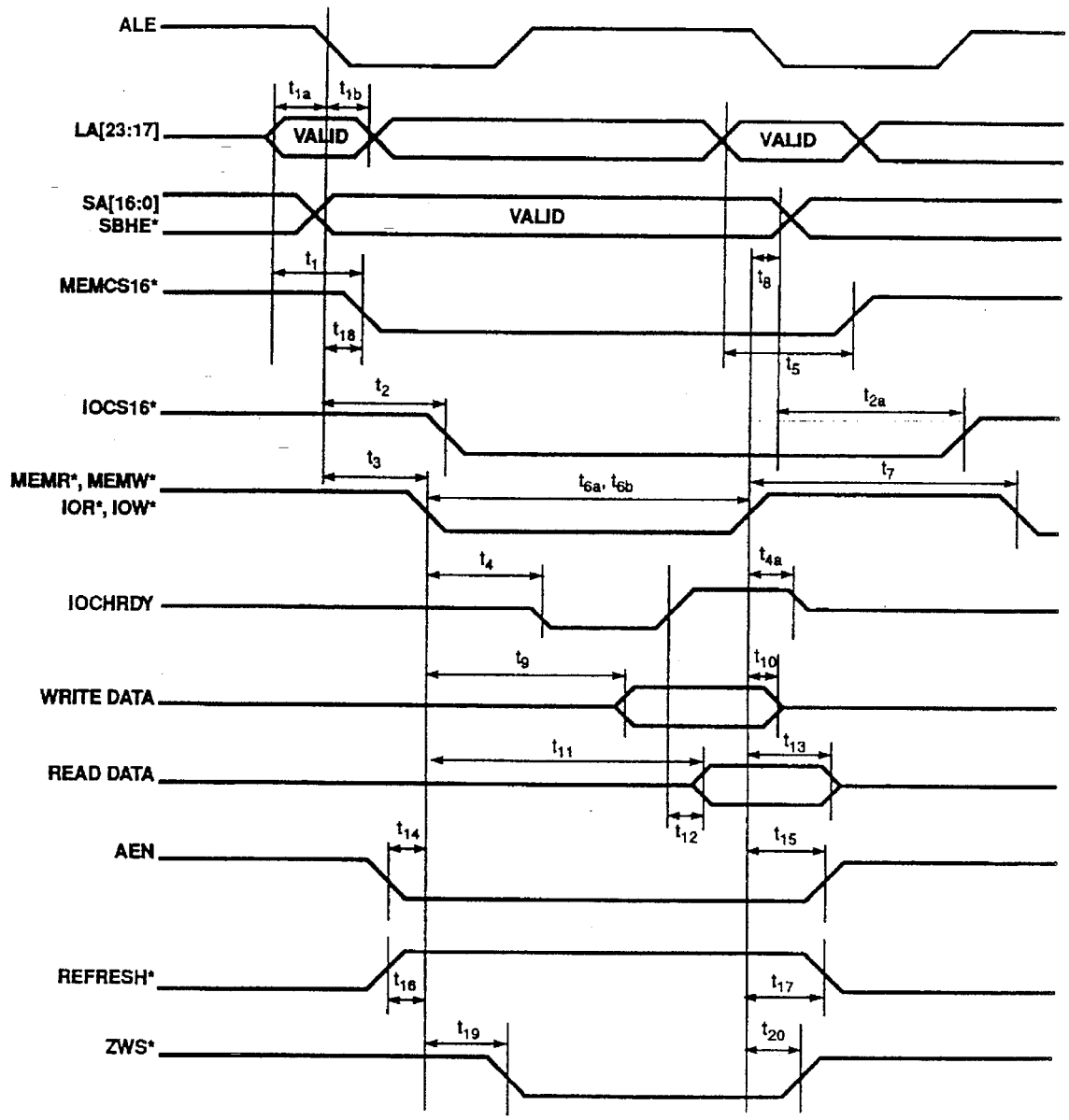
Figure 12–1. Bus Timing — ISA Bus

12.3.2 Reset Timing

Table 12–8. Reset Timing

| Symbol | Parameter | MIN | MAX | Units |
|---|---|---|---|---|
| $t_1$ | PWRGOOD generated reset pulse width | 500 | | ns |
| $t_2$ | Clock active before end of reset[1] | 500 | | ns |
| $t_3$ | End of PWRGOOD generated reset to first Command | 500 | | ns |
| [1] | Clock input must be active for a minimum of 500 ns before PWRGOOD goes active to allow sufficient internal clocks to initialize internal circuitry. | | | |

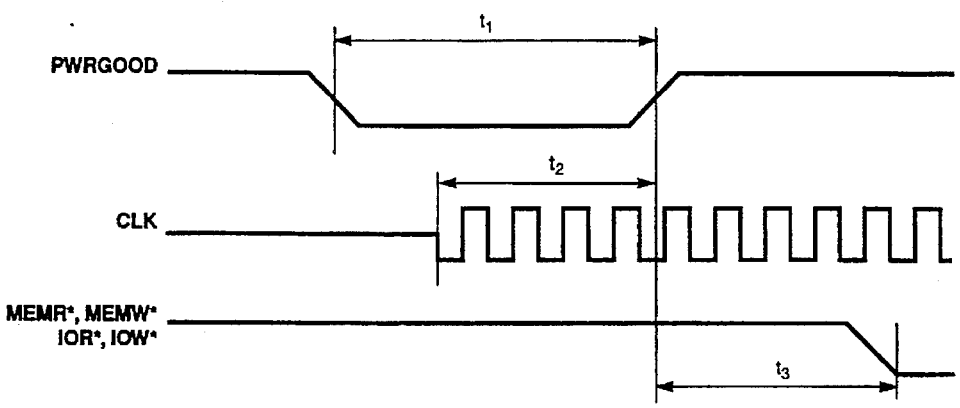

Figure 12–2. Reset Timing

12.3.3 Input Clock Specification

Table 12-9. Input Clock Specification

| Symbol | Parameter | MIN | MAX | Units | Conditions |
|---|---|---|---|---|---|
| $t_1$ | CLK pin input rise time | 1 | 7 | ns | |
| $t_2$ | CLK pin input fall time | 1 | 7 | ns | |
| $t_3$ | CLK input low period | $0.4\,T_{CLKP}$ | $0.6\,T_{CLKP}$ | ns | |
| $t_4$ | CLK input high period | $0.4\,T_{CLKP}$ | $0.6\,T_{CLKP}$ | ns | |
| $V_{center}$ | Center voltage at which period specified | $0.5\,V_{DD}$ | $0.5\,V_{DD}$ | V | |
| $T_{CLKP}$ | Input clock period, internal clock | 69.84 − 0.1% | 69.84 + 0.1% | ns | Normal synthesizer operation. Misc Control 2 register, bit 0 = '0'. CLK pin at 14.318 MHz. |
| $T_{CLKP}$ | Input clock period, external clock | 40 − 0.1% | 40 + 0.1% | ns | Synthesizer bypassed. Misc Control 2 register, bit 0 = '1'. CLK pin at 25 MHz. |
| $V_{IHmin}$ | CLK input high voltage | 2.0 | | V | $V_{DD}$ core voltage = 3.0V |
| $V_{ILmax}$ | CLK input low voltage | | 0.8 | V | $V_{DD}$ core voltage = 3.6V |
| $V_{IHCmin}$ | CLK input high voltage | $0.7\,V_{DD}$ | | V | $V_{DD}$ core voltage = 4.5V |
| $V_{ILCmax}$ | CLK input low voltage | | $0.2\,V_{DD}$ | V | $V_{DD}$ core voltage = 5.5V |

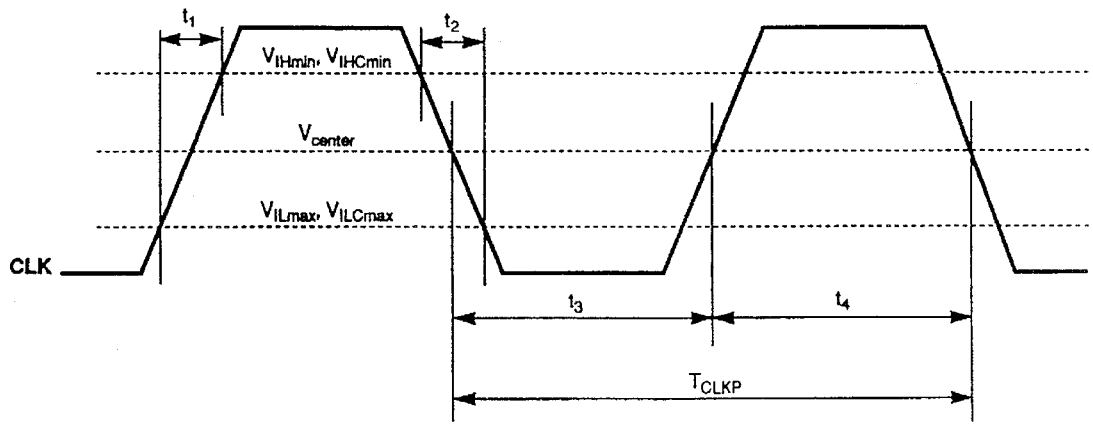

Figure 12-3. Input Clock Specification

12.3.4 PCMCIA Bus Timing Calculations

Calculations for minimum PCMCIA cycle Setup, Command, and Recovery timings are made by first calculating factors derived from the applicable timing set's timing registers and then by applying the factor to an equation relating it to the internal clock period.

The PCMCIA cycle timing factors, in terms of the number of internal clocks, are calculated as follows:

$$S = (N_{pres} \times N_{val}) + 1$$

$$C = (N_{pres} \times N_{val}) + 1$$

$$R = (N_{pres} \times N_{val}) + 2^1$$

$N_{pres}$ and $N_{val}$ are the specific selected prescaler and multiplier value from the timing set's Setup, Command, and Recovery Timing registers (see Chapter 9 for description of these registers).

From this, a PCMCIA cycle's Setup, Command, and Recovery time for the selected timing set are calculated as follows:

$$\text{Minimum Setup time} = (S \times Tcp) - 10 \text{ ns}$$

$$\text{Minimum Command time} = (C \times Tcp) - 10 \text{ ns}$$

$$\text{Minimum Recovery time} = (R \times Tcp) - 10 \text{ ns}$$

When the internal synthesizer is used, the calculation of the internal clock period Tcp is:

$$Tcp = T_{CLKP} \times 4/7$$

where $T_{CLKP}$ is the period of the clock supplied to the CLK input pin. An input frequency of 14.318 MHz at the CLK input pin results in an internal clock period of Tcp = 40 ns.

When the internal synthesizer is bypassed, $Tcp = T_{CLKP}$. An input frequency of 25 MHz in this circumstance would also result in an internal clock period of Tcp = 40 ns.

The timing diagrams that follow were derived for a CL-PD67XX using the internal synthesizer and a 14.318-MHz CLK pin input. The internal clock frequency of the CL-PD67XX is 7/4 of this incoming signal (Tcp = 40 ns). The examples are for the default values of the Timing registers for timing set 0, as follows:

| Timing Register Name (Timing Set 0) | Index | Value (Default) | Resultant $N_{pres}$ | Resultant $N_{val}$ |
|---|---|---|---|---|
| Setup Timing 0 | 3Ah | 01h | 1 | 1 |
| Command Timing 0 | 3Bh | 06h | 1 | 6 |
| Recovery Timing 0 | 3Ch | 00h | 1 | 0 |

Thus the minimum times are as follows:

$$\text{Minimum Setup time} = (S \times Tcp) - 10 \text{ ns} = \{[(1 \times 1) + 1] \times 40 \text{ ns}\} - 10 \text{ ns} = \textbf{70 ns}$$

$$\text{Minimum Command time} = (C \times Tcp) - 10 \text{ ns} = \{[(1 \times 6) + 1] \times 40 \text{ ns}\} - 10 \text{ ns} = \textbf{270 ns}$$

$$\text{Minimum Recovery time} = (R \times Tcp) - 10 \text{ ns} = \{[(1 \times 0) + 2] \times 40 \text{ ns}\} - 10 \text{ ns} = \textbf{70 ns}$$

---

[1] If socket cycles are back-to-back, then $R = (N_{pres} \times N_{val}) + 1$.

12.3.5 Bus Timing — PCMCIA Bus

Table 12–10. Memory Read/Write Timing

| Symbol | Parameter | MIN | MAX | Units |
|---|---|---|---|---|
| $t_1$ | -CE[2:1], -REG, Address, and Write Data setup to Command active[1] | (S x Tcp) – 10 | | ns |
| $t_2$ | Command pulse width[2] | (C x Tcp) – 10 | | ns |
| $t_3$ | Address hold and Write Data valid from Command inactive[3] | (R x Tcp) – 10 | | ns |
| $t_4$ | -WAIT active from Command active | | (C – 2)Tcp – 10 | ns |
| $t_5$ | Command hold from -WAIT inactive | 2 Tcp | | ns |
| $t_6$ | Data setup before -OE inactive | (2 Tcp) +10 | | ns |
| $t_7$ | Data hold after -OE inactive | 0 | | ns |
| $t_8$ | Data valid from -WAIT inactive | Tcp + 10 | | ns |

[1] The Setup time is determined by the value programmed into the Setup Timing register, index 3Ah/3Dh. Using the timing set 0 default value of 01h, the setup time would be 70 ns. S = ($N_{pres}$ x $N_{val}$ + 1), see page 77.

[2] The Command time is determined by the value programmed into the Command Timing register, index 3Bh/3Eh. Using the timing set 0 default value of 06h, the Command time would be 270 ns. C = ($N_{pres}$ x $N_{val}$ + 1), see page 77.

[3] The Recovery time is determined by the value programmed into the Recovery Timing register, index 3Ch/3Fh. Using the timing set 0 default value of 00h, the hold (Recovery) time would be 70 ns. Generally, R = ($N_{pres}$ x $N_{val}$ + 2), see page 77.

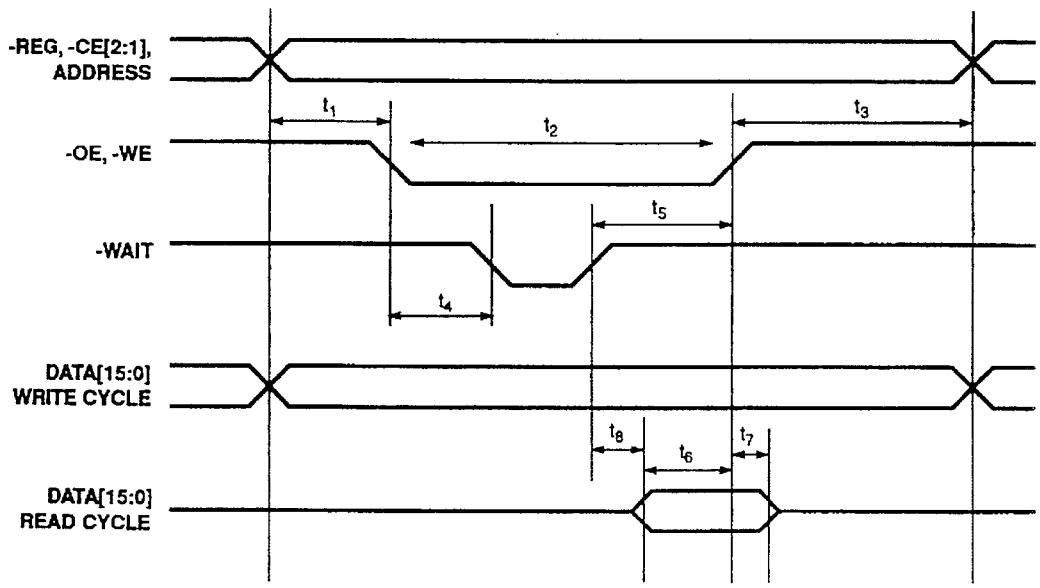

Figure 12–4. Memory Read/Write Timing

Table 12–11. Word I/O Read/Write Timing

| Symbol | Parameter | MIN | MAX | Units |
|---|---|---|---|---|
| $t_1$ | -REG or Address setup to Command active[1] | (S x Tcp) – 10 | | ns |
| $t_2$ | Command pulse width[2] | (C x Tcp) – 10 | | ns |
| $t_3$ | Address hold and Write Data valid from Command inactive[3] | (R x Tcp) – 10 | | ns |
| $t_{ref}$ | Card -IOIS16 delay from valid Address | | 35 | ns |
| $t_4$ | -IOIS16 setup time before Command end | (3 Tcp) + 10 | | ns |
| $t_5$ | -CE2 delay from -IOIS16 active[4] | Tcp – 10 | | ns |
| $t_6$ | Data setup before -IORD inactive | (2 Tcp) + 10 | | ns |
| $t_7$ | Data hold after -IORD inactive | 0 | | ns |

[1] The Setup time is determined by the value programmed into the Setup Timing register, index 3Ah/3Dh. Using the timing set 0 default value of 01h, the setup time would be 70 ns. S = ($N_{pres}$ x $N_{val}$ + 1), see page 77.

[2] The Command time is determined by the value programmed into the Command Timing register, index 3Bh/3Eh. Using the timing set 0 default value of 06h, the Command time would be 270 ns. C = ($N_{pres}$ x $N_{val}$ + 1), see page 77.

[3] The Recovery time is determined by the value programmed into the Recovery Timing register, index 3Ch/3Fh. Using the timing set 0 default value of 00h, the hold (Recovery) time would be 70 ns. Generally, R = ($N_{pres}$ x $N_{val}$ + 2), see page 77.

[4] -IOIS16 must go low within 3Tcp + 10 ns of the cycle beginning or -IOIS16 will be ignored and -CE will not be activated.

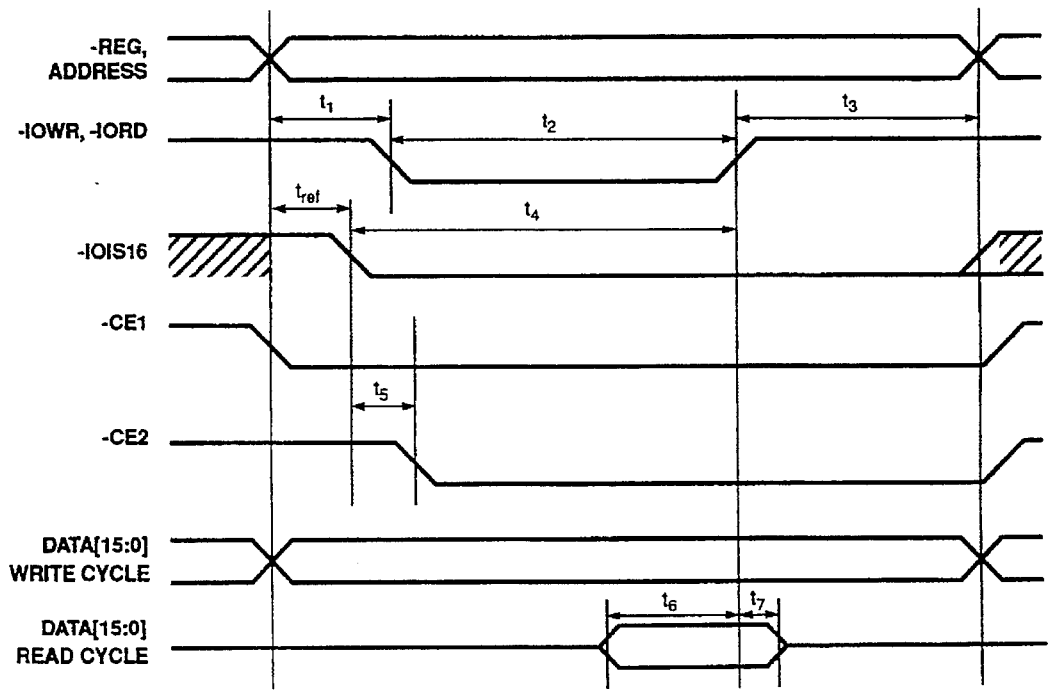

Figure 12–5. Word I/O Read/Write Timing

Table 12-12. PCMCIA Read/Write Timing When Host is 8-Bit

| Symbol | Parameter | MIN | MAX | Units |
|---|---|---|---|---|
| $t_1$ | -REG or Address setup to Command active[1] | $(S \times Tcp) - 10$ | | ns |
| $t_2$ | Command pulse width[2] | $(C \times Tcp) - 10$ | | ns |
| $t_3$ | Address hold from Command inactive[3] | $(R \times Tcp) - 10$ | | ns |
| $t_4$ | Data setup before Command inactive | $(2 Tcp) + 10$ | | ns |
| $t_5$ | Data hold after command inactive | 0 | | ns |

[1] The Setup time is determined by the value programmed into the Setup Timing register, index 3Ah/3Dh. Using the timing set 0 default value of 01h, the setup time would be 70 ns. $S = (N_{pres} \times N_{val} + 1)$, see page 77.

[2] The Command time is determined by the value programmed into the Command Timing register, index 3Bh/3Eh. Using the timing set 0 default value of 06h, the Command time would be 270 ns. $C = (N_{pres} \times N_{val} + 1)$, see page 77.

[3] The Recovery time is determined by the value programmed into the Recovery Timing register, index 3Ch/3Fh. Using the timing set 0 default value of 00h, the hold (Recovery) time would be 70 ns. Generally, $R = (N_{pres} \times N_{val} + 2)$, see page 77.

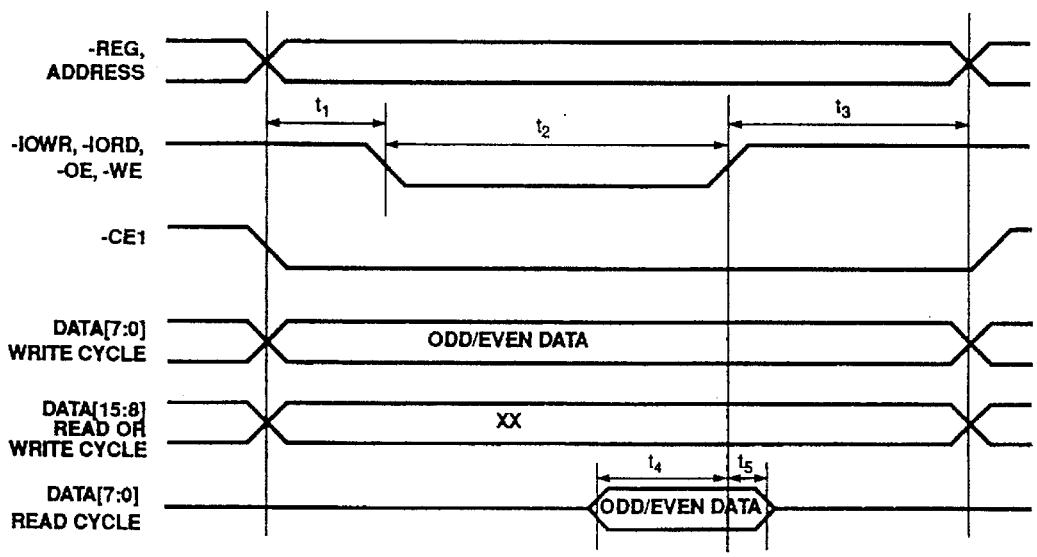

Figure 12-6. PCMCIA Read/Write Timing When Host is 8-Bit
(SBHE Tied High)

Table 12–13. Normal Byte Read/Write Timing

| Symbol | Parameter | MIN | MAX | Units |
|---|---|---|---|---|
| $t_1$ | Address setup to Command active[1] | (S x Tcp) – 10 | | ns |
| $t_2$ | Command pulse width[2] | (C x Tcp) – 10 | | ns |
| $t_3$ | Address hold from Command inactive[3] | (R x Tcp) – 10 | | ns |

[1] The Setup time is determined by the value programmed into the Setup Timing register, index 3Ah/3Dh. Using the timing set 0 default value of 01h, the setup time would be 70 ns. S = ($N_{pres}$ x $N_{val}$ + 1), see page 77.

[2] The Command time is determined by the value programmed into the Command Timing register, index 3Bh/3Eh. Using the timing set 0 default value of 06h, the Command time would be 270 ns. C = ($N_{pres}$ x $N_{val}$ + 1), see page 77.

[3] The Recovery time is determined by the value programmed into the Recovery Timing register, index 3Ch/3Fh. Using the timing set 0 default value of 00h, the hold (Recovery) time would be 70 ns. Generally, R = ($N_{pres}$ x $N_{val}$ + 2), see page 77.

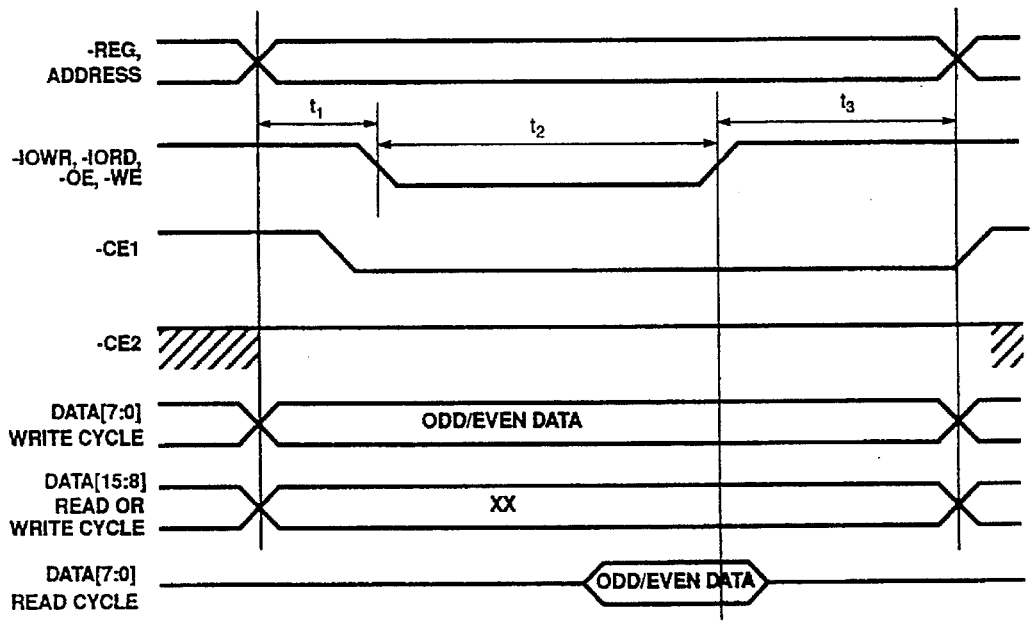

Figure 12–7. Normal Byte Read/Write Timing (e.g., All Other Byte Accesses, Including Odd I/O Cycles Where -IOIS16 Is Low)

Table 12–14. Word-To-Byte Conversion, Odd Byte I/O Read/Write Timing

| Symbol | Parameter | MIN | MAX | Units |
|---|---|---|---|---|
| $t_1$ | Address setup to Command active[1] | (S x Tcp) – 10 | | ns |
| $t_2$ | Command pulse width[2] | (C x Tcp) – 10 | | ns |
| $t_3$ | Address hold from Command inactive[3] | (R x Tcp) – 10 | | ns |
| $t_4$ | -IOIS16 inactive to -CE1 active[4] | 20 | | ns |
| $t_5$ | -IOIS16 inactive to -CE2 inactive | 20 | | ns |

[1] The Setup time is determined by the value programmed into the Setup Timing register, index 3Ah/3Dh. Using the timing set 0 default value of 01h, the setup time would be 70 ns. S = ($N_{pres}$ x $N_{val}$ + 1), see page 77.

[2] The Command time is determined by the value programmed into the Command Timing register, index 3Bh/3Eh. Using the timing set 0 default value of 06h, the Command time would be 270 ns. C = ($N_{pres}$ x $N_{val}$ + 1), see page 77.

[3] The Recovery time is determined by the value programmed into the Recovery Timing register, index 3Ch/3Fh. Using the timing set 0 default value of 00h, the hold (Recovery) time would be 70 ns. Generally, R = ($N_{pres}$ x $N_{val}$ + 2), see page 77.

[4] -IOIS16 must go low within 3Tcp + 10 ns of the cycle beginning or -IOIS16 will be ignored and -CE will not be activated.

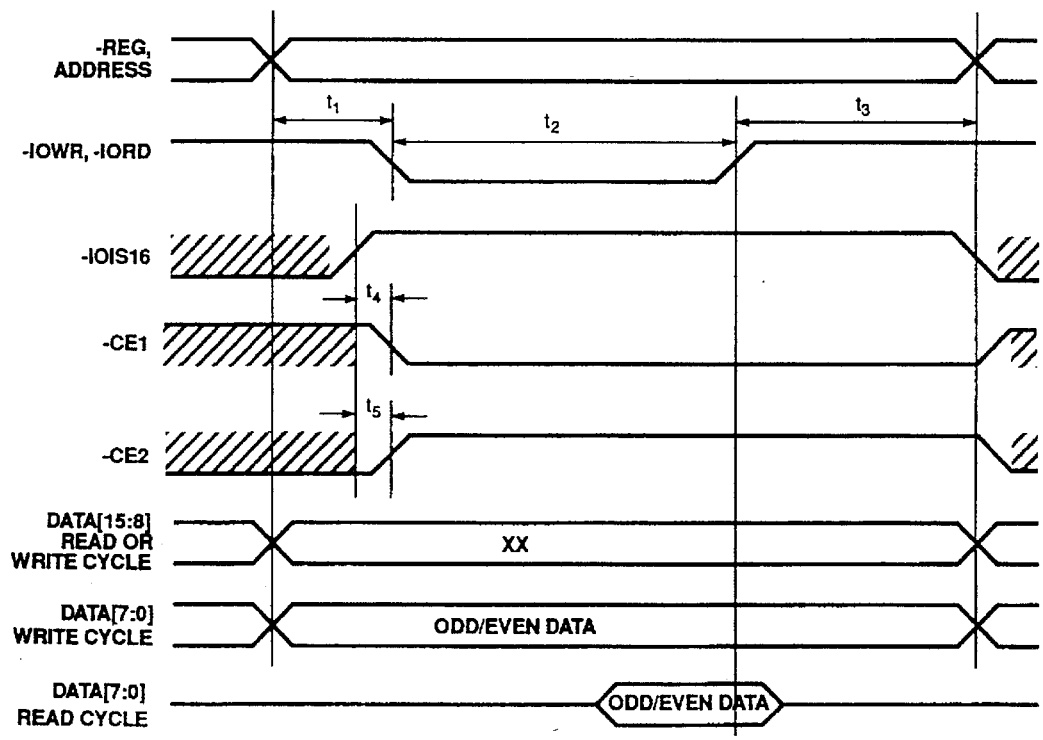

Figure 12–8. Word-To-Byte Conversion, Odd Byte I/O Read/Write Timing

Table 12-15. DMA Read Cycle Timing

| Symbol | Parameter | MIN | MAX | Units |
|---|---|---|---|---|
| $t_1$ | DACK* (IRQ9) active to DMA cycle begin | 40 | | ns |
| $t_2$ | -CE[2:1], -REG, -IORD, -OE, and Write Data setup to -IOWR active[1] | (S x Tcp) – 10 | | ns |
| $t_3$ | Command: -IOWR pulse width[2] | (C x Tcp) – 10 | | ns |
| $t_4$ | Recovery: -IOWR inactive to end of cycle[3] | (R x Tcp) – 10 | | ns |
| $t_5$ | -WAIT active from -IOWR active | | (C – 2)Tcp – 10 | ns |
| $t_6$ | -WAIT inactive to -IOWR inactive | 2 Tcp | | ns |
| $t_7$ | System TC (-VPP_VALID high) to card TC (-WE) | 40 | | ns |

[1] The Setup time is determined by the value programmed into the Setup Timing register, index 3Ah/3Dh. Using the timing set 0 default value of 01h, the setup time would be 70 ns. S = ($N_{pres}$ x $N_{val}$ + 1), see page 77.

[2] The Command time is determined by the value programmed into the Command Timing register, index 3Bh/3Eh. Using the timing set 0 default value of 06h, the Command time would be 270 ns. C = ($N_{pres}$ x $N_{val}$ + 1), see page 77.

[3] The Recovery time is determined by the value programmed into the Recovery Timing register, index 3Ch/3Fh. Using the timing set 0 default value of 00h, the hold (Recovery) time would be 70 ns. Generally, R = ($N_{pres}$ x $N_{val}$ + 2), see page 77.

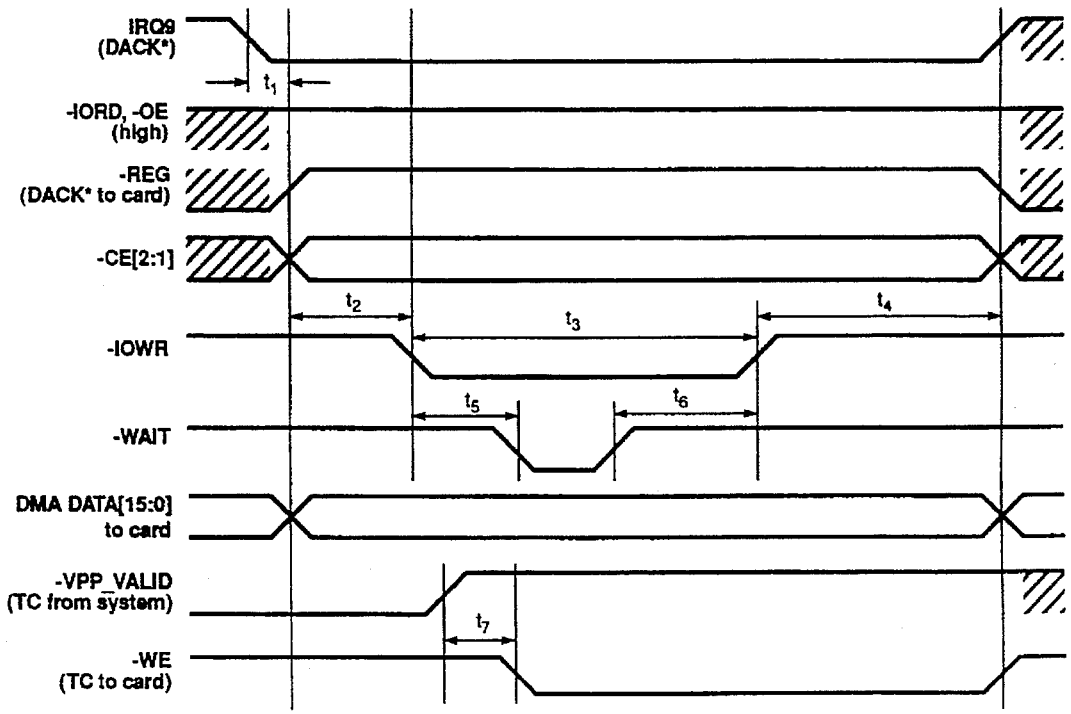

Figure 12-9. DMA Read Cycle Timing

Table 12–16. DMA Write Cycle Timing

| Symbol | Parameter | MIN | MAX | Units |
|---|---|---|---|---|
| $t_1$ | DACK* (IRQ9) active to DMA cycle begin | 40 | | ns |
| $t_2$ | -CE[2:1], -REG, -IOWR, -WE, and Write Data setup to -IORD active[1] | $(S \times Tcp) - 10$ | | ns |
| $t_3$ | Command: -IORD pulse width[2] | $(C \times Tcp) - 10$ | | ns |
| $t_4$ | Recovery: -IORD inactive to end of cycle[3] | $(R \times Tcp) - 10$ | | ns |
| $t_5$ | -WAIT active from -IORD active | | $(C-2)Tcp - 10$ | ns |
| $t_6$ | -WAIT inactive to -IORD inactive | 2 Tcp | | ns |
| $t_7$ | System TC (-VPP_VALID high) to card TC (-OE) | 40 | | ns |
| $t_8$ | Data setup before -OE inactive | $(2 Tcp) + 10$ | | ns |
| $t_9$ | Data hold after -OE inactive | 0 | | ns |
| $t_{10}$ | Data valid from -WAIT inactive | $Tcp + 10$ | | ns |

[1] The Setup time is determined by the value programmed into the Setup Timing register, index 3Ah/3Dh. Using the timing set 0 default value of 01h, the setup time would be 70 ns. $S = (N_{pres} \times N_{val} + 1)$, see page 77.

[2] The Command time is determined by the value programmed into the Command Timing register, index 3Bh/3Eh. Using the timing set 0 default value of 06h, the Command time would be 270 ns. $C = (N_{pres} \times N_{val} + 1)$, see page 77.

[3] The Recovery time is determined by the value programmed into the Recovery Timing register, index 3Ch/3Fh. Using the timing set 0 default value of 00h, the hold (Recovery) time would be 70 ns. Generally, $R = (N_{pres} \times N_{val} + 2)$, see page 77.

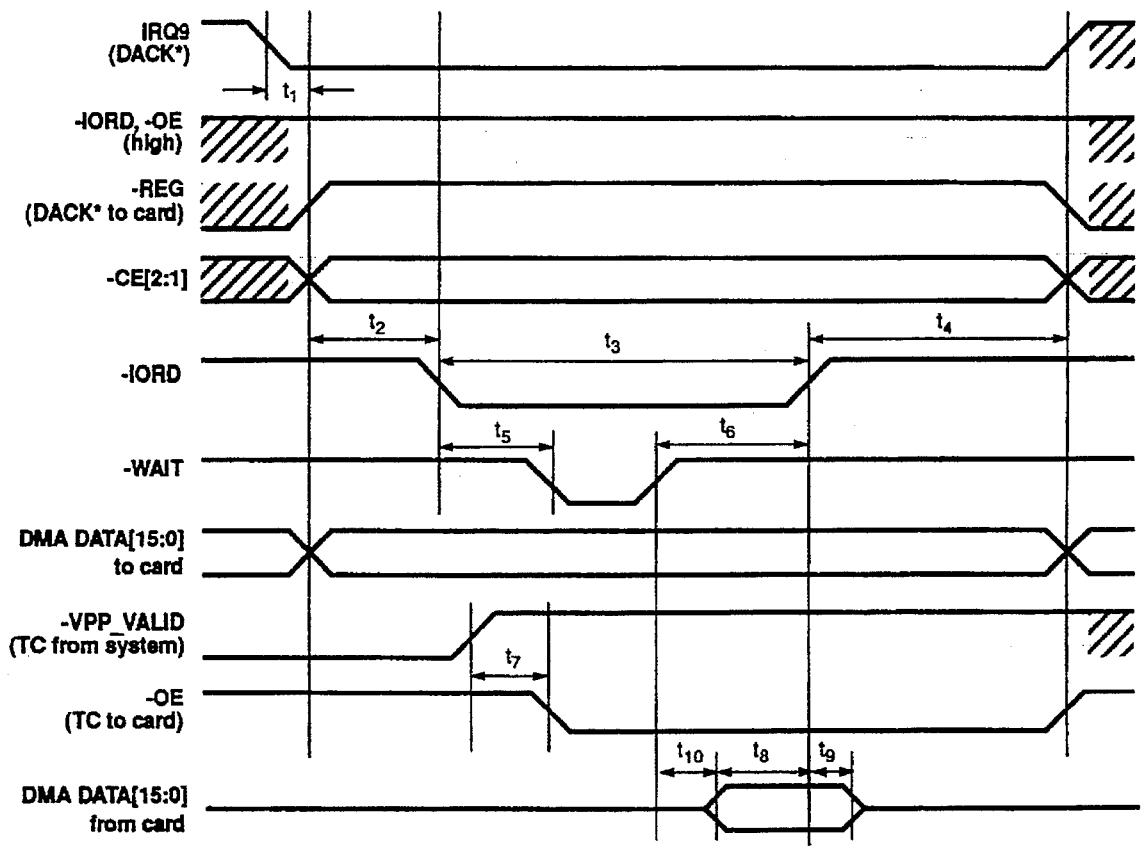
Figure 12-10. DMA Write Cycle Timing

Table 12-17. DMA Request Timing

| Symbol | Parameter | MIN | MAX | Units |
|---|---|---|---|---|
| $t_1$ | DMA request from socket interface to system[1] | 40 | | ns |

[1] After FIFO empty. DMA requests held off from being presented to the system until all write data to a card has been emptied from the socket interface FIFO.

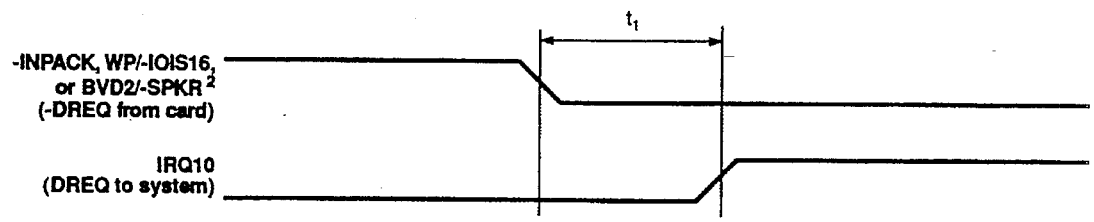

[2] DMA Control register bits 7 and 6 define which of these three signals serve as the active-low DMA request from the card.

Figure 12-11. DMA Request Timing

13. PAKAGE DIMENSIONS
13.1 144-Pin VQFP Package
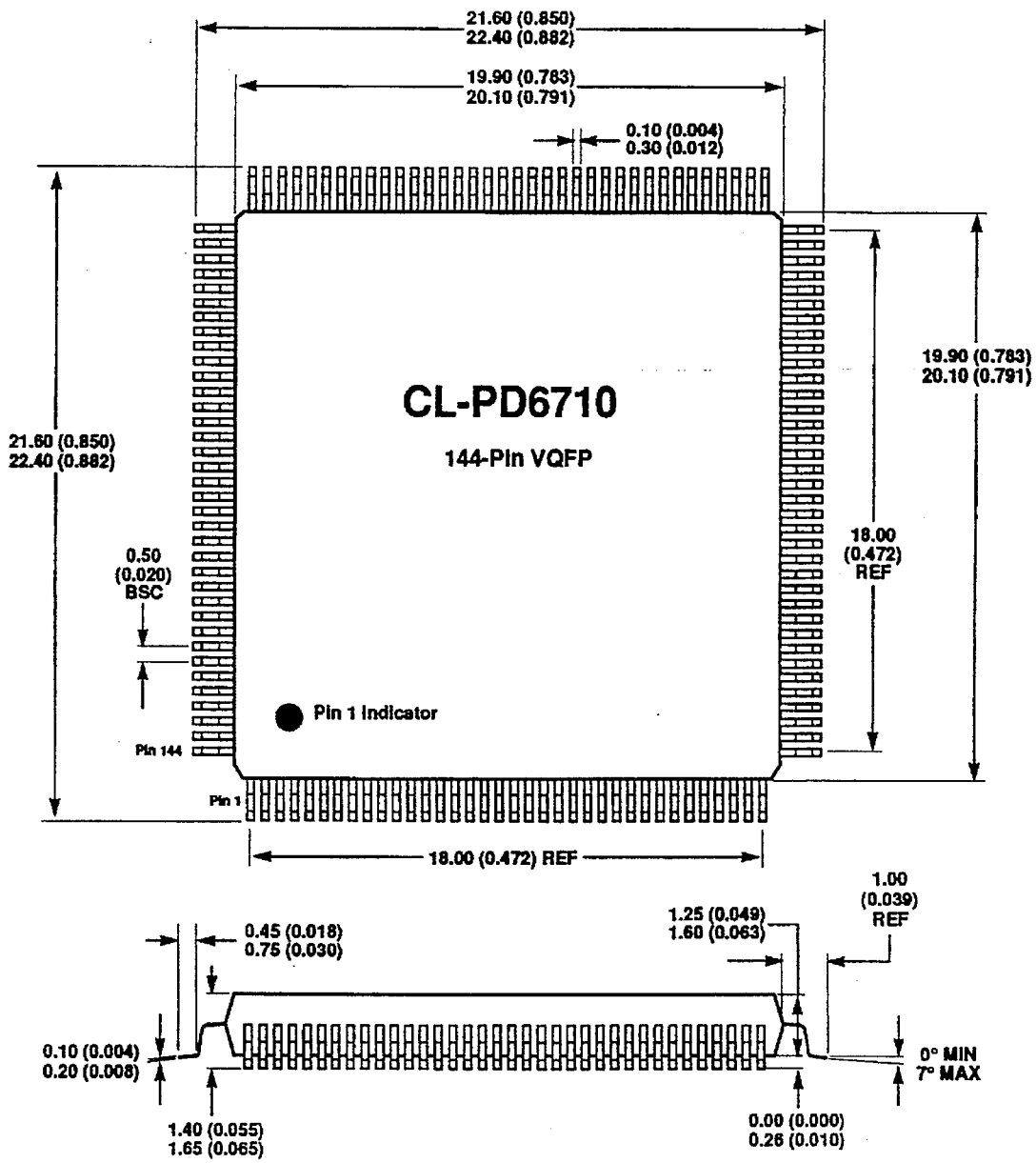
NOTES:
1) Dimensions are in millimeters and parenthetically in inches.
2) BSC = basic dimension.

13.2 208-Pin PQFP Package
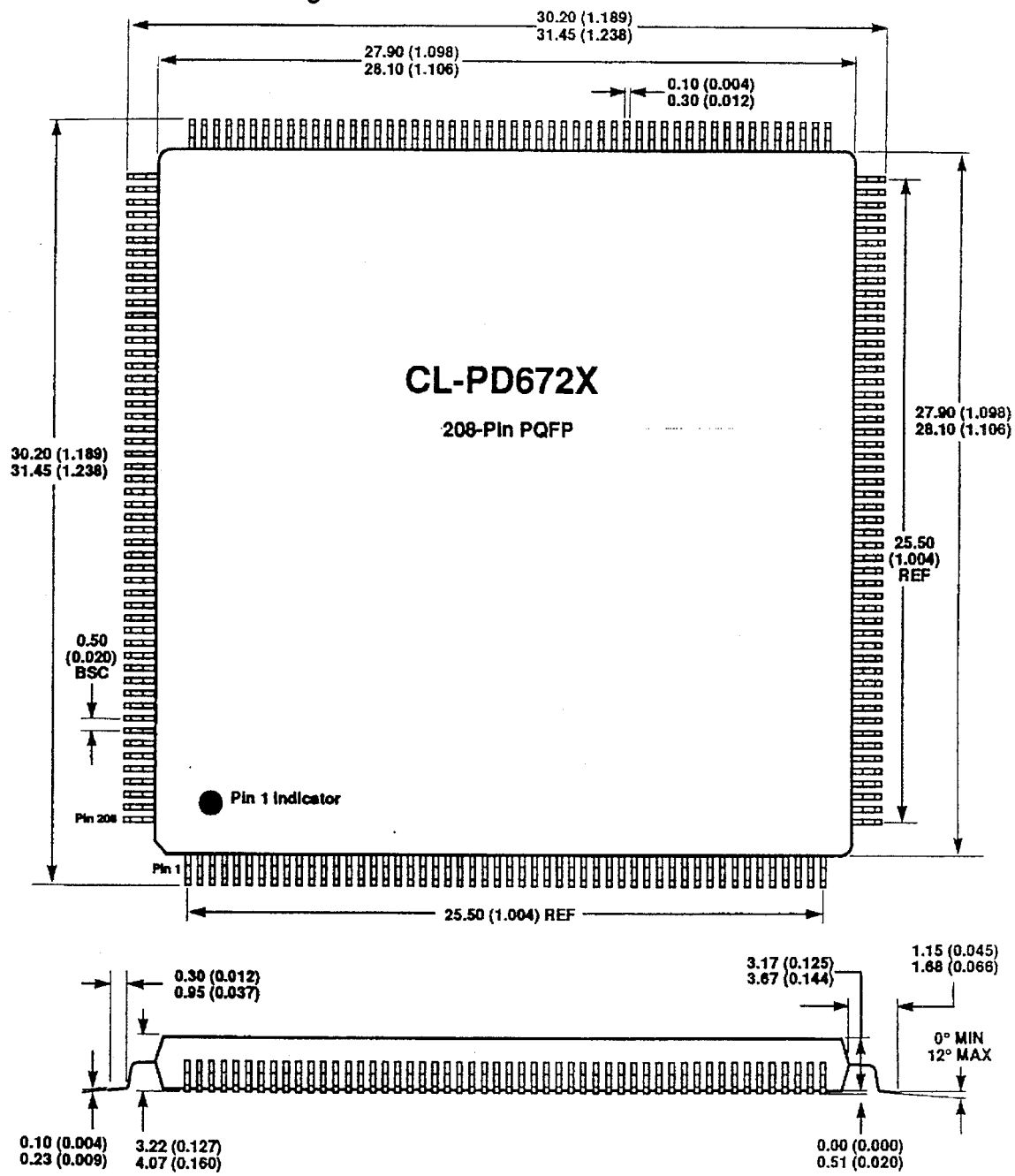
NOTES:
1) Dimensions are in millimeters and parenthetically in inches.
2) BSC = basic dimension.

14. ORDERING INFORMATION
The order number for the part is:
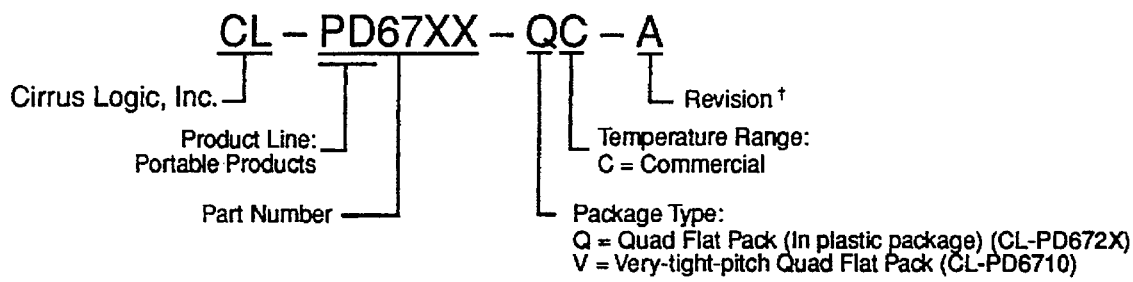
† Contact Cirrus Logic for up-to-date information on revisions.

15. REGISTER SUMMARY TABLES

15.1 Access Registers

| Register Name: Index | | | | | | | Register Per: chip |
|---|---|---|---|---|---|---|---|
| Index: N/A | | | | | | | Register Compatibility Type: 365 |
| *Bit 7* | *Bit 6* | *Bit 5* | *Bit 4* | *Bit 3* | *Bit 2* | *Bit 1* | *Bit 0* |
| Device Index | Socket Index | \multicolumn{6}{c}{Register Index} | | | | | |
| RW:X | RW:X | \multicolumn{6}{c}{RW:XXXXXX} | | | | | |

| Register Name: Data[a] | Register Per: chip |
|---|---|
| Index: N/A | Register Compatibility Type: 365 |

[a] Bits 7-0 data interpreted as defined by the Index register (see page 26).

15.2 Chip Control Registers

| Register Name: Chip Revision | | | | | | | Register Per: chip |
|---|---|---|---|---|---|---|---|
| Index: 0h | | | | | | | Register Compatibility Type: 365 |
| *Bit 7* | *Bit 6* | *Bit 5* | *Bit 4* | *Bit 3* | *Bit 2* | *Bit 1* | *Bit 0* |
| Interface ID | | 0 | 0 | Revision | | | |
| R:10 | | R:0 | R:0 | R:0010[a] | | | |

[a] Value for the current stepping only.

| Register Name: Interface Status | | | | | | | Register Per: socket |
|---|---|---|---|---|---|---|---|
| Index: 1h | | | | | | | Register Compatibility Type: 365 |
| *Bit 7* | *Bit 6* | *Bit 5* | *Bit 4* | *Bit 3* | *Bit 2* | *Bit 1* | *Bit 0* |
| -VPP_VALID | | RDY | WP | -CD2 | -CD1 | BVD2 | BVD1 |
| $V_{PP}$ Valid | Card Power On | Ready/Busy* | Write Protect | Card Detect | | Battery Voltage Detect | |
| R[a] | R:0 | R[b] | R[c] | R[d] | | R[e] | |

[a] Bit 7 is the inversion of the value of the -VPP_VALID pin (see page 13).
[b] Bit 5 is the value of the RDY/-IREQ pin (see page 15).
[c] Bit 4 is the value of the WP/-IOIS16 pin (see page 15).
[d] Bits 3-2 are the inversion of the values of the -CD1 and -CD2 pins (see page 16).
[e] Bits 1-0 are the values of the BVD1/-STSCG and BVD2/-SPKR pins (see page 16).

| Register Name: Power Control  Index: 2h | | | | | | | Register Per: socket  Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| Card Enable | Scratch Bit | Auto-Power | $V_{CC}$ Power | Scratch Bit | Scratch Bit | $V_{PP1}$ Power | |
| RW:0 | RW:0 | RW:0 | RW:0 | RW:0 | RW:0 | RW:00 | |

| Register Name: Interrupt and General Control  Index: 3h | | | | | | | Register Per: socket  Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| Ring Indicate Enable | Card Reset* | Card Is I/O | Enable Manage Int | IRQ Level | | | |
| RW:0 | RW:0 | RW:0 | RW:0 | RW:0000 | | | |

| Register Name: Card Status Change  Index: 4h | | | | | | | Register Per: socket  Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| 0 | 0 | 0 | 0 | Card Detect Change | Ready Change | Battery Warning Change | Battery Dead Or Status Change |
| R:0 | R:0 | R:0 | R:0 | R:0 | R:0 | R:0 | R:0 |

| Register Name: Management Interrupt Configuration  Index: 5h | | | | | | | Register Per: socket  Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| Management IRQ | | | | Card Detect Enable | Ready Enable | Battery Warning Enable | Battery Dead Or Status Change Enable |
| RW:0000 | | | | RW:0 | RW:0 | RW:0 | RW:0 |

| Register Name: Mapping Enable  Index: 6h | | | | | | | Register Per: socket  Register Compatibility Type: 365 |
|---|---|---|---|---|---|---|---|
| Bit 7 | Bit 6 | Bit 5 | Bit 4 | Bit 3 | Bit 2 | Bit 1 | Bit 0 |
| I/O Map 1 Enable | I/O Map 0 Enable | MEMCS16 Full Decode | Memory Map 4 Enable | Memory Map 3 Enable | Memory Map 2 Enable | Memory Map 1 Enable | Memory Map 0 Enable |
| RW:0 | RW:0 | RW:0 | RW:0 | RW:0 | RW:0 | RW:0 | RW:0 |

15.3 I/O Window Mapping Registers

| Register Name: I/O Window Control | | | | | | | Register Per: socket |
|---|---|---|---|---|---|---|---|
| Index: 7h | | | | | | | Register Compatibility Type: 365 |
| Bit 7 | Bit 6 | Bit 5 | Bit 4 | Bit 3 | Bit 2 | Bit 1 | Bit 0 |
| Timing Register Select 1 | Scratch Bit | Auto-Size I/O Window 1 | I/O Window 1 Size | Timing Register Select 0 | Scratch Bit | Auto-Size I/O Window 0 | I/O Window 0 Size |
| RW:0 | RW:0 | RW:0 | RW:0 | RW:0 | RW:0 | RW:0 | RW:0 |

| Register Name: I/O Map 0-1 Start Address Low | | | | | | | Register Per: socket |
|---|---|---|---|---|---|---|---|
| Index: 8h, Ch | | | | | | | Register Compatibility Type: 365 |
| Bit 7 | Bit 6 | Bit 5 | Bit 4 | Bit 3 | Bit 2 | Bit 1 | Bit 0 |
| Start Address 7-0 ||||||||
| RW:00000000 ||||||||

| Register Name: I/O Map 0-1 Start Address High | | | | | | | Register Per: socket |
|---|---|---|---|---|---|---|---|
| Index: 9h, Dh | | | | | | | Register Compatibility Type: 365 |
| Bit 7 | Bit 6 | Bit 5 | Bit 4 | Bit 3 | Bit 2 | Bit 1 | Bit 0 |
| Start Address 15-8 ||||||||
| RW:00000000 ||||||||

| Register Name: I/O Map 0-1 End Address Low | | | | | | | Register Per: socket |
|---|---|---|---|---|---|---|---|
| Index: Ah, Eh | | | | | | | Register Compatibility Type: 365 |
| Bit 7 | Bit 6 | Bit 5 | Bit 4 | Bit 3 | Bit 2 | Bit 1 | Bit 0 |
| End Address 7-0 ||||||||
| RW:00000000 ||||||||

| Register Name: I/O Map 0-1 End Address High | | | | | | | Register Per: socket |
|---|---|---|---|---|---|---|---|
| Index: Bh, Fh | | | | | | | Register Compatibility Type: 365 |
| Bit 7 | Bit 6 | Bit 5 | Bit 4 | Bit 3 | Bit 2 | Bit 1 | Bit 0 |
| End Address 15-8 ||||||||
| RW:00000000 ||||||||

| Register Name: I/O Map 0-1 Address Offset Low | | | | | | | Register Per: socket |
|---|---|---|---|---|---|---|---|
| Index: 36h, 38h | | | | | | | Register Compatibility Type: ext. |
| Bit 7 | Bit 6 | Bit 5 | Bit 4 | Bit 3 | Bit 2 | Bit 1 | Bit 0 |
| Offset Address 7-1 | | | | | | | Scratch Bit |
| RW:0000000 | | | | | | | RW:0 |

| Register Name: I/O Map 0-1 Address Offset High | | | | | | | Register Per: socket |
|---|---|---|---|---|---|---|---|
| Index: 37h, 39h | | | | | | | Register Compatibility Type: ext. |
| Bit 7 | Bit 6 | Bit 5 | Bit 4 | Bit 3 | Bit 2 | Bit 1 | Bit 0 |
| Offset Address 15-8 | | | | | | | |
| RW:00000000 | | | | | | | |

15.4 Memory Window Mapping Registers

| Register Name: Memory Map 0-4 Start Address Low | | | | | | | Register Per: socket |
|---|---|---|---|---|---|---|---|
| Index: 10h, 18h, 20h, 28h, 30h | | | | | | | Register Compatibility Type: 365 |
| Bit 7 | Bit 6 | Bit 5 | Bit 4 | Bit 3 | Bit 2 | Bit 1 | Bit 0 |
| Start Address 19-12 | | | | | | | |
| RW:00000000 | | | | | | | |

| Register Name: Memory Map 0-4 Start Address High | | | | | | | Register Per: socket |
|---|---|---|---|---|---|---|---|
| Index: 11h, 19h, 21h, 29h, 31h | | | | | | | Register Compatibility Type: 365 |
| Bit 7 | Bit 6 | Bit 5 | Bit 4 | Bit 3 | Bit 2 | Bit 1 | Bit 0 |
| Window Data Size | Scratch Bit | Scratch Bit | Scratch Bit | Start Address 23-20 | | | |
| RW:0 | RW:0 | RW:0 | RW:0 | RW:0000 | | | |

| Register Name: Memory Map 0-4 End Address Low | | | | | | | Register Per: socket |
|---|---|---|---|---|---|---|---|
| Index: 12h, 1Ah, 22h, 2Ah, 32h | | | | | | | Register Compatibility Type: 365 |
| Bit 7 | Bit 6 | Bit 5 | Bit 4 | Bit 3 | Bit 2 | Bit 1 | Bit 0 |
| End Address 19-12 | | | | | | | |
| RW:00000000 | | | | | | | |

| Register Name: Memory Map 0-4 End Address High | | | | | | Register Per: socket | |
|---|---|---|---|---|---|---|---|
| Index: 13h, 1Bh, 23h, 2Bh, 33h | | | | | | Register Compatibility Type: 365 | |
| Bit 7 | Bit 6 | Bit 5 | Bit 4 | Bit 3 | Bit 2 | Bit 1 | Bit 0 |
| Card Timer Select | | Scratch Bit | Scratch Bit | End Address 23-20 | | | |
| RW:00 | | RW:0 | RW:0 | RW:0000 | | | |

| Register Name: Memory Map 0-4 Address Offset Low | | | | | | Register Per: socket | |
|---|---|---|---|---|---|---|---|
| Index: 14h, 1Ch, 24h, 2Ch, 34h | | | | | | Register Compatibility Type: 365 | |
| Bit 7 | Bit 6 | Bit 5 | Bit 4 | Bit 3 | Bit 2 | Bit 1 | Bit 0 |
| Offset Address 19-12 | | | | | | | |
| RW:00000000 | | | | | | | |

| Register Name: Memory Map 0-4 Address Offset High | | | | | | Register Per: socket | |
|---|---|---|---|---|---|---|---|
| Index: 15h, 1Dh, 25h, 2Dh, 35h | | | | | | Register Compatibility Type: 365 | |
| Bit 7 | Bit 6 | Bit 5 | Bit 4 | Bit 3 | Bit 2 | Bit 1 | Bit 0 |
| Write Protect | REG Setting | Offset Address 25-20 | | | | | |
| RW:0 | RW:0 | RW:000000 | | | | | |

15.5 Extension Registers

| Register Name: Misc Control 1 | | | | | | Register Per: socket | |
|---|---|---|---|---|---|---|---|
| Index: 16h | | | | | | Register Compatibility Type: ext. | |
| Bit 7 | Bit 6 | Bit 5 | Bit 4 | Bit 3 | Bit 2 | Bit 1 | Bit 0 |
| In-pack Enable | Scratch Bit | Scratch Bit | Speaker Enable | Pulse System IRQ | Pulse Management Interrupt | $V_{CC}$ 3.3V | 5V Detect |
| RW:0 | RW:0 | RW:0 | RW:0 | RW:0 | RW:0 | RW:0 | R |

| Register Name: FIFO Control | | | | | | Register Per: socket | |
|---|---|---|---|---|---|---|---|
| Index: 17h | | | | | | Register Compatibility Type: ext. | |
| Bit 7 | Bit 6 | Bit 5 | Bit 4 | Bit 3 | Bit 2 | Bit 1 | Bit 0 |
| Empty Write FIFO | Scratch Bit | Scratch Bit | Scratch Bit | Scratch Bit | Scratch Bit | Scratch Bit | Scratch Bit |
| RW | RW:0 | RW:0 | RW:0 | RW:0 | RW:0 | RW:0 | RW:0 |

| Register Name: Misc Control 2 | | | | | | | Register Per: chip |
| --- | --- | --- | --- | --- | --- | --- | --- |
| Index: 1Eh | | | | | | | Register Compatibility Type: ext. |
| Bit 7 | Bit 6 | Bit 5 | Bit 4 | Bit 3 | Bit 2 | Bit 1 | Bit 0 |
| IRQ15 Is RI Out | DMA System (CL-PD6722) | Three-State Bit 7 | Drive LED Enable | 5V Core | Suspend | Low-Power Dynamic Mode | Bypass Frequency Synthesizer |
| RW:0 | RW:0 | RW:0 | RW:0 | RW:0 | RW:0 | RW:1 | RW:0 |

| Register Name: Chip Information | | | | | | | Register Per: chip |
| --- | --- | --- | --- | --- | --- | --- | --- |
| Index: 1Fh | | | | | | | Register Compatibility Type: ext. |
| Bit 7 | Bit 6 | Bit 5 | Bit 4 | Bit 3 | Bit 2 | Bit 1 | Bit 0 |
| Chip Identification | | Dual/Single Slot* | CL-PD67XX Revision Level | | | Scratch Bit | Scratch Bit |
| R:11 | | R:a | R:111 | | | RW:0 | RW:0 | a The value for CL-PD6710 is '0', and the value for CL-PD672X is '1'.

| Register Name: ATA Control | | | | | | | Register Per: socket |
| --- | --- | --- | --- | --- | --- | --- | --- |
| Index: 26h | | | | | | | Register Compatibility Type: ext. |
| Bit 7 | Bit 6 | Bit 5 | Bit 4 | Bit 3 | Bit 2 | Bit 1 | Bit 0 |
| A25/CSEL | A24/M/S* | A23/VU | A22 | A21 | Scratch Bit | Speaker Is LED Input | ATA Mode |
| RW:0 | RW:0 | RW:0 | RW:0 | RW:0 | RW:0 | RW:0 | RW:0 |

| Register Name: Extension Index | | | | | | | Register Per: socket |
| --- | --- | --- | --- | --- | --- | --- | --- |
| Index: 2Eh | | | | | | | Register Compatibility Type: ext. |
| Bit 7 | Bit 6 | Bit 5 | Bit 4 | Bit 3 | Bit 2 | Bit 1 | Bit 0 |
| Extension Register Index | | | | | | | |
| RW:00000000 | | | | | | | |

| Register Name: Data Mask 0 | | | Extension: 01h | | | | Register Per: socket |
| --- | --- | --- | --- | --- | --- | --- | --- |
| Index: 2Fh | | | | | | | Register Compatibility Type: ext. |
| Bit 7 | Bit 6 | Bit 5 | Bit 4 | Bit 3 | Bit 2 | Bit 1 | Bit 0 |
| Data Mask Select 0 | | | | | | | |
| RW:00000000 | | | | | | | |

| Register Name: Data Mask 1 | | | Extension: 02h | | | Register Per: socket | |
|---|---|---|---|---|---|---|---|
| Index: 2Fh | | | | | | Register Compatibility Type: ext. | |
| Bit 7 | Bit 6 | Bit 5 | Bit 4 | Bit 3 | Bit 2 | Bit 1 | Bit 0 |
| Data Mask Select 1 ||||||||
| RW:00000000 ||||||||

| Register Name: DMA Control | | | Extension: 03h | | | Register Per: socket | |
|---|---|---|---|---|---|---|---|
| Index: 2Fh | | | | | | Register Compatibility Type: ext. | |
| Bit 7 | Bit 6 | Bit 5 | Bit 4 | Bit 3 | Bit 2 | Bit 1 | Bit 0 |
| DMA Enable | | Disable Socket Pull-Ups | 0 | 0 | 0 | 0 | 0 |
| RW:00 | | RW:0 | RW:0 | RW:0 | RW:0 | RW:0 | RW:0 |

15.6 Timing Registers

| Register Name: Set-up Timing 0-1 | | | | | | | Register Per: socket |
|---|---|---|---|---|---|---|---|
| Index: 3Ah, 3Dh | | | | | | | Register Compatibility Type: 365 |
| Bit 7 | Bit 6 | Bit 5 | Bit 4 | Bit 3 | Bit 2 | Bit 1 | Bit 0 |
| Setup Prescaler Select | | Setup Multiplier Value |||||| 
| RW:00 | | RW:000001 ||||||

| Register Name: Command Timing 0-1 | | | | | | | Register Per: socket |
|---|---|---|---|---|---|---|---|
| Index: 3Bh, 3Eh | | | | | | | Register Compatibility Type: 365 |
| Bit 7 | Bit 6 | Bit 5 | Bit 4 | Bit 3 | Bit 2 | Bit 1 | Bit 0 |
| Command Prescaler Select | | Command Multiplier Value ||||||
| RW:00 | | RW:001111/000110[a] ||||||

[a] Standard AT bus timing (Command Timing 0) resets to 06h and AT bus timing; with added wait states (Command Timing 1) resets to 0Fh.

| Register Name: Recovery Timing 0-1 | | | | | | | Register Per: socket |
|---|---|---|---|---|---|---|---|
| Index: 3Ch, 3Fh | | | | | | | Register Compatibility Type: 365 |
| Bit 7 | Bit 6 | Bit 5 | Bit 4 | Bit 3 | Bit 2 | Bit 1 | Bit 0 |
| Recovery Prescaler Select | | Recovery Multiplier Value ||||||
| RW:00 | | RW:000000 ||||||

Index

Numerics

+5V 17
5V Core 51
5V Detect 49
5V_DET 17

A

A[25:0] 14
A_PinName 14
A21 54
A22 54
A23/VU 54
A24/M/S* 54
A25/CSEL 54
AEN 11
ALE 10
ATA Control 53
ATA Mode 53
Auto-Power 33
Auto-Size I/O Window 0 40
Auto-Size I/O Window 1 40

B

B_PinName 14
Battery Dead Or Status Change 36
Battery Dead Or Status Change Enable 37
Battery Voltage Detect 30
Battery Warning Change 36
Battery Warning Enable 37
Bit Descriptions Conventions 6
Bus Sizing 23
BVD1/-STSCHG 16
BVD2/-SPKR 16
Bypass Frequency Synthesizer 51

C

C_SEL 12
Card Detect 30
Card Detect Change 36
Card Detect Enable 37
Card Enable 33
Card Is I/O 34
Card Power On 31
Card Reset* 35
Card Status Change 36
Card Timer Select 46
-CD[2:1] 16
-CE[2:1] 16
Chip Identification 53
Chip Information 53
Chip Revision 29
CLK 13
CL-PD67XX Revision Level 53
Command Multiplier Value 58
Command Prescaler Select 58
Command Timing 0 58
Command Timing 1 58
Constant 5

D

D[15:0] 14
Data 27
Data Mask 0 55
Data Mask 1 56
Device Index 26
Disable Socket Pull-Ups 56
DMA Control 56
DMA Enable 56
DMA System 52
Drive LED Enable 51
Dual/Single Slot* 53

E

Empty Write FIFO 50
Enable Manage Int 34
End Address 15-8 42
End Address 19-12 46
End Address 23-20 46
End Address 7-0 42
Extension Data 55
Extension Index 55

F

FIFO Control 50

G

General Conventions 5
GND 17

H

Host Access to Registers 24

I

I/O Map 0 Address Offset High 43
I/O Map 0 Address Offset Low 43
I/O Map 0 Enable 39
I/O Map 0 End Address High 42
I/O Map 0 End Address Low 42
I/O Map 0 Start Address High 41
I/O Map 0 Start Address Low 41
I/O Map 1 Address Offset High 43
I/O Map 1 Address Offset Low 43
I/O Map 1 Enable 39
I/O Map 1 End Address High 42
I/O Map 1 End Address Low 42
I/O Map 1 Start Address High 41
I/O Map 1 Start Address Low 41
I/O Window 0 Size 40
I/O Window 1 Size 40
I/O Window Control 40
Index 26
-INPACK 15
Inpack Enable 50
Interface ID 29
Interface Status 30
Interrupt and General Control 34
Interrupts 21
-INTR 12
IOCHRDY 11
IOCS16* 11
-IOIS16 15
IOR* 10
-IORD 15
IOW* 10
-IOWR 15
-IREQ 15
IRQ Level 34
IRQ[14, 11, 7, 5-3] 11
IRQ10 11
IRQ12 12
IRQ15 12
IRQ15 Is RI Out 52
IRQ9 11
ISA Interface Signals 10
ISA_VCC 13

L

LA[23:17] 10
Low-Power Dynamic Mode 51
Low-power Dynamic mode description 21

M

Management Interrupt Configuration 37
Management IRQ 38
Mapping Enable 38
MEMCS16 Full Decode 39
MEMCS16* 11
Memory Map 0 Address Offset High 47
Memory Map 0 Address Offset Low 47
Memory Map 0 Enable 38
Memory Map 0 End Address High 46
Memory Map 0 End Address Low 45
Memory Map 0 Start Address High 45
Memory Map 0 Start Address Low 44
Memory Map 1 Address Offset High 47
Memory Map 1 Address Offset Low 47
Memory Map 1 Enable 38
Memory Map 1 End Address High 46
Memory Map 1 End Address Low 45
Memory Map 1 Start Address High 45
Memory Map 1 Start Address Low 44
Memory Map 2 Address Offset High 47
Memory Map 2 Address Offset Low 47
Memory Map 2 Enable 39
Memory Map 2 End Address High 46
Memory Map 2 End Address Low 45
Memory Map 2 Start Address High 45
Memory Map 2 Start Address Low 44
Memory Map 3 Address Offset High 47
Memory Map 3 Address Offset Low 47
Memory Map 3 Enable 39
Memory Map 3 End Address High 46
Memory Map 3 End Address Low 45
Memory Map 3 Start Address High 45
Memory Map 3 Start Address Low 44
Memory Map 4 Address Offset High 47
Memory Map 4 Address Offset Low 47
Memory Map 4 Enable 39
Memory Map 4 End Address High 46
Memory Map 4 End Address Low 45
Memory Map 4 Start Address High 45
Memory Map 4 Start Address Low 44
MEMR* 10
MEMW* 10
Misc Control 1 49
Misc Control 2 51

N

Numeric Naming Conventions 5

O

-OE 15
Offset Address 15-8 43
Offset Address 19-12 47

Offset Address 25-20 48
Offset Address 7-1 43

P

PCMCIA Basics 19
PCMCIA Timing 23
Pin Diagram
    144-Pin VQFP 7
    208-Pin PQFP 8
Pin Naming Conventions 9
Pin Usage Summary 18
Power Control 32
Power Management 21
Power-On Configuration 18
Power-On Setup 25
Pulse Management Interrupt 49
Pulse System IRQ 50
PWRGOOD 10

R

RDY/-IREQ 15
Read-Only 5
Ready Change 36
Ready Enable 37
Ready/Busy* 31
Recovery Multiplier Value 59
Recovery Prescaler Select 59
Recovery Timing 0 59
Recovery Timing 1 59
REFRESH* 10
-REG 14
REG Setting 48
Register Description Notation 5
Register Heading Description 6
Register Index 26
Reserved 5, 17
RESET 16
Revision 29
Ring Indicate Enable 35

S

SA[16:0] 10
SBHE* 10
SD[15:0] 10
Setup Multiplier Value 57
Setup Prescaler Select 57
Setup Timing 0 57

Setup Timing 1 57
SLOT_VCC 17
Socket Index 26
Socket Interface Signals 14
Socket Power Features 21
Speaker Enable 50
Speaker Is LED Input 54
-SPKR 16
SPKR_OUT*/C_SEL 12
Start Address 15-8 42
Start Address 19-12 44
Start Address 23-20 45
Start Address 7-0 41
-STSCHG 16
Suspend 51
Suspend mode description 21

T

Three-State Bit 7 52
Timing Register Select 0 40
Timing Register Select 1 41

V $V_{CC}$ 3.3V 49
$V_{CC}$ Power 33
-VCC_3 17
-VCC_5 17
VDD 17
$V_{PP}$ Valid 31
-VPP_VALID 13
$V_{PP}1$ Power 33
VPP1_PGM 17
VPP1_VCC 17

W

-WAIT 16
-WE 15
Window Data Size 45
Windowing 19
WP/-IOIS16 15
Write FIFO 23
Write Protect 30, 48

Z

ZWS* 12

Direct Sales Offices

*Domestic*

NORTHERN CALIFORNIA
San Jose
TEL: 408/436-7110
FAX: 408/437-8960

SOUTHERN CALIFORNIA
Tustin
TEL: 714/258-8303
FAX: 714/258-8307

Thousand Oaks
TEL: 805/371-5381
FAX: 805/371-5382

ROCKY MOUNTAIN AREA
Denver, CO
TEL: 303/786-9696
FAX: 303/786-9695

SOUTH CENTRAL AREA
Austin, TX
TEL: 512/794-8490
FAX: 512/794-8069

Dallas, TX
TEL: 214/252-6698
FAX: 214/252-5681

CENTRAL AREA
Chicago, IL
TEL: 708/981-6950
FAX: 708/981-6846

NORTHEASTERN AREA
Andover, MA
TEL: 508/474-9300
FAX: 508/474-9149

Philadelphia, PA
TEL: 215/625-0781
FAX: 215/625-0731

SOUTHEASTERN AREA
Boca Raton, FL
TEL: 407/362-5225
FAX: 407/362-5235

*International*

GERMANY
Herrsching
TEL: 49/8152-2030
FAX: 49/8152-40077

HONG KONG
Tsimshatusi
TEL: 852/376-0801
FAX: 852/375-1202

JAPAN
Tokyo
TEL: 81/3-3340-9111
FAX: 81/3-3340-9120

KOREA
Seoul
TEL: 82/2-565-8561
FAX: 82/2-565-8565

SINGAPORE
TEL: 65/3532122
FAX: 65/3532166

TAIWAN
Taipei
TEL: 886/2-718-4533
FAX: 886/2-718-4526

UNITED KINGDOM
Hertfordshire, England
TEL: 44/0727-872424
FAX: 44/0727-875919

The Company

Cirrus Logic, Inc., produces high-integration peripheral controller circuits for mass storage, graphics, and data communications. Our products are used in leading-edge personal computers, engineering workstations, and office automation equipment.

The Cirrus Logic formula combines innovative architectures in silicon with system design expertise. We deliver complete solutions — chips, software, evaluation boards, and manufacturing kits — on-time, to help you win in the marketplace.

Cirrus Logic's fabless manufacturing strategy, unique in the semiconductor industry, employs a full manufacturing infrastructure to ensure maximum product quality, availability and value for our customers.

Talk to our systems and applications specialists; see how you can benefit from a new kind of semiconductor company.

© Copyright, Cirrus Logic, Inc., 1993

*Advance* product information describes products that are in development and subject to developmental changes. Cirrus Logic, Inc., believes the information contained in this document is accurate and reliable. However, it is marked Advance and is subject to change without notice. No responsibility is assumed by Cirrus Logic, Inc., for its use, nor for infringements of patents or other rights of third parties. This document implies no license under patents or copyrights. No part of this publication may be reproduced, stored in a retrieval system, or transmitted, inany form or by any means, electronic, mechanical, photocopying, or otherwise, without the prior written consent of Cirrus Logic, Inc. Cirrus Logic, S/LA, FeatureChips, AutoMap, UXART, Good Data, Fair Share and SimulSCAN are trademarks of Cirrus Logic, Inc. Other trademarks in this document belong to their respective companies. Cirrus Logic, Inc., products are covered under one or more of the following U.S. patents: 4,293,783; Re. 31,287; 4,763,332; 4,777,635; 4,839,896; 4,931,946; 4,975,828; 4,979,173; 5,032,981; 5,122,783; 5,131,015; 5,140,595; 5,157,618; 5,179,292; 5,185,602; 5,220,295.

CIRRUS LOGIC, Inc., 3100 West Warren Ave. Fremont, CA 94538
TEL: 510/623-8300  FAX: 510/226-2180

346710-002

We claim:

1. An electronic system having a low power clocking apparatus, the electronic system comprising:
   a. a clock signal;
   b. a plurality of sub-circuits, each sub-circuit configured to operate under control of the clock signal and further including a selection apparatus for keeping or rejecting the clock signal; and
   c. an arbiter for disabling the clock signal to all sub-circuits once each sub-circuit rejects the clock signal.

2. The electronic system according to claim 1 wherein the arbiter further comprises means for re-enabling the clock signal when an external circuit requires communication with the electronic system.

3. An electronic system having a low power clocking apparatus, the electronic system comprising:
   a. means for obtaining a clock signal including a pin on an integrated circuit for receiving a clock signal external to the integrated circuit and a multiplexer coupled to a frequency synthesizer and to the clock signal external to the integrated circuit;
   b. means for providing the clock signal to a plurality of sub-circuits located within the electronic system only when an external circuit requires a communication with the integrated circuit, the means for providing coupled to the means for obtaining; and
   c. means for determining when an external circuit requires a communication with the electronic system, the means for determining coupled to the means for obtaining and to the means for providing.

4. The electronic system as claimed in claim 3 wherein the clock signal used by the electronic system can be selected from either the external clock signal or an output of the frequency synthesizer.

5. The electronic system as claimed in claim 4 wherein the means for determining is comprised of a central arbiter and comparison circuitry for comparing addresses and commands on a system bus to addresses in a lookup table and corresponding commands.

6. The electronic system as claimed in claim 5 wherein the clock signal is disabled to the plurality of sub-circuits by the means for providing after a negative clock edge and before a positive clock edge and the clock is provided to the plurality of sub-circuits by the means for providing, starting with a positive clock edge.

7. An electronic system having a low power clocking apparatus, the electronic system comprising:
   a. means for obtaining a clock signal;
   b. means for determining when an external circuit requires a communication with the electronic system, the means for determining coupled to the means for obtaining a clock signal, wherein the means for determining includes a central arbiter and comparison circuitry for comparing addresses and commands on a system bus to addresses in a lookup table and corresponding commands; and
   c. means for providing the clock signal to a plurality of sub-circuits located within the electronic system only when the means for determining has determined that an external circuit requires a communication with the electronic system, the means for providing coupled to the means for obtaining and to the means for determining.

8. The electronic system as claimed in claim 7 wherein the clock signal is disabled to the plurality of sub-circuits by the means for providing after a negative clock edge and before a positive clock edge and the clock signal is provided to the plurality of sub-circuits by the means for providing, starting with a positive clock edge.

9. An electronic system having a low power clocking apparatus, the electronic system comprising:
   a. a clock signal;
   b. a central arbiter coupled to a system bus for determining when either one of a plurality of addresses or one of a plurality of commands is present on the system bus; and
   c. a logic structure coupled for providing the clock signal to a plurality of sub-circuits within the electronic system when the central arbiter has determined that one of the plurality of addresses is present on the system bus or that one of the plurality of commands is present on the system bus.

10. The electronic system as claimed in claim 9 further comprising comparison circuitry coupled to the central arbiter for notifying the central arbiter when one of the plurality of addresses is present on the system bus.

11. The electronic system as claimed in claim 10 wherein the clock signal is disabled to the plurality of sub-circuits by the logic structure after a negative clock edge and before a positive clock edge and the clock is provided to the plurality of sub-circuits by the logic structure, starting with a positive clock edge.

12. A low power method for providing a clock signal to a plurality of sub-circuits within an electronic system comprising:
   a. obtaining a clock signal;
   b. determining when either one of a plurality of addresses or one of a plurality of corresponding commands is present on a system bus; and
   c. providing the clock signal to the plurality of sub-circuits within the electronic system when it is determined that one of the plurality of addresses is present on the system bus or that one of the plurality of corresponding commands is present on the system bus.

* * * * *